United States Patent
Mianji

(10) Patent No.: US 9,367,609 B1
(45) Date of Patent: Jun. 14, 2016

(54) METHOD AND APPARATUS FOR SUBMITTING, ORGANIZING, AND SEARCHING FOR CONTENT

(75) Inventor: Marty Mianji, Lake Oswego, OR (US)

(73) Assignee: Ustringer LLC, Lake Oswego, OR (US)

( * ) Notice: Subject to any disclaimer, the term of this patent is extended or adjusted under 35 U.S.C. 154(b) by 34 days.

(21) Appl. No.: 13/042,440

(22) Filed: Mar. 7, 2011

Related U.S. Application Data

(60) Provisional application No. 61/311,288, filed on Mar. 5, 2010.

(51) Int. Cl.
*G06F 17/30* (2006.01)
(52) U.S. Cl.
CPC ................................ *G06F 17/30722* (2013.01)
(58) Field of Classification Search
USPC ........................................................ 707/736
IPC ................................................... G06F 17/30722
See application file for complete search history.

(56) References Cited

U.S. PATENT DOCUMENTS

| | | | |
|---|---|---|---|
| 6,925,608 B1 | 8/2005 | Neale et al. | |
| 7,287,029 B1 | 10/2007 | Craft et al. | |
| 7,505,989 B2 | 3/2009 | Gardner et al. | |
| 7,664,760 B2 | 2/2010 | Christian et al. | |
| 7,685,198 B2 | 3/2010 | Xu et al. | |
| 7,836,411 B2 | 11/2010 | Plow et al. | |
| 7,912,844 B2 | 3/2011 | Boyle et al. | |
| 8,099,429 B2 | 1/2012 | Deyo et al. | |
| 8,219,555 B1 | 7/2012 | Mianji | |
| 2001/0039578 A1 | 11/2001 | Tokumaru et al. | |
| 2002/0091696 A1 | 7/2002 | Craft et al. | |
| 2002/0107829 A1 | 8/2002 | Sigurjonsson et al. | |
| 2003/0135725 A1 | 7/2003 | Schirmer et al. | |
| 2003/0167283 A1 | 9/2003 | Remsen et al. | |
| 2005/0010867 A1 | 1/2005 | Igata et al. | |
| 2007/0038995 A1 | 2/2007 | Boyle et al. | |
| 2007/0067279 A1 | 3/2007 | Bonabeau et al. | |
| 2007/0078832 A1 | 4/2007 | Ott, IV et al. | |
| 2007/0150519 A1 | 6/2007 | Palacios | |
| 2007/0162411 A1 | 7/2007 | Kupershmidt et al. | |
| 2007/0174247 A1 | 7/2007 | Xu et al. | |
| 2008/0016052 A1 | 1/2008 | Frieden | |
| 2008/0016072 A1 | 1/2008 | Frieden et al. | |
| 2008/0016098 A1* | 1/2008 | Frieden et al. ................. | 707/102 |
| 2008/0040181 A1 | 2/2008 | Freire et al. | |
| 2008/0097816 A1 | 4/2008 | Freire et al. | |
| 2008/0114778 A1 | 5/2008 | Siegel | |
| 2008/0133488 A1 | 6/2008 | Bandaru et al. | |
| 2008/0140679 A1 | 6/2008 | Deyo et al. | |
| 2008/0172399 A1 | 7/2008 | Chi et al. | |
| 2008/0256443 A1 | 10/2008 | Li et al. | |
| 2008/0270220 A1* | 10/2008 | Ramer et al. ..................... | 705/10 |
| 2009/0012991 A1 | 1/2009 | Johnson et al. | |

(Continued)

OTHER PUBLICATIONS

U.S. Appl. No. 12/485,036, filed Jun. 15, 2009, Mianji, Marty.

(Continued)

*Primary Examiner* — Belix M Ortiz Ditren
(74) *Attorney, Agent, or Firm* — Alston & Bird LLP

(57) ABSTRACT

Some embodiments of the invention provide a method for tagging and searching for content. In some embodiments, a tagging mechanism is provided that allows the creation of tag chains for tagging content. In some embodiments, once the content is tagged, a search tool is provided that allows the search for content, through the search for tag chains.

21 Claims, 62 Drawing Sheets

(56) References Cited

U.S. PATENT DOCUMENTS

| | | |
|---|---|---|
| 2009/0043781 A1 | 2/2009 | Kim et al. |
| 2009/0049019 A1 | 2/2009 | Su et al. |
| 2009/0064093 A1 | 3/2009 | Boyle et al. |
| 2009/0083278 A1 | 3/2009 | Zhao et al. |
| 2009/0164267 A1 | 6/2009 | Banatwala et al. |
| 2009/0164884 A1 | 6/2009 | Watson |
| 2009/0172510 A1 | 7/2009 | Schachter |
| 2009/0198642 A1 | 8/2009 | Akkiraju et al. |
| 2009/0216867 A1 | 8/2009 | Pusateri et al. |
| 2009/0222400 A1 | 9/2009 | Kupershmidt et al. |
| 2009/0281970 A1 | 11/2009 | Mika et al. |
| 2010/0088583 A1 | 4/2010 | Schachter |
| 2010/0262949 A1 | 10/2010 | Jacobsen et al. |

OTHER PUBLICATIONS

U.S. Appl. No. 12/485,037, filed Jun. 15, 2009, Mianji, Marty.

Portions of prosecution history of U.S. Appl. No. 12/485,037, Jan. 10, 2013, Mianji, Marty.

Portions of prosecution history of U.S. Appl. No. 12/485,036, Jun. 10, 2012, Mianji, Marty.

Portions of prosecution history of U.S. Appl. No. 12/485,039, Jun. 4, 2012, Mianji, Marty.

Abolhassani, Hassan, et al., "On Ontology Alignment Experiments," Webology, Sep. 2006, pp. 1-22, vol. 3, No. 3.

Abowd, Gregory D., et al., "The Family Video Archive: An annotation and browsing environment for home movies", MIR '03, Nov. 7, 2003, pp. 1-8, Berkeley, CA.

Author Unknown, The American Heritage College Dictionary, 4th Edition, Month Unknown, 2002, pp. 914 and 1072, Houghton Mifflin Co., Boston, MA.

Author Unknown, "Hyponymy", Wikipedia, downloaded on Feb. 10, 2012 from: http://en.wikipedia.org/wiki/Hyponymy, 2 pages.

Author Unknown, "Microsoft Computer Dictionary", 5th Edition, Month Unknown, 2002, pp. 27, 67-69, 199-200, 368, and 381, Microsoft Press, Redmond, WA.

Brooks, Christopher H., et al., "Improved Annotation of the Blogosphere via Autotagging and Hierarchical Clustering", WWW 2006, May 23-26, 2006, pp. 625-631, Edinburgh, Scotland.

Chen, Hao, et al., "Bringing Order to the Web: Automatically Categorizing Search Results," CHI 2000, Apr. 1-6, 2000, pp. 145-152, vol. No. 2, Issue No. 1, ACM, Amsterdam, Netherlands.

Dumais, Susan, et al., "Optimizing Search by Showing Results in Context," SIGCHI 2001, Mar. 31-Apr. 4, 2001, pp. 277-284, vol. No. 3, Issue No. 1, ACM, Seattle, WA.

Khan, Latifur, et al., "Retrieval effectiveness of an ontology-based model for information selection", The VLDB Journal, Month Unknown, 2004, pp. 71-85, vol. 13.

Kohlschutter, Christian, et al., "Using Link Analysis to Identify Aspects in Faceted Web Search", SIGIR 2006 Workshop on Faceted Search, Aug. 10, 2006, pp. 1-5, Seattle, WA.

Krulwich, Bruce, et al., "Learning user information interests through the extraction of semantically significant phrases", AAAI Technical Report SS-96-05, Month Unknown, 1996, AAAI, pp. 110-112.

Laniado, David, et al., "A Semantic Tool to Support Navigation in a Folksonomy", HT '07, Sep. 10-12, 2007, pp. 153-154, Manchester, United Kingdom.

Laniado, David, et al., "Using WordNet to turn a folksonomy into a hierarchy of concepts", Proc. of the 4th Italian Semantic Web Workshop, Month Unknown, 2007, pp. 192-201, Bari, Italy.

Makris, Christos, et al., "Category ranking for personalized search," Data & Knowledge Engineering 60, Jan. 2007, pp. 109-125, vol. No. 60, Issue No. 1, Elsevier B.V.

Marchetti, Andrea, et al., "SemKey: A Semantic Collaborative Tagging System," WWW2007, May 8-12, 2007, pp. 1-9, Banff, Canada.

Markines, Ben, et al., "Bookmark Hierarchies and Collaborative Recommendation", Proc. AAAI Conf., Month Unknown, 2006, pp. 1-6.

Mikroyannidis, Alexander, "Toward a Social Semantic Web", Computer, Nov. 2007, pp. 113-115, vol. 40, Issue 11, IEEE Computer Society.

Xu, Zhichen, et al., "Towards the Semantic Web: Collaborative Tag Suggestions," Proceeding of the Collaborative Web Tagging Workshop at the 15th International World Wide Web Conference, Month Unknown, 2006, pp. 1-8, CiteSeer.

\* cited by examiner

|   | TAG1 | TAG2 | TAG3 | TAG4 | TAG5 |
|---|---|---|---|---|---|
| 1 | J |   |   |   |   |
| 2 | B | E | D |   |   |
| 3 | A | C |   | I |   |
| 4 | F | H | G |   |   |
| 5 |   |   |   |   |   |
| 6 |   |   |   |   |   |

METHOD AND APPARATUS FOR SUBMITTING, ORGANIZING, AND SEARCHING FOR CONTENT

CLAIM OF BENEFIT TO PRIOR APPLICATION

This application claims the benefit of U.S. Provisional Application 61/311,288, entitled "Method and Apparatus for Submitting, Organizing and Searching for Content", filed Mar. 5, 2010, which is incorporated herein by reference.

BACKGROUND

Recent significant shifts in technology have greatly changed the traditional means by which information is communicated. In addition to journalists who disseminate credible news, other individuals now have the forum to share news and opinions with the world. For instance, there are approximately fifty million 'blogs' on the internet that disseminate news related information; and at the end of those articles, consumers post comments, delivering their opinions on the subject matter. In addition, with the advent of social networking sites such as Facebook, Twitter, and MySpace, users post countless message streams on these sites for viewership every day.

In some ways, message streams posted on social networking sites are a more efficient way to disseminate news than traditional ways. While traditional news distributors are more thorough and credible, consumers on social networking sites post news-related comments from mobile devices, hence, information is being disseminated in real time. With rising interest in the many different sorts of ephemeral content being posted on the web daily, there is a need for an efficient means to search these message streams.

Many websites provide a means for searching through content by tagging content. If content is properly tagged with associated tag words, a searcher can locate the content by searching for the tag words. Unfortunately, these tagging mechanisms are inefficient in allowing a user to narrowly search for content. Therefore, there is a need for a system to organize and submit content so that a user can efficiently and narrowly search for the content.

BRIEF SUMMARY

Some embodiments of the invention provide a method for submitting, organizing and searching for content. In some embodiments, this method is implemented by using a web application with Graphical User Interface (GUI) tools. In other embodiments, this method is implemented on a news web page. In other embodiments, this method is implemented on a video sharing website. In other embodiments, this method is implemented on a digital media player.

Some embodiments provide a tagging mechanism for tagging content. In some embodiments, this tagging mechanism includes a means to create content and a tagging tool for tagging content. To tag content, tags and tag chains are created and associated with the content. In some embodiments, tags are created by choosing a string of characters that identify the content, while tag chains are created by using tag calculus to create relationships between various tags. Once the tags and tag chains are specified, content can be tagged and submitted with its tags and tag chains.

Some embodiments provide a search tool that allows searching for posted content. In some embodiments, content can be searched by searching for specific tag chains tagged to the content. The desired chains are searched by creating relationships between tags by using tag calculus, and searching for these relationships within tagged content.

Some embodiments provide a digest tool that provides tag suggestions. In some embodiments, the tool analyzes text and provides feedback to the user as to the best tags to use based on previously submitted content and tags.

In conjunction with this tagging capability, or instead of it, some embodiments provide sponsored or featured tags. In some embodiments, these tags are a special category of tags that are highlighted, marked, and/or prominently placed to differentiate them from other tags. Different entities (e.g., people, companies, organizations) can use these special tags for different purposes such as to advertise products or services, to perform market researches, etc. For example, a company doing market research (e.g., about the quality of its products) may pose a question in the form of a keyword and pay a fee to have the keyword displayed at the top of a list.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 17 illustrates an example opinion GUI after the Originator button in the Popular Tags section is selected.

FIG. 19 illustrates an example opinion GUI after the Date Range button in the Popular Tags section is selected.

FIG. 21 illustrates an example opinion GUI after the Apply Filters button is selected to filter the tags by date range.

Figure 23:
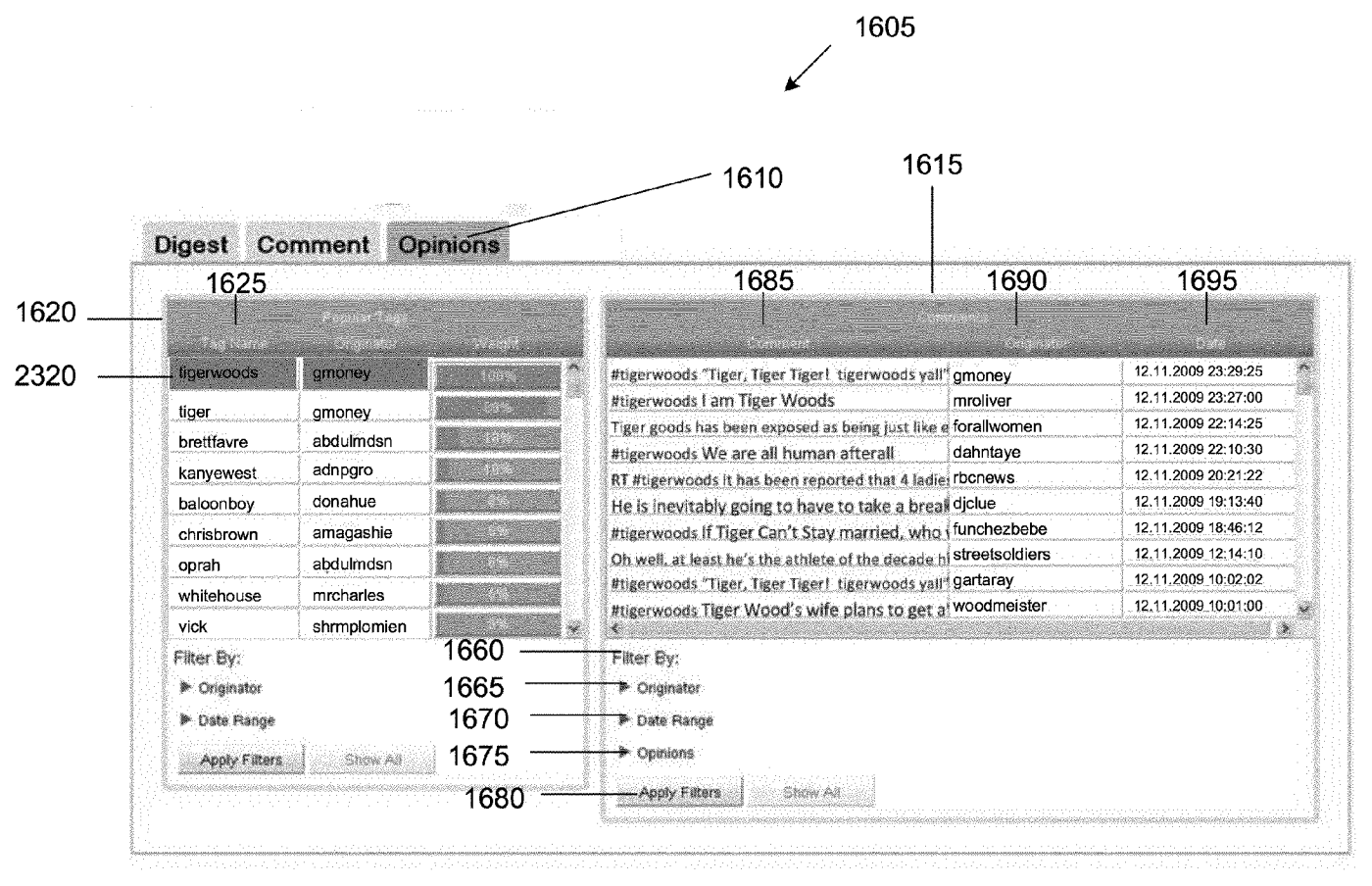

FIG. 23 illustrates an example opinion GUI after a tag is selected.

FIG. 24 illustrates an example opinion GUI after the Originator button in the Comments section is selected.

FIG. 30 illustrates an example opinion GUI after the Opinions button in the Comments section is selected.

FIG. 43 illustrates the beginning of an example New York Times ("NYT") blog.

FIG. 45 illustrates the bottom portion of comments section of an example NYT blog at first glance.

FIG. 46 illustrates NYT blog after a comment is entered into the digestion tool and the Digest button is selected to receive feedback regarding related tags.

FIG. 61 illustrates a Hierarchy table that creates tag hierarchies among various tags.

DETAILED DESCRIPTION

Figure 1:
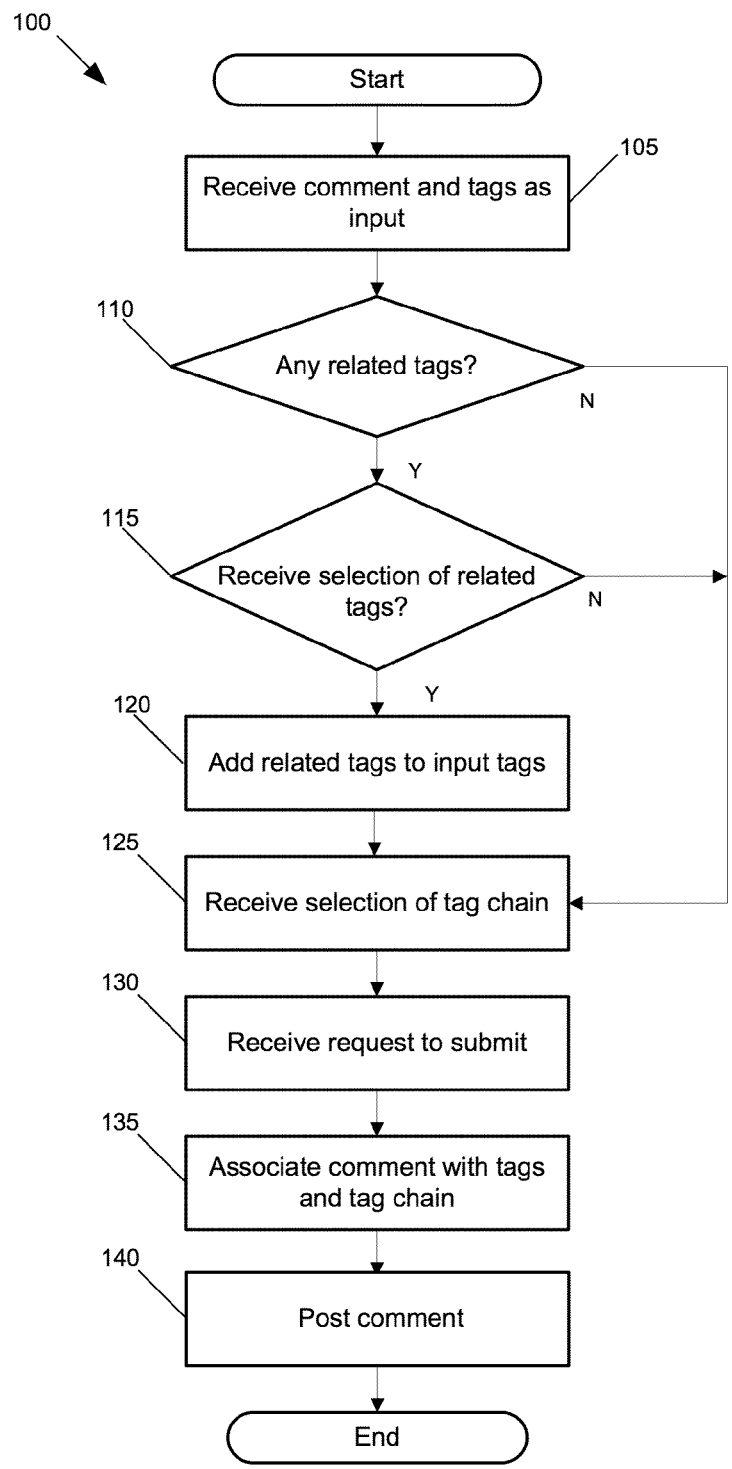
FIG. 1 conceptually illustrates an example of a process that some embodiments use to submit and tag content.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed below.

Some embodiments of the invention implement a method for submitting, organizing, and searching for content. Such content will be referred to below as searchable content, examples of which include documents (e.g., articles, websites, news, books, etc.), video (e.g., movies, documentaries, shows or any other professional or amateur video clips), music (e.g., songs, albums, etc.) and various forms of ephemeral content on networking websites (e.g., Twitter, Facebook, MySpace, etc.). In some embodiments, searchable content is labeled and identified by tags. Tags are words or phrases associated with searchable content that allow a user to find the searchable content using the words or phrases.

The above-described tags are combinable to form composite objects called tag chains. These tag chains help further define content. Specifically, tag chains are groupings of tags that are maintained in the form of a list. Tag chains describe relationship between tags; therefore, since tags label and describe content, tag chains implicitly label and describe content as well. Some embodiments allow the use of tag calculus to create these tag chains. In some embodiments, tag calculus provides novel tag relationship operators that convey different relationships between each tag in the tag chain (e.g., a first tag in the tag chain describes the content better than a second tag in the tag chain). Accordingly, by using tag calculus, the user can create a set of relationships that define the content more narrowly than each individual tag. Hence, the content can be easily searched and easily connected with other related content based on its associated tag chains.

Some embodiments of the invention implement a method for submitting, organizing, and searching for content with an example client web application using a graphical user interface ("GUI") to submit, organize, and search for content. FIGS. 2-6, 8-14, 16-28, and 30-42 illustrate various example GUIs of the example application of some embodiments of the invention. This example application implements a GUI for posting, tagging and searching messages on a social networking website such as Twitter. It also implements a GUI for retrieving tagging suggestions based on previously submitted large or ephemeral written content on the website.

Although some embodiments show these processes being implemented on a sample web interface, one of ordinary skill in the art will realize that many of these processes can be used together or separately in a large number of other arenas and scenarios. In addition, these processes can be used through client applications on any platform, system and device. For example, the client application can be used on smart phones, web browsers, and desktop clients. Accordingly, after the discussion of the example web application, FIGS. 43-57 illustrate additional implementations of the method for submitting, organizing, and searching for content in some embodiments of the invention.

Several more detailed embodiments of the invention are described in the sections below. Section I describes a method for submitting, organizing and searching for content on an example client web application using a GUI. Section II describes other implementations of the method in some embodiments. Section III describes sponsored or featured tags. This discussion is followed by Section IV that describes creating tag hierarchies. Lastly, Section V describes a computer system with which some embodiments of the invention are implemented.

I. Example Client Application

Some embodiments of the invention implement a method for submitting, organizing, and searching for content with an example client web application using a GUI. The following is a description of three different parts of the example web application of some embodiments illustrated in FIGS. 2-6, 8-14, 16-28 and 30-42. The three parts are: Comment GUI, Opinion GUI, and Digest GUI. The GUI shown in the figures below may be part of a larger GUI with decorative or functional features. The GUI may also be accessed through the internet or be part of a web page.

A. Comment GUI

As described above, some embodiments provide the GUI tools to tag and submit searchable content. FIG. 1 conceptually illustrates a process 100 of some embodiments for tagging and submitting content. Process 100 will be described by reference to FIGS. 2-14 which illustrate an example user interface interaction in which a user tags and submits content.

Figure 2:
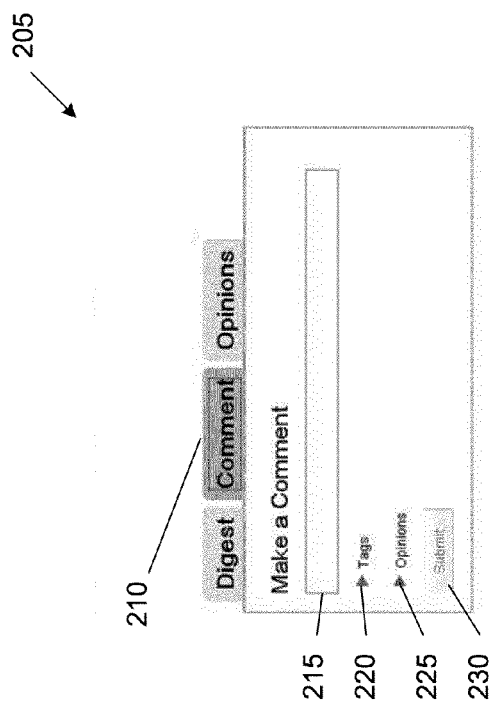
FIG. 2 illustrates an example comment graphical user interface ("GUI") at first glance for an example application of some embodiments of the invention.

FIG. 2 illustrates a comment GUI 205 for an example client application of some embodiments of the invention. Specifically, FIG. 2 illustrates a GUI 205 that provides the tools to tag and submit content. As shown in FIG. 2, the GUI 205 includes comment tab 210, text box 215, Tags button 220, Opinions button 225 and Submit button 230.

The user arrives at the comment GUI 205 by selecting the comment tab 210. Once on comment GUI 205, a text box 215 is provided for the user to make a comment (i.e. submit content). Tags button 220 and Opinions button 225 are buttons that lead to drop down menus. Specifically, a user selection of button 220 reveals a menu that allows the user to select related tags. Also, a user selection of the button 225 reveals a menu that allows the user to create relationships between the tags. Both of these buttons 220 and 225 are not selected in the example of FIG. 2. Submit button 230 allows the user to submit the comment, its tags and tag chains for posting. Here, the Submit button 230 is not highlighted because no text has been entered for submission.

Figure 3:
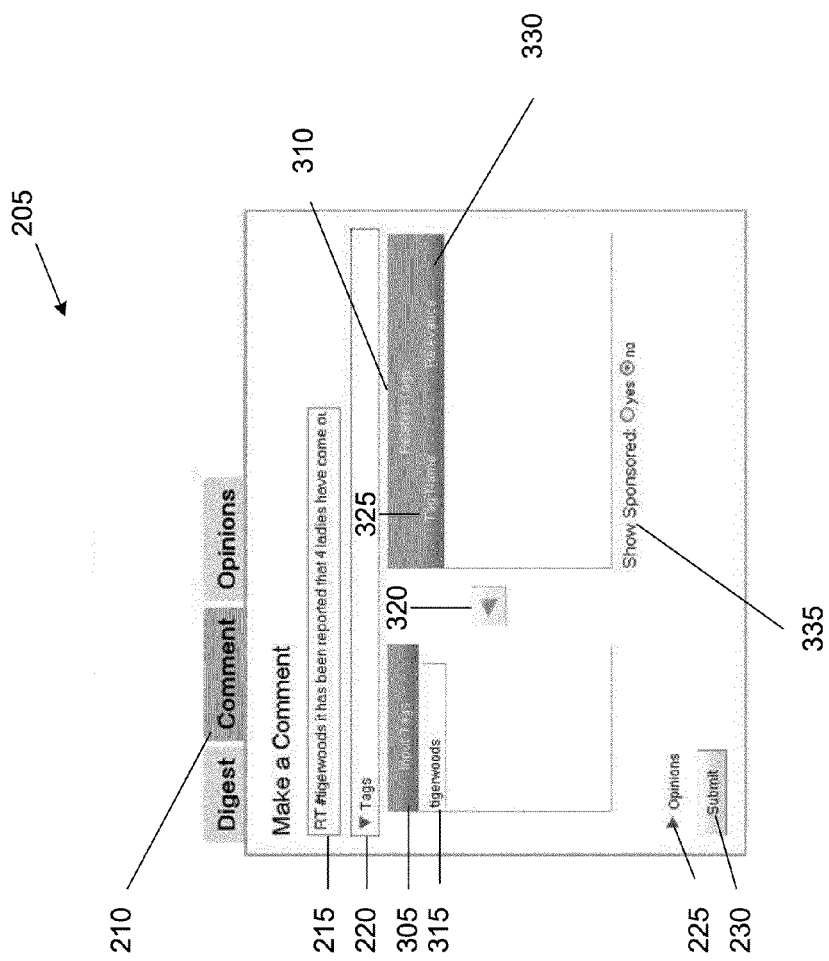
FIG. 3 illustrates an example comment GUI after a comment has been entered and the Tags button has been selected.

FIG. 3 illustrates GUI 205 after the user enters text into text box 215 and selects Tags button 220. The selection of Tags button 220 causes the GUI 205 to display several user interface items. These user interface items include a select button 320, an Input Tags column 305, and a Related Tags section 310. The Related Tags section includes a Tag name column 325 and a Relevance column 330. The GUI 205 also displays a set of user interface controls 335 for showing sponsored tags.

Input Tags column 315 displays a list of keywords, topics, or tag names that the user may select to create tag chains. In some embodiments, this column automatically inherits all tags manually created by the user. Manually creating tags will be further discussed below in reference to FIG. 3. Once an input tag is selected from Input Tags column 315, Tag name column 325 displays or holds the names of tags related to the input tag. Related tags may be selected to become an input tag by selecting them from Tag name column 325 and selecting select button 320.

Figure 4:
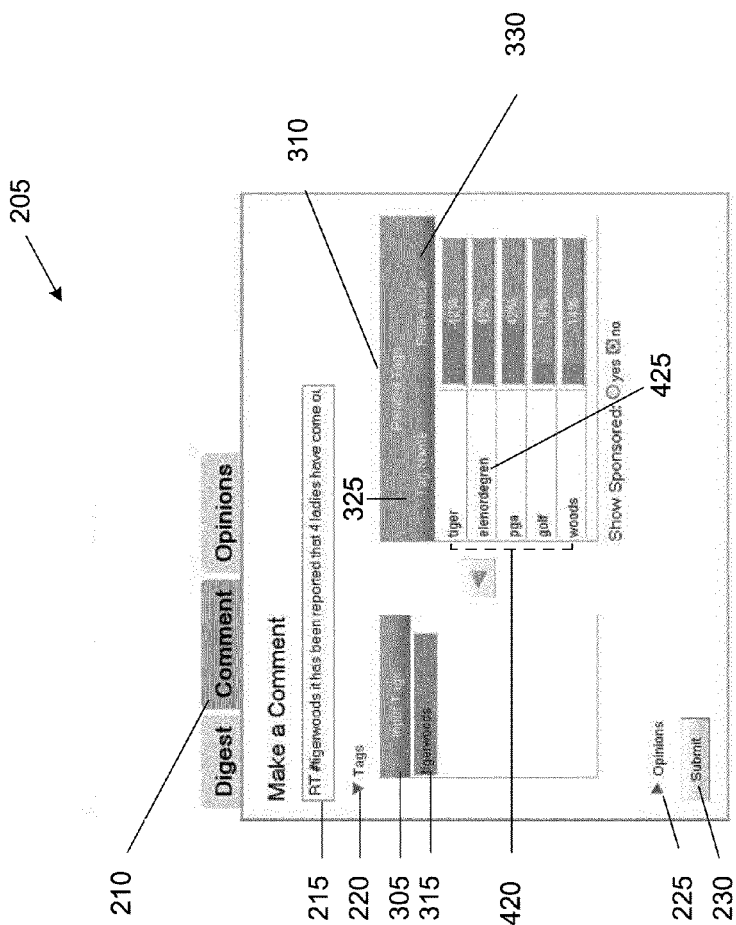
FIG. 4 illustrates an example comment GUI after an input tag has been selected.

In some embodiments, while Tag Name column 325 displays a list of tags that may be related to the created tag 315, the Relevance column 330 displays how relevant each related tag is to the created tag 315. Stated otherwise, the application measures the relatedness between the related tags and the created tag 315, quantifies the relatedness as a percentage and displays this percentage in the Relevance column 330, as shown in FIG. 4. This percentage can be defined as the number of instances that a particular related tag is used in conjunction with the created tag 315 divided by the number of instances the created tag 315 is used.

The purpose of the Relevance column 330 is to inform the user of the popularity of each related tag. The popularity of a tag may be a good indication of how frequently the tag is searched. This information can be used as a guide to determine whether to use additional tags, and if so, which additional tags to use. In some embodiments, additional input tags can either be manually created or selected from the list of related tags in Tag Name column 325.

The set of user interface controls 335 allows a user to show or hide sponsored tags. In the example illustrated FIG. 3, the set of user interface controls 335 includes radio buttons for displaying or hiding sponsored or featured tags. A user can select a button marked "yes" to display any sponsored tags at the top of a keyword list. The user can also select a button marked "no" to hide any sponsored tags.

In some embodiments, the set of user interface controls 335 is an optional component of the tagging mechanism. That is, a user may not be presented with such controls to hide or reveal sponsored tags. In this way, different sponsored tags are consistently or always prominently featured amongst other tags in a keyword display area. Several example sponsored tags will be described in FIGS. 58-60 below.

Returning to FIG. 1, the process 100 begins when the process receives (at 105) a tagged comment. Once a comment is entered in the comment field 215 as illustrated in FIG. 3, submit button 230 is highlighted. In the example of FIG. 3, the user inputs or writes a comment on golfer Tiger Woods and tags it. In some embodiments, a tag can be created by combining a string of characters and a '#' sign, the '#' sign preceding the string of characters. In this example, the user chooses the tag "tigerwoods" as a tag for the comment. Hence, "#tigerwoods" is used to tag the remainder of the text, which is the content. In some embodiments, the user can choose any available string of characters for a tag, however, the more recognizable and relevant the tag is, the easier it may be to search.

In the example of FIG. 3, the user also selects the Tags button 220. In some embodiments, selecting button 220 presents a drop down menu that displays two columns: the Input Tags column 305 and the Related Tags column 310. As shown in FIG. 3, the Input Tags column 305 inherits whatever tag the user creates. In this case, the Input Tags column 305 inherits input tag 315 "tigerwoods."

Returning to FIG. 1, after the process receives (at 105) a created tag, it then determines (at 110) whether there are any related tags. If there are no related tags, only created tags will be used as input tags to create tag chains. In the example of FIG. 4, input tag (created tag) 315 has related tags. FIG. 4 illustrates comment GUI 205 after the user selects input tag 315 in Input Tags column 305. Upon selecting tag 315, two columns of information are displayed underneath the Related Tags column 310: Tag Name column 325 and Relevance Column 330.

In some embodiments, the Tag Name column 325 displays a list of tags 420 that may be related to the created tag 315, while the Relevance column 330 displays how relevant each related tag is to created tag 315. This relevance is quantified as a percentage that can be defined as the number of instances that a particular related tag is used in conjunction with the created tag 315 divided by the number of instances the created tag 315 is used. Hence, referring to FIG. 4, related tag 425 "elenordegren" is used as a tag in conjunction with created tag 315 "tigerwoods" 42% of the instances created tag 315 "tigerwoods" is used as a tag.

Figure 5:
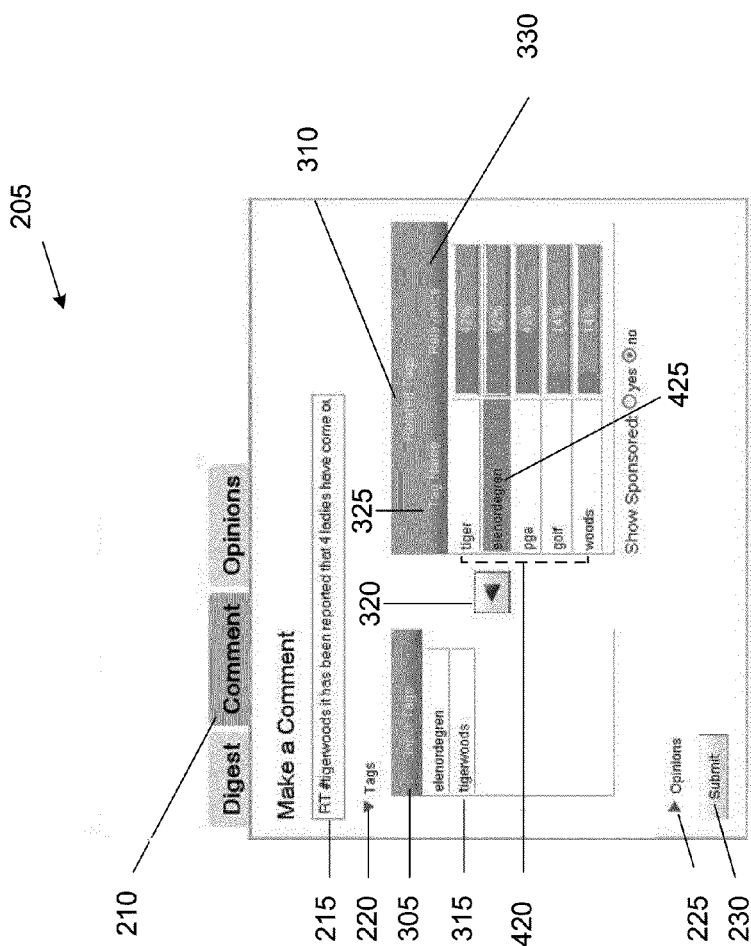
FIG. 5 illustrates an example comment GUI after a first related tag has been selected as an input tag.
Figure 6:
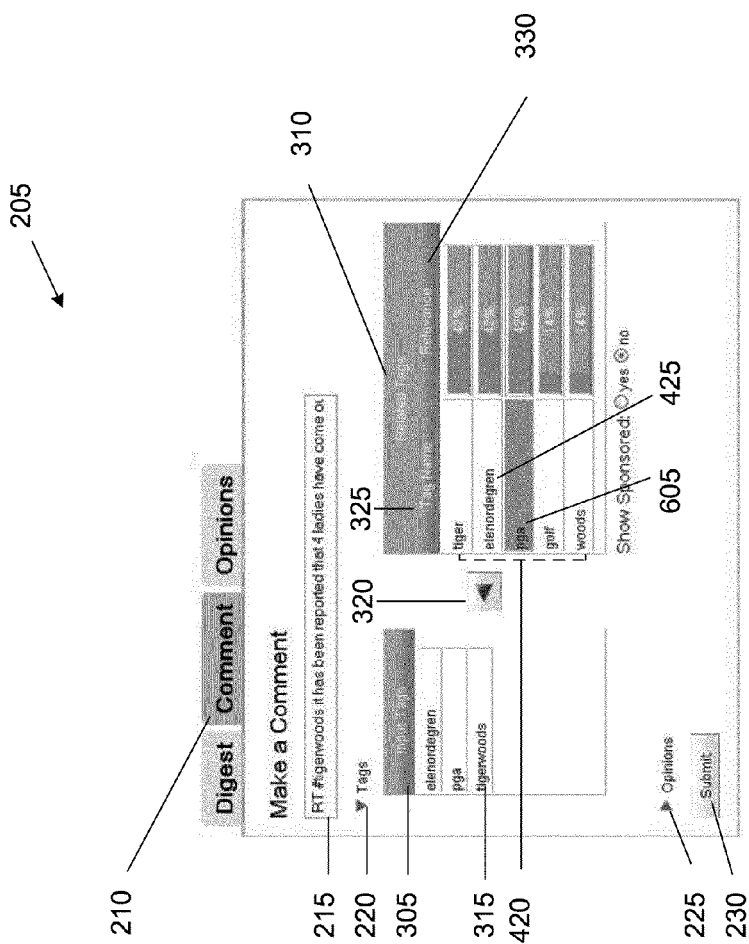
FIG. 6 illustrates an example comment GUI after a second related tag has been selected as an input tag.

Returning to FIG. 1, the process 100 determines (at 115) whether any related tags have been selected as additional input tags. If related tags are selected, the process 100 adds (at 120) the related tags to the input tag (e.g., to the input tag column). FIG. 5 and FIG. 6 illustrate the comment GUI 205 in which the user selects one of related tags 420 as an input tag. In the example of FIG. 5, the user selects related tag 425 "elenordegren" as an input tag. To select the tag, the user selects the tag in Tag Name column 325. Upon selecting related tag 425, related tag 425 and select button 320 are highlighted. In some embodiments, if the user selects the select button 320, the related tag 425 becomes an input tag that is displayed in the Input Tags column 305 as illustrated in the example of FIG. 5. In the example of FIG. 6, the user selects related tag 605 "pga" to be a third input tag as described above in reference to FIG. 5.

Returning to FIG. 1, once the user has selected input tags, the process 100 receives (at 125) a selection of a tag chain. In some embodiments, the selection causes the tag chain to be created. For example, different user can elevate their commentaries and bring them to the attention of others by creating structured definitions of what they are trying to say. In some embodiments, this is done by creating tag chains (e.g., by specifying tag relationships using tag calculus).

In some embodiments, tag calculus is built or defined by connecting tags using operators and organizing into chains. Each chain encapsulates one or more ideas. Each link in a chain might have two tags (two operands) which are connected using a "binary operator" such as ">", a single tag (one operand) using a "unary operator" such as "!", or an individual tag by itself (a single operand without any operators). Many operators are available to build tag chains using tag calculus. In some embodiments, such operators include at least an addition operator (+), a pound operator (#), an equal operator (=), a greater than operator (>), a less than operator (<), and a closed operator (< >). Other embodiments include combinations of these operators and other operators. These operators can be used in a variety of combinations between one or more tags (operands) within a tag chain to define relationships between one or more tags. The relationship each above-mentioned operator creates will next be described.

The addition operator (+) requires two or more tags (operands) and signifies that the content is described by the combination of the two or more tags. The pound operator (#) requires only one tag (operand) and signifies that the tag associated with it is included in the tag chain but may not necessarily be related in any meaningful fashion within the context of the content the tag chain describes. The equal operator (=) requires two or more tags (operands) and signifies that within the tag chain that describes the content, the ideas represented by the tags associated with the equal operator are in fact either the same idea or are ideas that should be given the same weight. The greater than operator (>) requires two tags (operands) and signifies that the tag on the left has greater weight within the tag chain than the one on the right. That is, the content being described by the tag chain has more to do with the tag to the left of the operator than the tag to the right of the operator. The less than operator (<) functions the same way as the greater than operator, except the tag on the right has greater weight than the tag on the left. The closed operator (< >) requires only one tag (operand) and indicates that the preceding tag is not associated with the chain. This operator provides a member with the explicit method to specify that the tag chain has nothing to do with the tag associated with the operator. These operators are just a few of many possible operators that users can use to create tag chains.

In some embodiments, a relationship between two tags constitutes or represents a single link in a tag chain and not the entire tag chain. That is, when a tag chain includes multiple tag relationships, a tag relationship between two tags defines a single link rather than the tag chain. Conversely, when the tag chain includes only a single link, the link between two tags represents the entire tag chain. Additionally, in some embodiments, a link of a tag chain or an entire tag chain may be constructed or defined from one single tag (operand) and a unary operator (e.g., "#" operator, "< >" operator).

Figure 7:
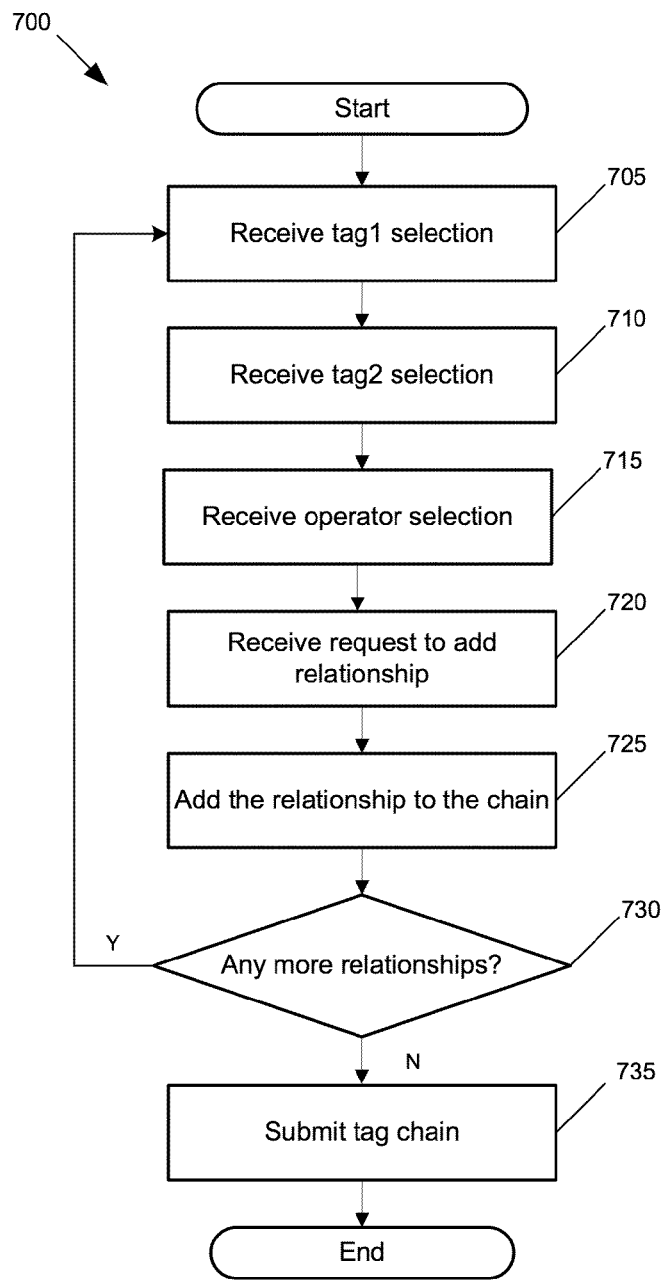
FIG. 7 conceptually illustrates an example of a process that some embodiments use to create tag chains.

In some embodiments, to receive (at 125) a creation of a tag chain, the process 100 proceeds to a process 700 shown in FIG. 7. FIG. 7 conceptually illustrates an example of a process 700 in some embodiments for creating tag chains. To create tag relationships, the process 700 receives (at 705) a selection for a first tag as a first operand, (at 710) a selection for a second tag as a second operand, and (at 715) a selection for an operator. Once the process receives (at 720) a request to add the relationship, the relationship is created (at 725) using the two tags and the selected operator. The process then determines (at 730) whether there are any more relationships to be added to the tag chain. When there are more relationships, the process returns back to operation 705 to receive a selection for a first tag. Once there are no relationships to be added, the tag chain is complete and the chain is submitted (at 735). The process 700 will be further described by reference to FIGS. 8-14.

Figure 8:
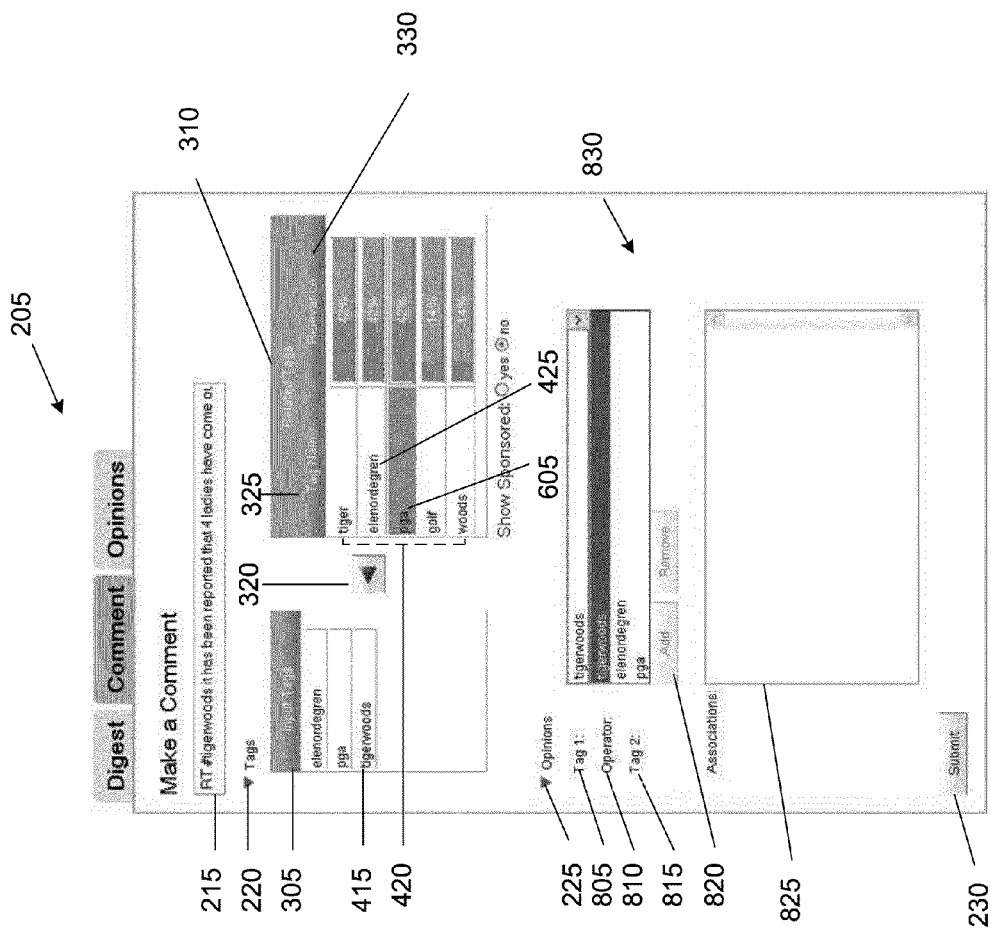
FIG. 8 illustrates an example comment GUI after the Opinions button is selected and a first tag is selected to create a tag relationship.

FIG. 8 illustrates an example GUI 205 in some embodiments of the invention. Specifically, FIG. 8 illustrates the GUI 205 after the Opinions button 225 is selected. Upon a selection of the button 225, the GUI 205 displays or introduces a tagging tool 830 that includes Tag 1 menu 805, Operator menu 810, Tag 2 menu 815, Add button 820, and Associations box 825. In some embodiments, the user is allowed to specify the relationship between two tags by selecting the two tags and the operator associated with the two tags from the drop down menus. Selecting Add button 820 creates the relationship and adds it in plain English in Associations box 825. In some embodiments, a user can add as many relationships as necessary to create a tag chain. These relationships can be added to box 825. Once the chain is complete, selecting Submit button 230 posts the comment, its tags, and its tag chain for viewership.

Figure 9:
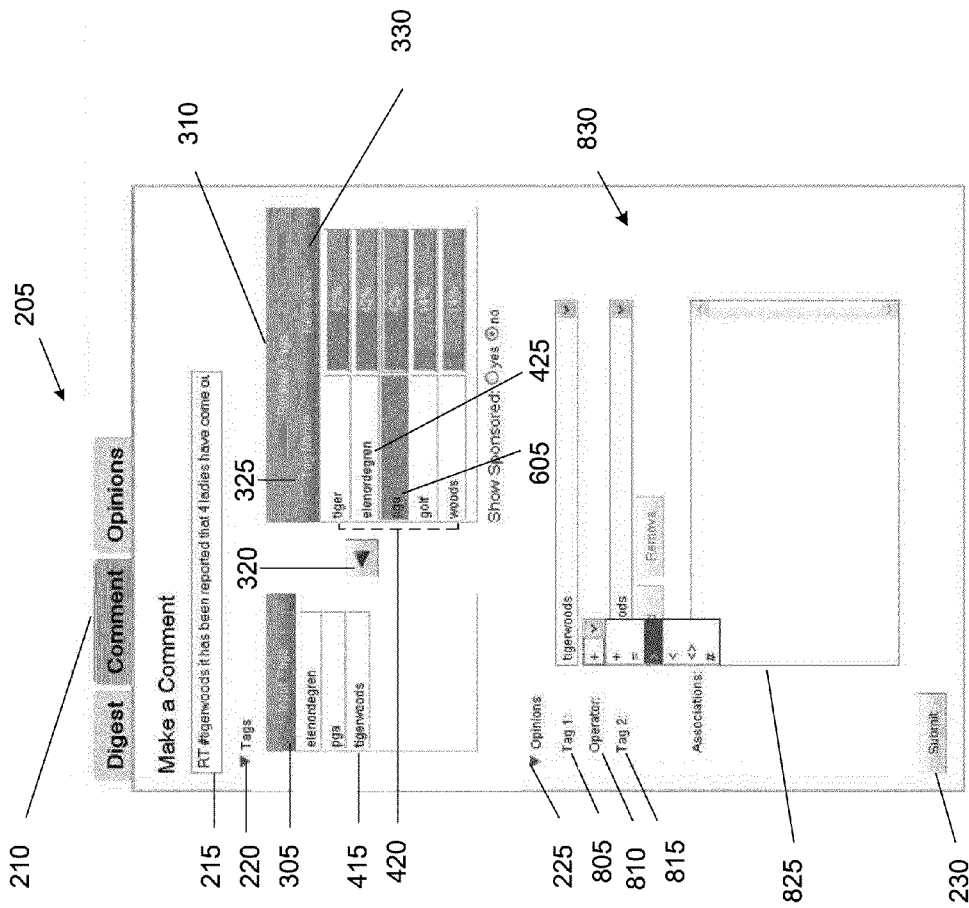
FIG. 9 illustrates an example comment GUI after an operator is selected to create a tag relationship.

In the example of FIG. 8, a first tag "tigerwoods" is selected from the Tag 1 menu 805, which includes the same tags specified in Input Tags column 305. FIG. 9 illustrates comment GUI 205 after the user selects the greater than operator (>) from the Operator menu 810. Finally, FIG. 10 illustrates comment GUI 205 after "elenordegen" has been selected as a second tag from the Tag 2 menu 815, which also includes the same tags specified in Input Tags column 305.

Figure 10:
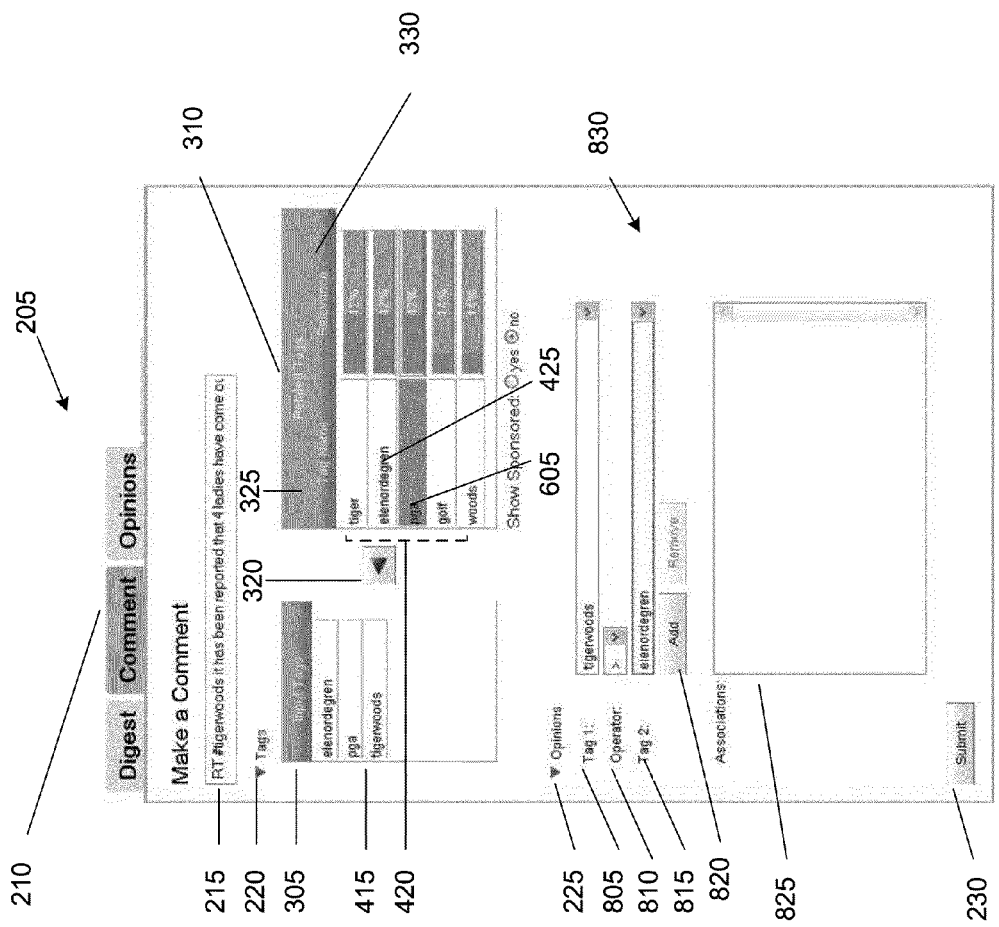
FIG. 10 illustrates an example comment GUI after a second tag is selected to create a tag relationship.
Figure 11:
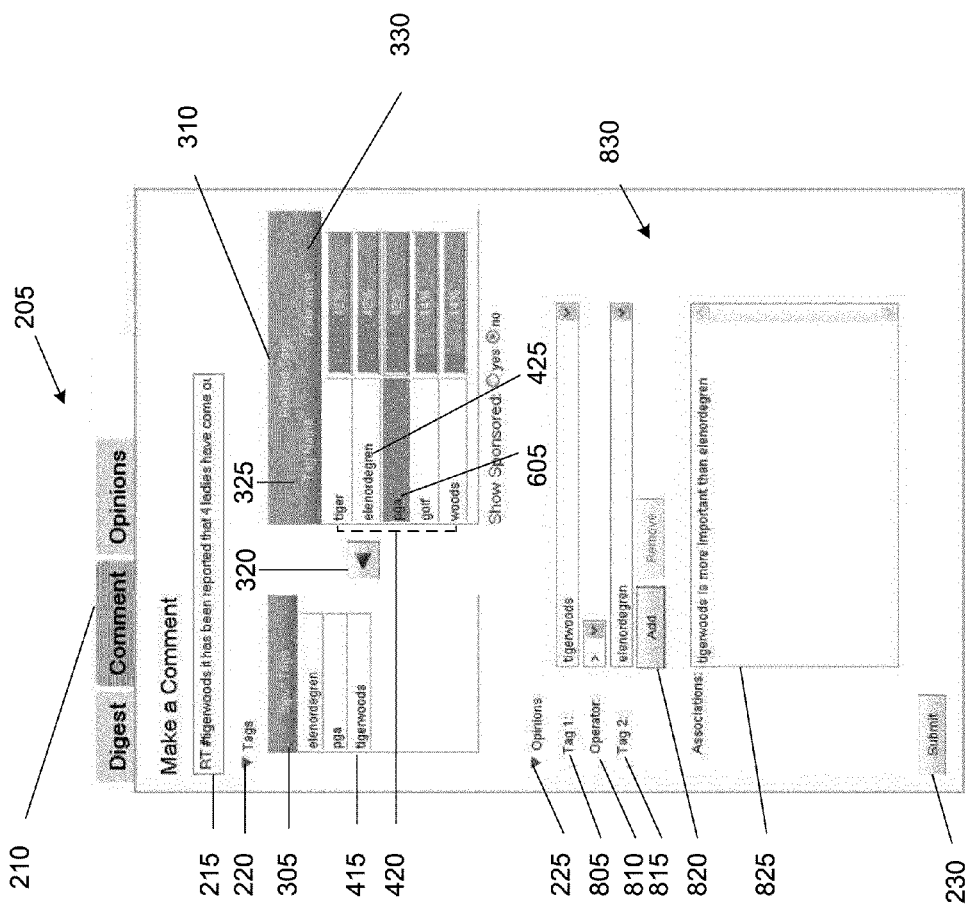
FIG. 11 illustrates an example comment GUI after the Add button is selected to add a first tag relationship to a tag chain.

After the selection of both tags and the operator, as illustrated in FIG. 10, the Add button 820 is highlighted. In some embodiments, the final step of creating a relationship between two tags can be completed by selecting the Add button 820. FIG. 11 illustrates GUI 205 in which the user specifies the relationship between tag "tigerwoods" and tag "elenordegren" by selecting Add button 820. In some embodiments, as displayed in FIG. 11, upon selecting the Add button 820, the Associations text box 825 displays a line of text that states in plain English the relationship between the two previously selected tags created (i.e. "tigerwoods is more important than elenordegren").

Figure 12:
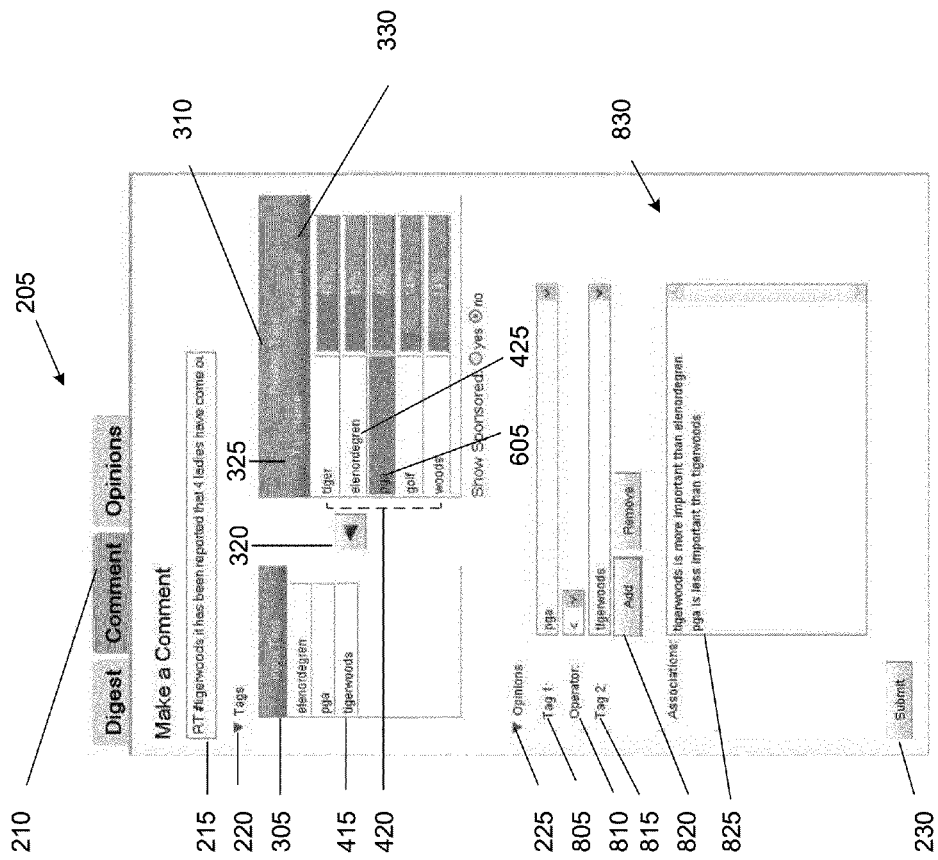
FIG. 12 illustrates an example comment GUI after the Add button is selected to add a second tag relationship to the tag chain.
Figure 13:
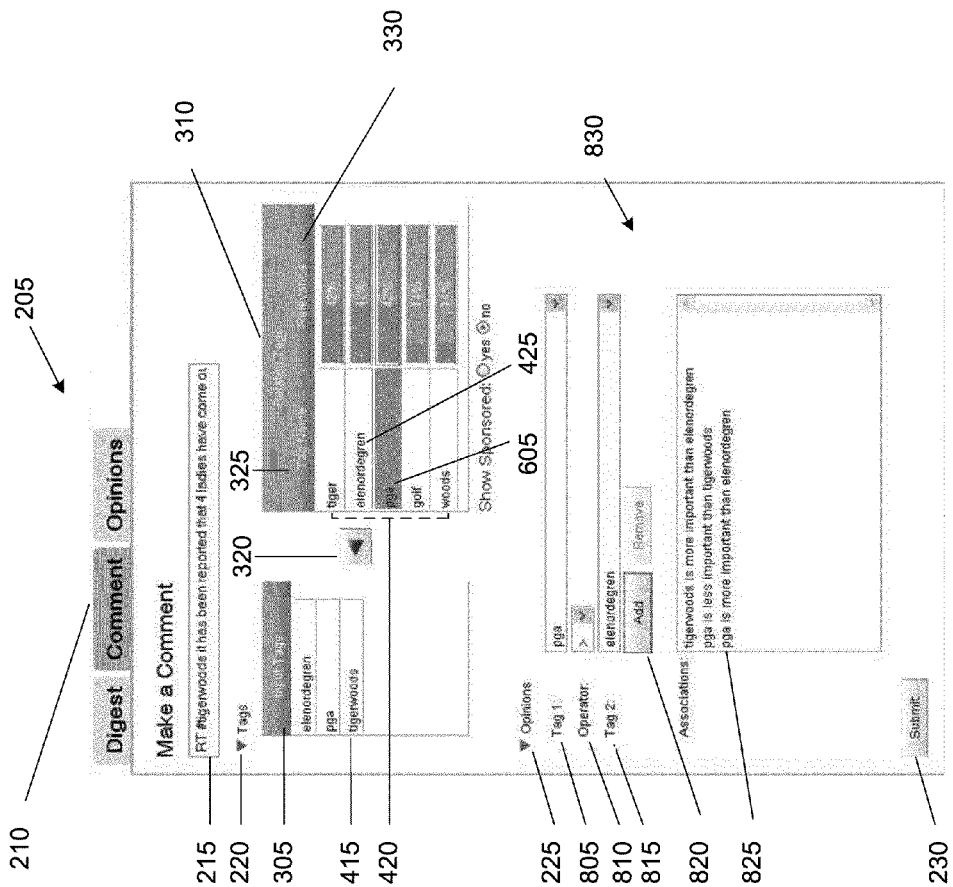
FIG. 13 illustrates an example comment GUI after the Add button is selected to add a third tag relationship to the tag chain.
Figure 14:
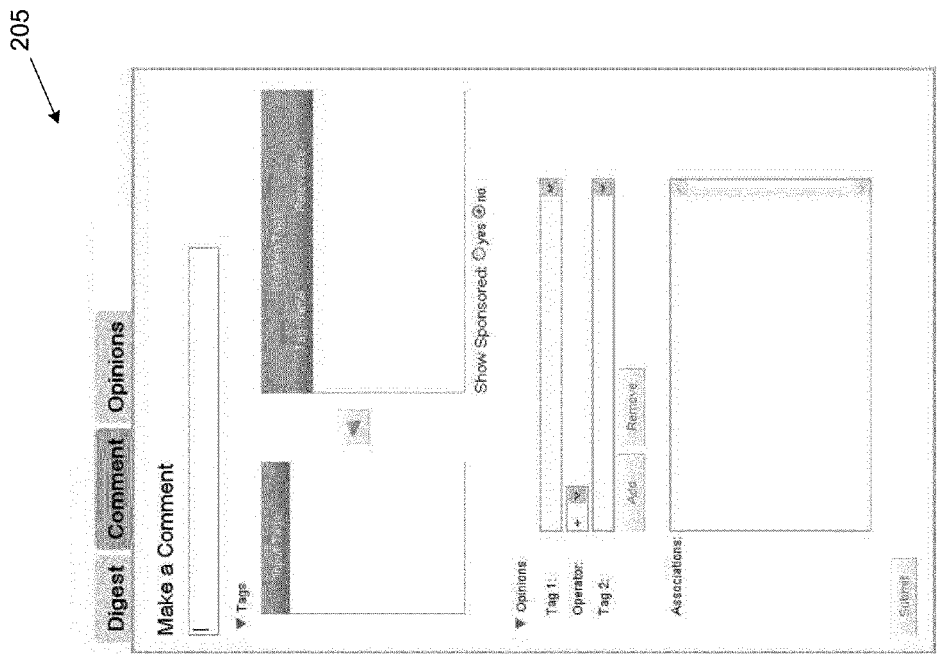
FIG. 14 illustrates an example comment GUI after the Submit button is selected to submit a comment and its tags and tag chain.

FIGS. 12-13 illustrate comment the GUI 205 in which the user specifies two more tag relationships as illustrated in the process 700 described above by reference to FIG. 7. In the example of FIG. 12, the user specifies the relationship between "pga" and "tigerwoods" (i.e. "pga is less important than tigerwoods"). In the example of FIG. 13, the user specifies the relationship between "pga" and "elenordegren" (i.e. "pga is more important than elenordegren"). In some embodiments, the user may specify as many relationships between the available input tags as necessary. Once completed, this list of specified relationships is known as a tag chain. When the tag chain is complete, the user can submit the content with its associated tags and tag chain for posting by selecting submit button 230 as illustrated in operation 735 in reference to FIG. 7. In some embodiments, once the user selects the Submit button 230, comment GUI 205 is cleared for subsequent postings as illustrated in comment GUI 205 of FIG. 14.

B. Opinion GUI

Figure 15:
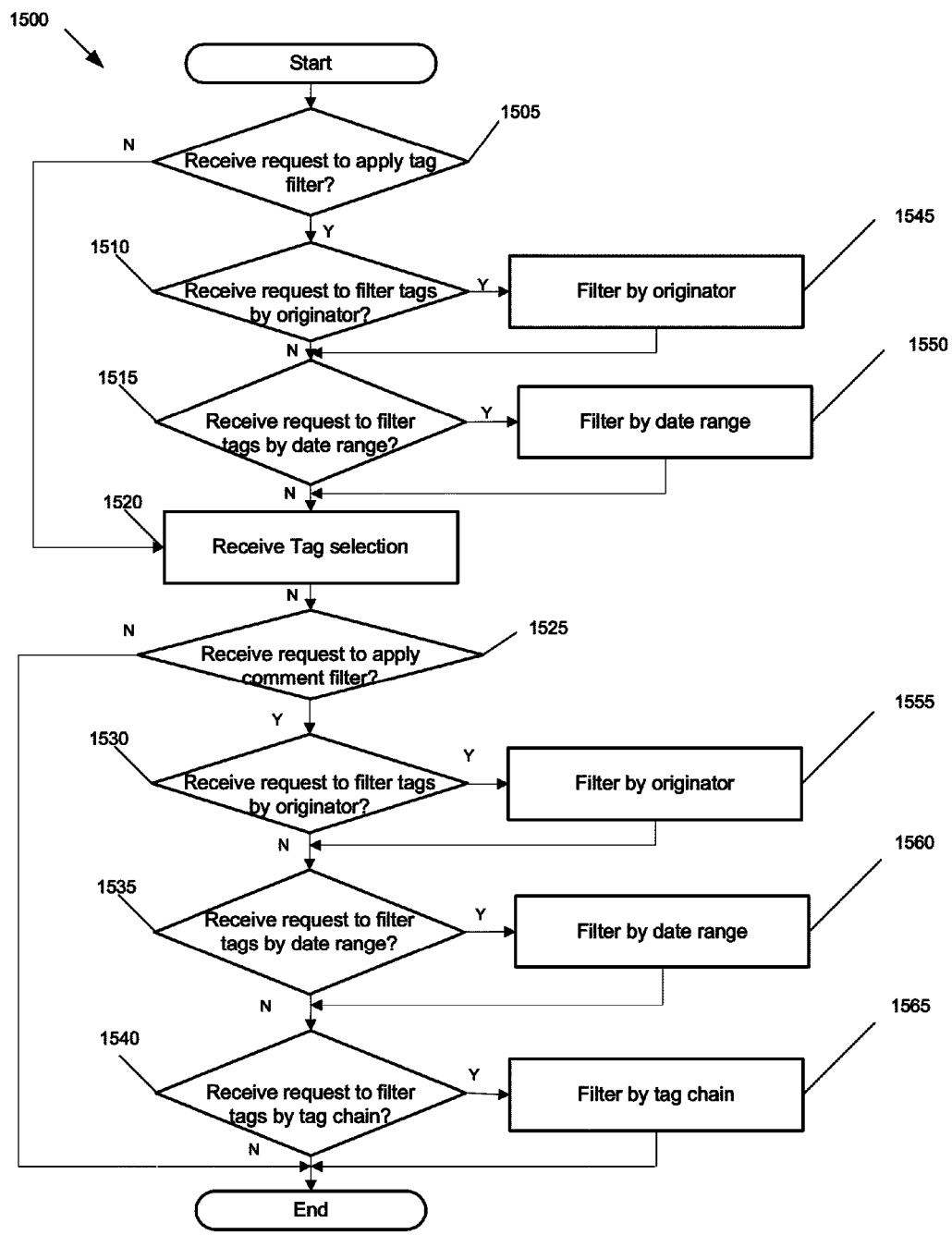
FIG. 15 conceptually illustrates an example of a process that some embodiments use to search tagged content.

Some embodiments of the invention provide GUI tools to search for tagged content. FIG. 15 conceptually illustrates a process 1500 of some embodiments for searching for content. Process 1500 will be described by reference to FIGS. 16-38, which illustrate an example user interface interaction in which the user searches for tagged content.

Figure 16:
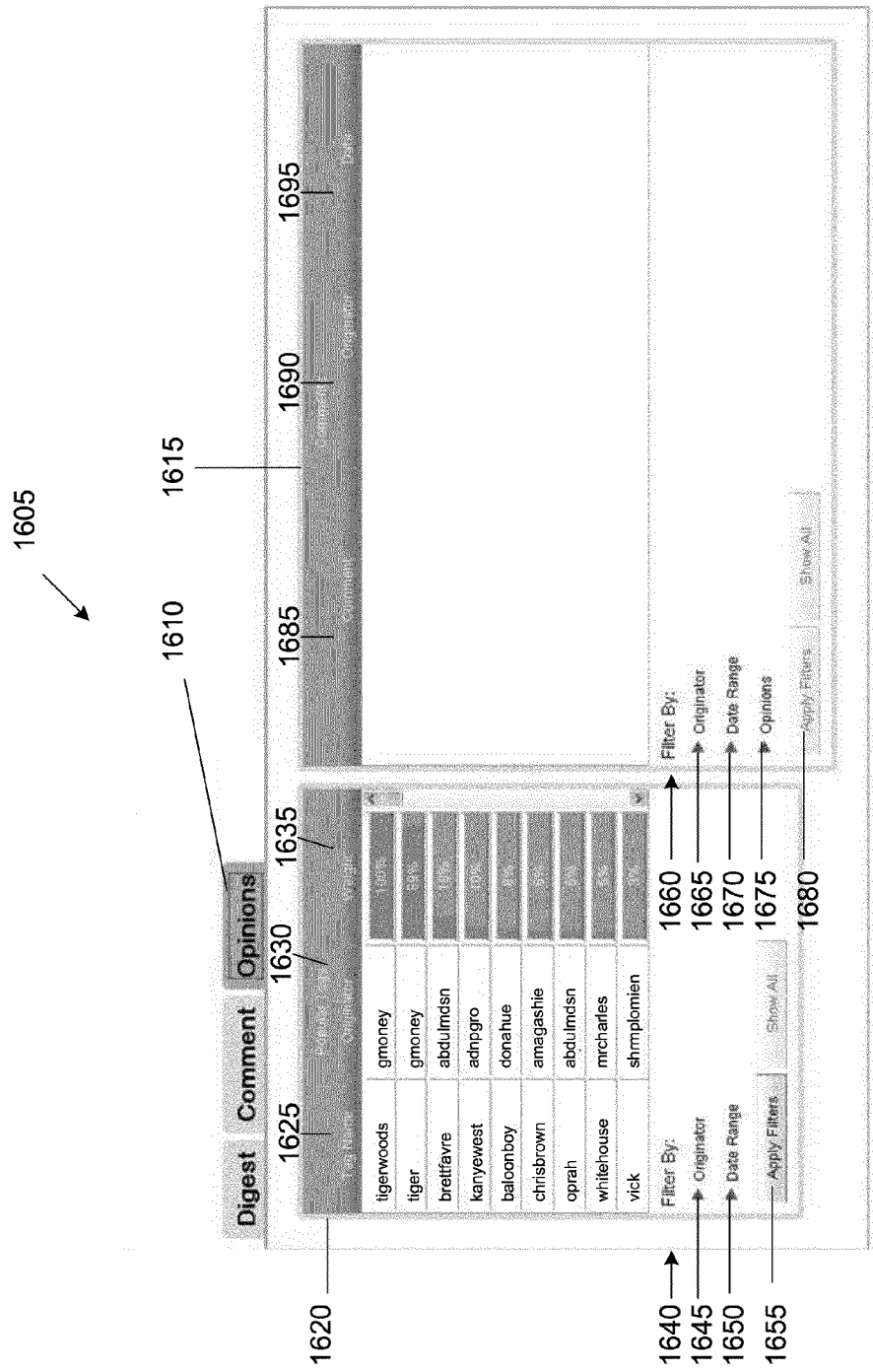
FIG. 16 illustrates an example opinion GUI at first glance for an example application of some embodiments of the invention.

FIG. 16 illustrates an opinions GUI 1605 of some embodiments that provides the tools to search for content. As shown in FIG. 16, the GUI 1605 includes an Opinion tab 210, a Popular Tags display area 1620, and a Comments display area 1615. The display area 1620 includes three columns: Tag Name column 1625, Originator column 1630 and Weight column 1635. In addition, Popular Tags display area 1620 includes a "Filter By" section 1640 that includes an Originator button 1645, a Date Range button 1650, and an Apply Filters button 1655. Comments display area 1615 also includes three columns: Comment column 1685, Originator column 1690 and Date column 1695. In addition, Comments display area 1615 includes a "Filter By" section 1660. The "Filter By" section 1660 includes an Originator button 1665, a Date Range button 1670, an Opinions button 1675, and an Apply Filters button 1680.

The user arrives at the Opinions GUI 1605 by selecting the Opinions tab 1610. Column 1625 holds the names of tags previously used to tag comments. In some embodiments these tag names are names used to tag comments in a certain allotted period of time (e.g. in the last 24 hrs). In this example, the tag names are arranged in order of popularity, starting from a most popular to a least popular. Column 1630 holds the names of the users who created the tags listed in column 1625. Lastly, Column 1635 displays the popularity of the tags listed in column 1625 as a percentage value. The list of tags in column 1625 can be filtered by using the buttons included in "Filter By" section 1640. Selecting the button 1645 and/or button 1650 provides the tools to filter the tags by originator and date range respectively. In some embodiments, filtering tags by originator produces a list of tag names that were created by a specified user while filtering by date range produces a list of tag names that were created within a specified time frame. Depending on the filtering request, a user selection of the Apply Filters button 1655 filters Columns 1625, 1630 and 1635 to reflect tags that were created by a specified user, tags that were created within a certain time frame, or tags that were created in a certain time frame by a specified user.

In some embodiments, tags in Popular Tags display area 1620 are user selectable items. When one of the tags is selected, the Comments display area 1615 is populated with comments that have been created and tagged with the selected tag. The Column 1685 holds the comments' text, column 1690 holds the names of the users who created the comments listed in column 1685, and column 1695 holds the date on which the comments were created. The "Filter By" section 1660 operates in much the same way as the section 1640. Once display area 1615 is populated with comments, the comments can be filtered by selecting Originator button 1665, Date Range button 1670 and/or Opinions button 1675. Selecting these buttons provides the tools to filter comments by originator, date range and tag chains respectively. Much like Popular Tags display area 1620, filtering comments by originator in Comments display area 1615 produces a list of comments that were created by a specified user while filtering by date produces a list of comments that were created within a specified time frame. In addition, Comments display area 1615 also enables filtering comments by tag chains. Filtering comments by tag chains produces a list of comments that are tagged with a tag chain that matches a tag chain specified by the user. Selecting the Apply Filters button 1680 filters Columns 1685, 1690, and 1695 to reflect the filtering limitations requested by the user.

Returning to FIG. 15, process 1500 begins by determining (at 1505) whether a request has been received to apply tag filters. If a request to apply tag filters has been received, the process 1500 determines (at 1510) whether there has been a request to filter by originator. If a request to filter by originator has been received, the process 1500 filters (at 1545) the tags by originator. Next, the process 1500 determines (at 1515) whether there has been a request to filter by date range. If a request to filter by date range has been received, the process 1500 filters (at 1550) the tags by date range.

Figure 17:
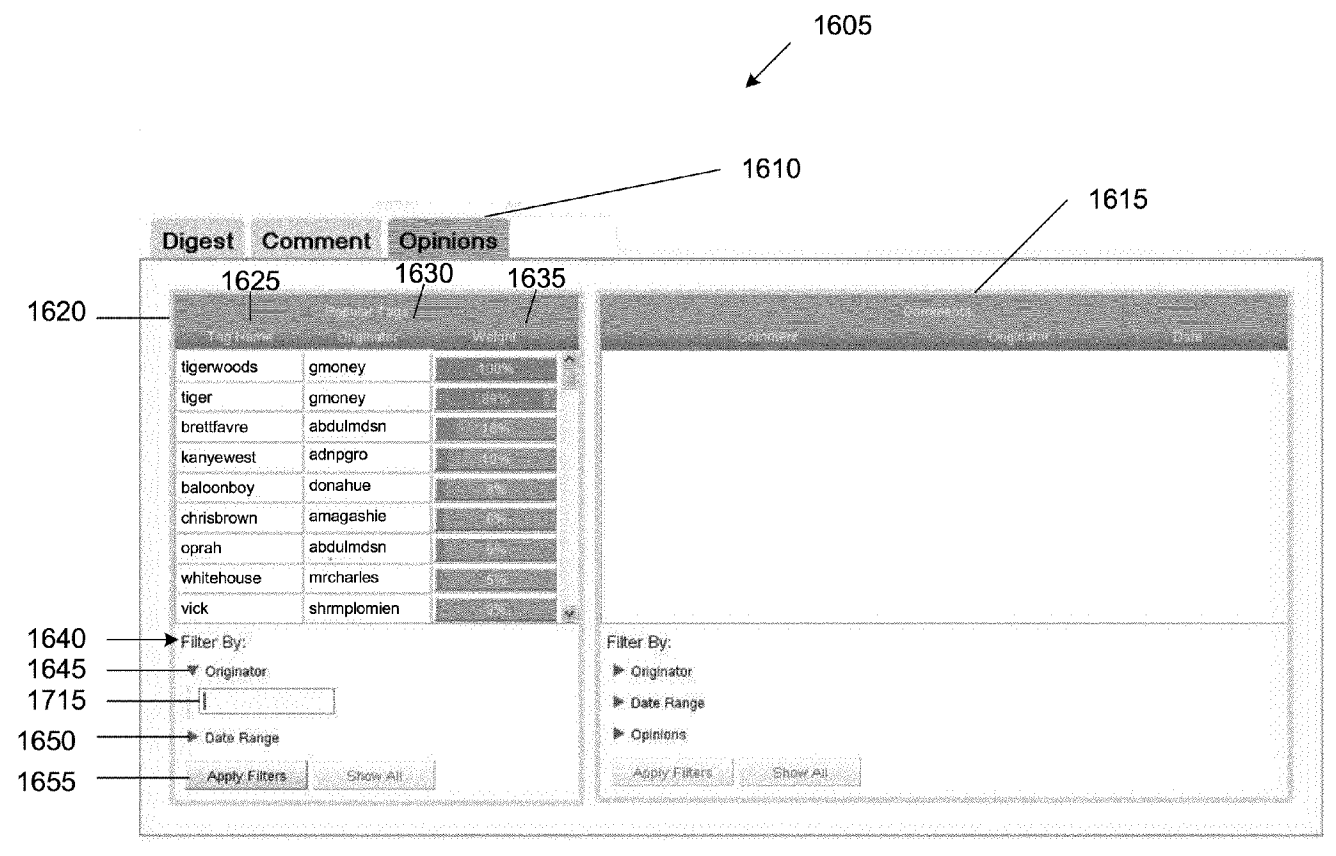
Figure 18:
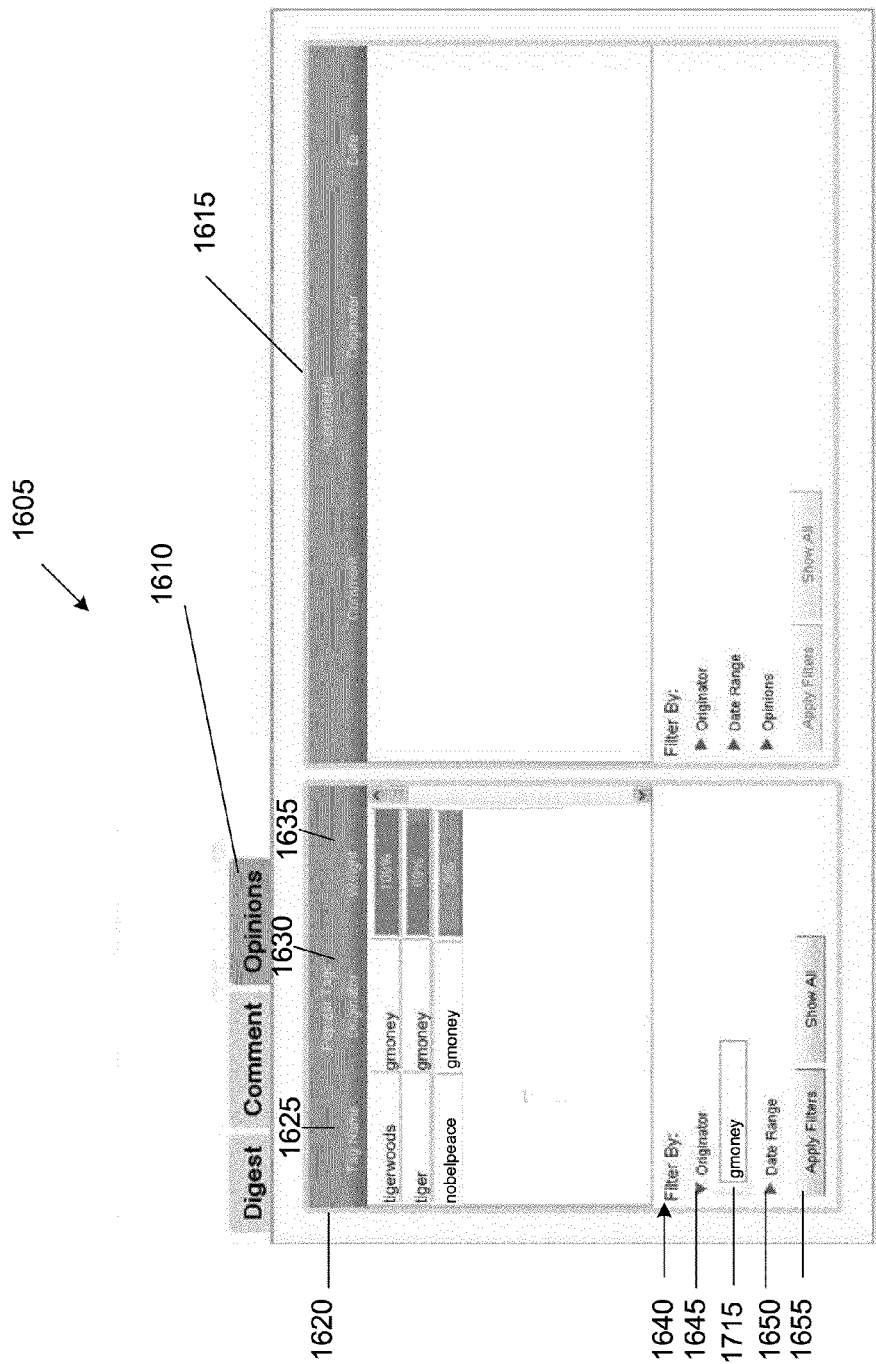
FIG. 18 illustrates an example opinion GUI after an originator is specified and the Apply Filters button is selected to filter the tags in the Popular Tags section.

FIGS. 17-22 illustrate the filtering of popular tags as described above in reference to FIG. 15. FIG. 17 illustrates the GUI 1605 after the Originator button 1645 has been selected. Upon selecting the Originator button 1645, a text box 1715 is introduced. Box 1715 takes user input regarding the originator by which to filter the tags. In some embodiments, the name of the desired originator can be entered by using a keyboard. FIG. 18 illustrates the GUI 1605 after the user enters in the desired originator (i.e. gmoney) into text box 1715, and selects Apply Filters button 1655. In some embodiments, selecting the Apply Filters button 1655 produces a list of tag names that are created by the user (e.g., a list of tag names entered in text box 1715 as described in operation 1545 in reference to FIG. 15. In the example illustrated in FIG. 18, a list of three tag names that were created by user "gmoney" is displayed in Tag Name column 1625. Originator column 1630 and Weight column 1635 are also updated to reflect data corresponding to the updated Tag Name column 1625.

Figure 19:
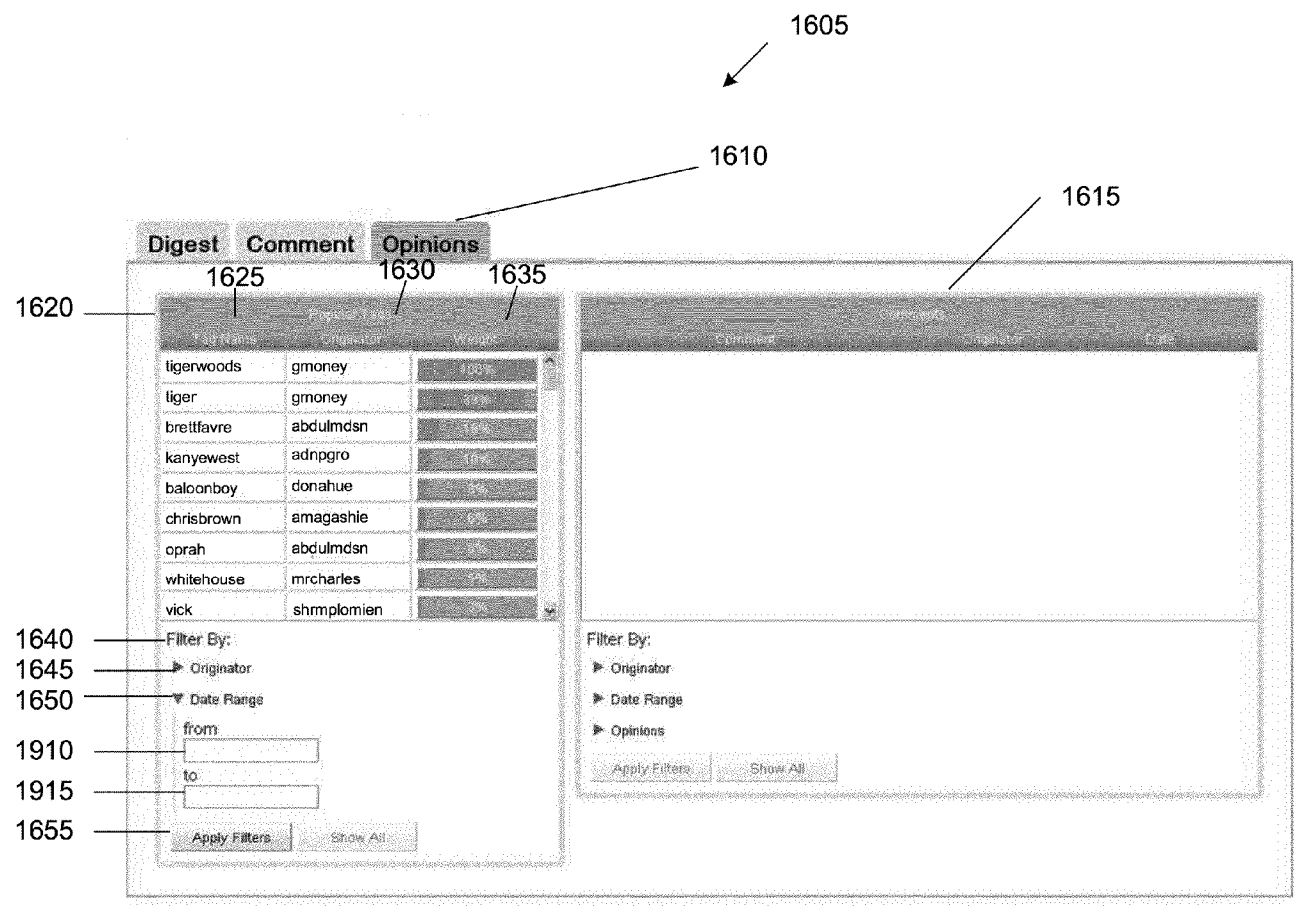
Figure 20:
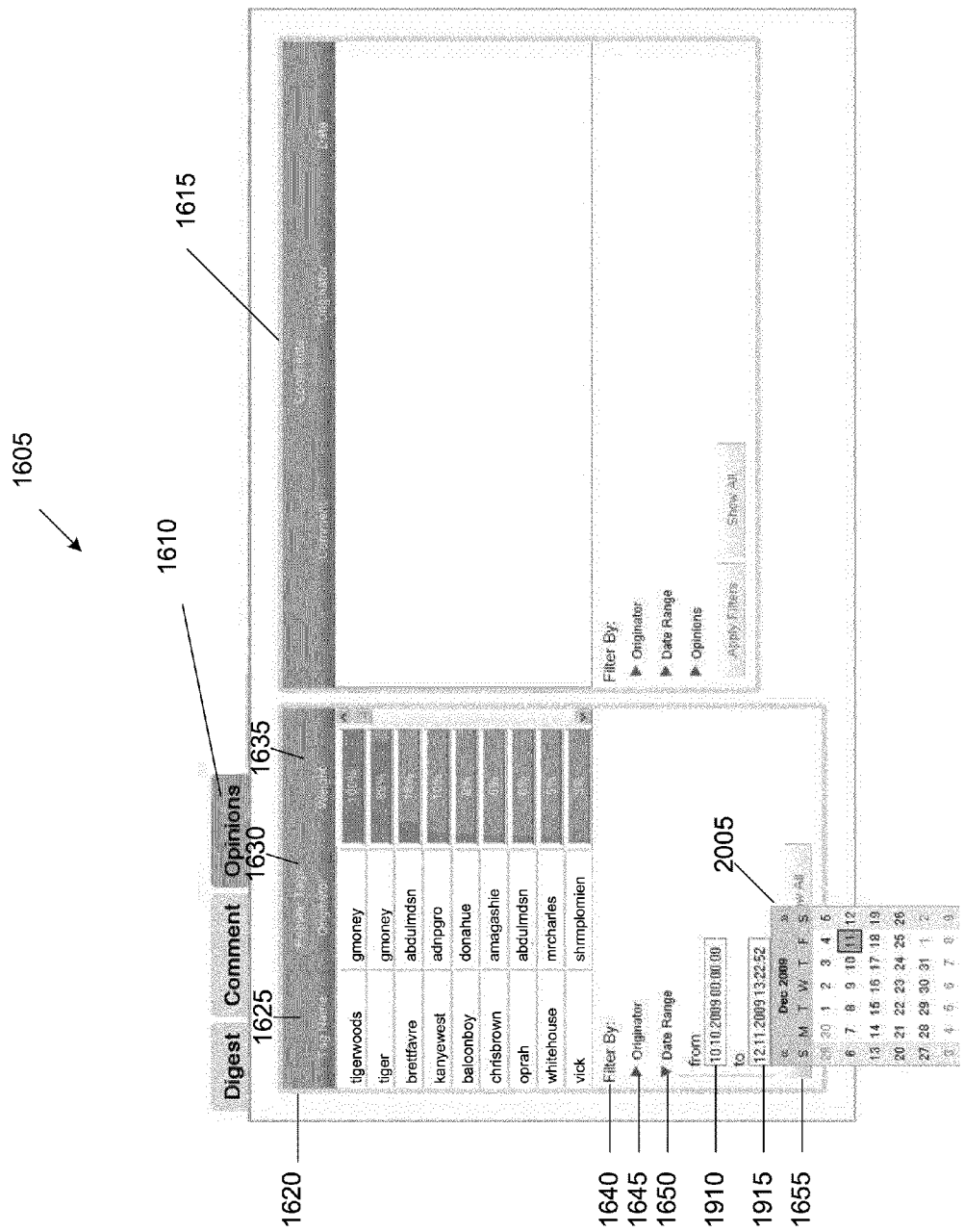
FIG. 20 illustrates an example opinion GUI after a date range is selected to filter tags in the Popular Tags section.

Opinions GUI 1605 also provides the tools to filter the popular tags by date range, as described by operation 1550 in reference to FIG. 15. In other words, the user is given the option to extract tags that were created within a certain range of dates out of the complete list of tags in Tag Name column 1625. FIG. 19 illustrates the GUI 1605 in which the user begins to filter the tag names in the Popular Tags display area 1620 by selecting Date Range button 1650 in "Filter By" section 1640. Upon selecting Date Range button 1650, two text boxes 1910 and 1915 are introduced. The "from" box 1910 marks the beginning of the aforementioned date range while the "to" box 1915 marks the end of the date range. In some embodiments, the beginning and end dates can be selected by manually entering dates in boxes 1910 and 1915 respectively. In other embodiments, as displayed in the example GUI 1605 of FIG. 20, beginning and end dates can be selected by selecting dates from a provided calendar 2005. In some embodiments, this calendar 2005 is retrieved by selecting box 1910 or 1915. FIG. 20 illustrates the GUI 1605 in which the user obtains calendar 2005 and selects a beginning and end date by selecting dates on the calendar 2005.

Figure 21:
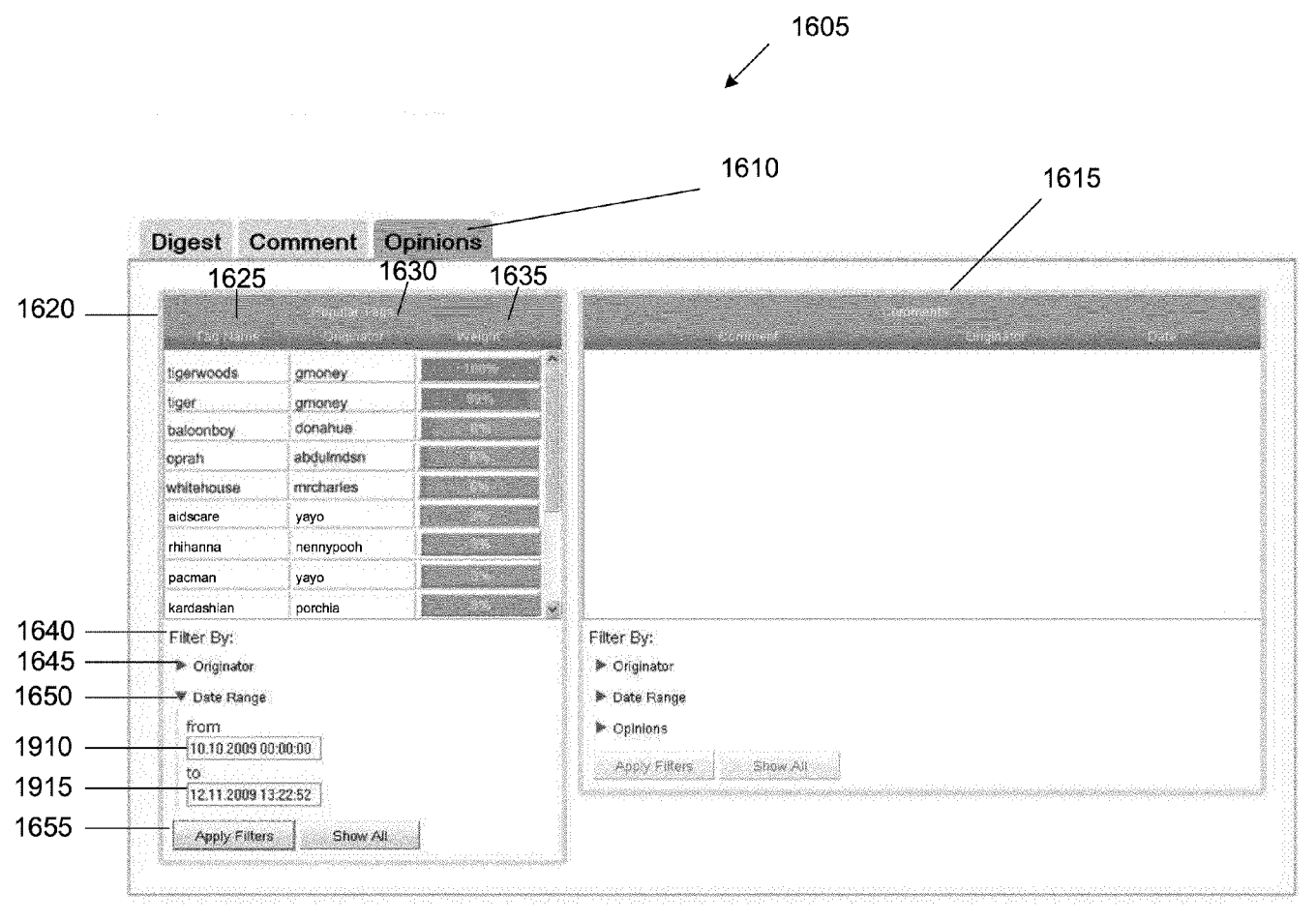

FIG. 21 illustrates opinions the GUI 1605 after the user selects the desired dates, and selects the Apply Filters button 1655 to generate a filtered list of tag names. In some embodiments, selecting the Apply Filters button 1655 produces a list of tag names that were created within the time frame specified by the user using box 1910 and 1915. As displayed in FIG. 21, once the Apply Filters button 1655 is selected, Tag name column 1625 is updated to reflect only tag names that were created during the time frame specified by the user above in reference to FIGS. 18-21. Originator column 1630 and Weight column 1635 are also updated to reflect data corresponding to the updated Tag Name column 1625.

Figure 22:
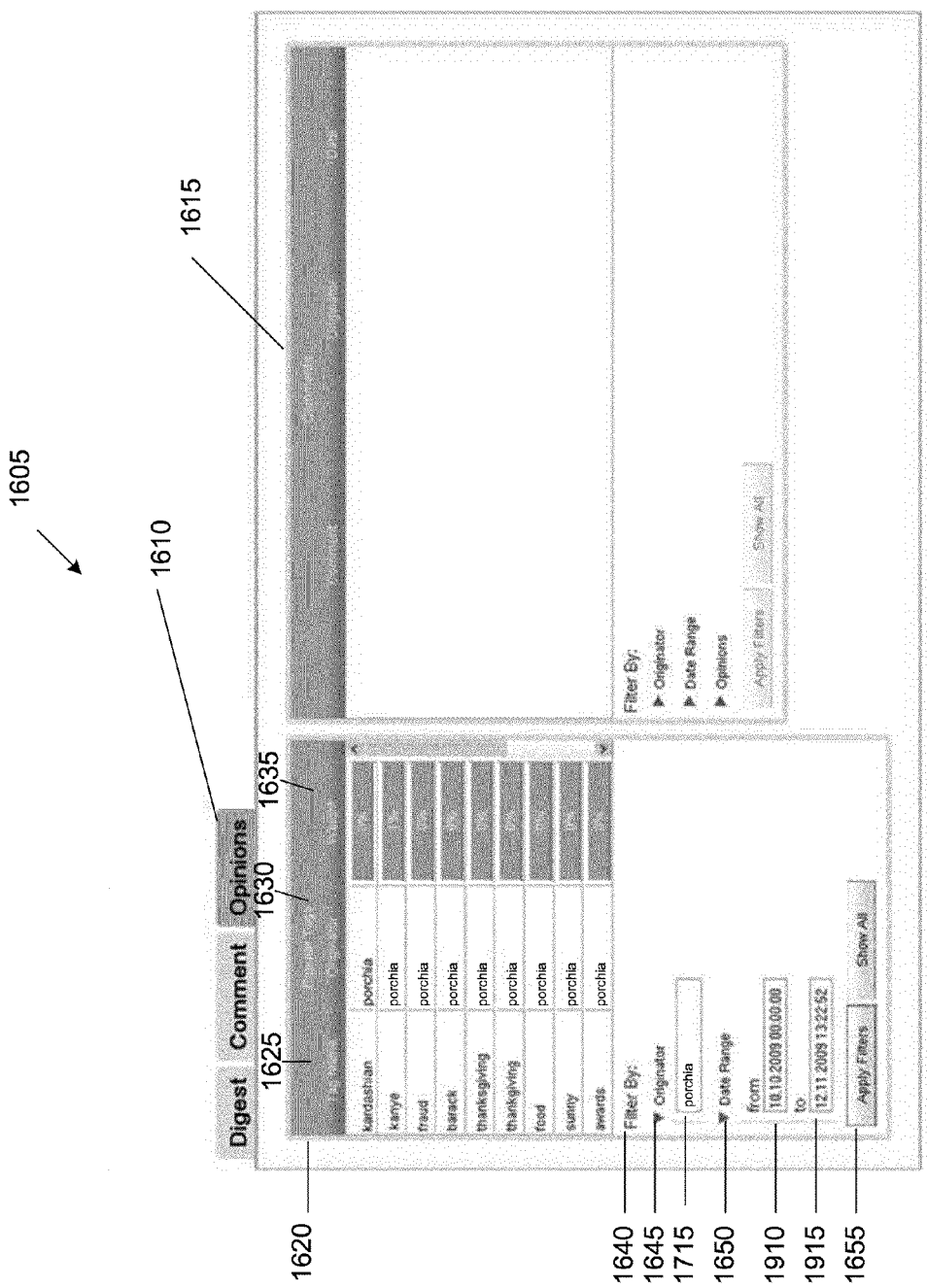
FIG. 22 illustrates an example opinion GUI after an originator and a date range is specified, and the Apply Filters button is selected to filter tags by both originator and date range.

FIG. 22 illustrates opinions GUI 1605 in which the user filters the list of popular tag names by both originator and date range. In the example of FIG. 22, in addition to filtering by date as done above in reference to FIGS. 19-21, the user selects the Originator button 1645, types in the originator of interest (i.e. porchia) into text box 1715, and selects Apply Filters button 1655. In this case, selecting the Apply Filters button 1655 produces a list of tag names that were created by the originator entered in text box 1715 within the time frame specified by the user in box 1910 and 1915 in reference to FIGS. 19-21. As displayed in FIG. 22, once the Apply Filters button 1655 is selected, Tag name column 1625 is updated to reflect only tag names that were created by originator "porchia" during the time frame specified by the user in FIG. 22. Weight column 1635 is also updated to reflect data corresponding to the updated Tag Name column 1625.

As discussed above, in reference to FIG. 16, in addition to display area 1620, opinions GUI 1605 also includes the Comments display area 1615 as a second display area. As displayed in FIG. 16, in some embodiments, the Comments display area 1615 consists of three columns that hold a set of tagged comments submitted by users, the originator of each comment, and the date on which the comment was submitted. In some embodiments, these columns are blank originally, but become populated once the user selects one of the tag names in the Populated Tags display area 1620. Returning to FIG. 15, once the process 1500 receives (at 1520) a tag selection, the process determines (at 1525) whether there has been a request to apply comment filters. If a request to apply comment filters has been received, the process 1500 determines (at 1530) whether there has been a request to filter by originator. If a request to filter by originator has been received, the process filters (at 1555) the comments by originator. Next, the process 1500 determines (at 1535) whether there has been a request to filter by date. If a request to filter by date has been received, the process filters (at 1560) the comments by date. Finally, the process 1500 determines (at 1540) if there has been a request to filter by tag chain. If a request to filter by tag chain has been received, the process 1500 filters (at 1565) the comments by tag chain.

FIGS. 23-34 illustrate the filtering of comments as described above in reference to FIG. 15. FIG. 23 illustrates the GUI 1605 after the user selects tag name 2320 (i.e. tigerwoods) in the Populated Tags display area 1620. Once tag name 2320 is selected, Comment column 1685 lists all comments tagged with tag name "tigerwoods," Originator column 1690 lists the name of the user who wrote each corresponding comment, and Date column 1695 lists the date on which each corresponding comment was submitted.

Figure 24:
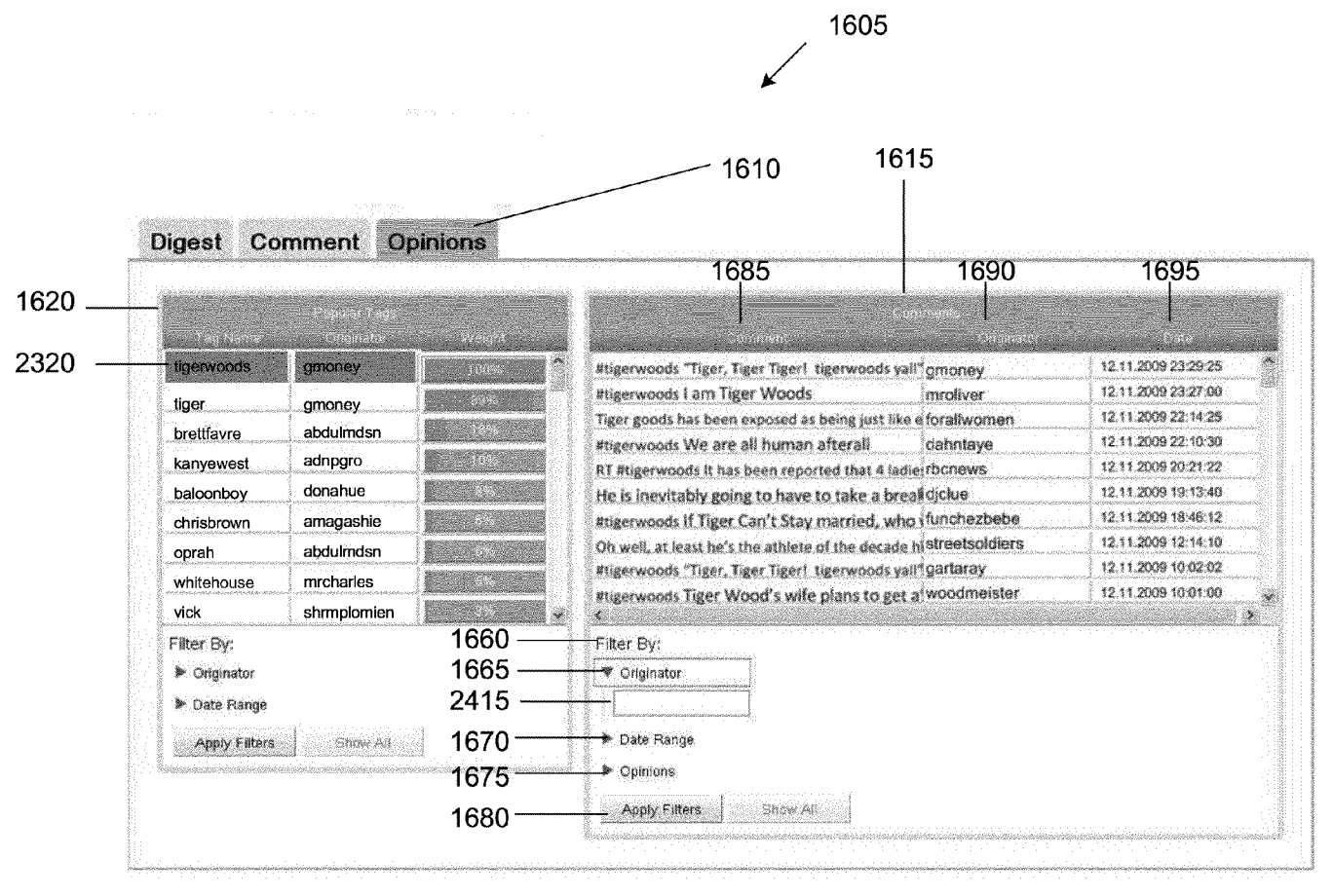
Figure 25:
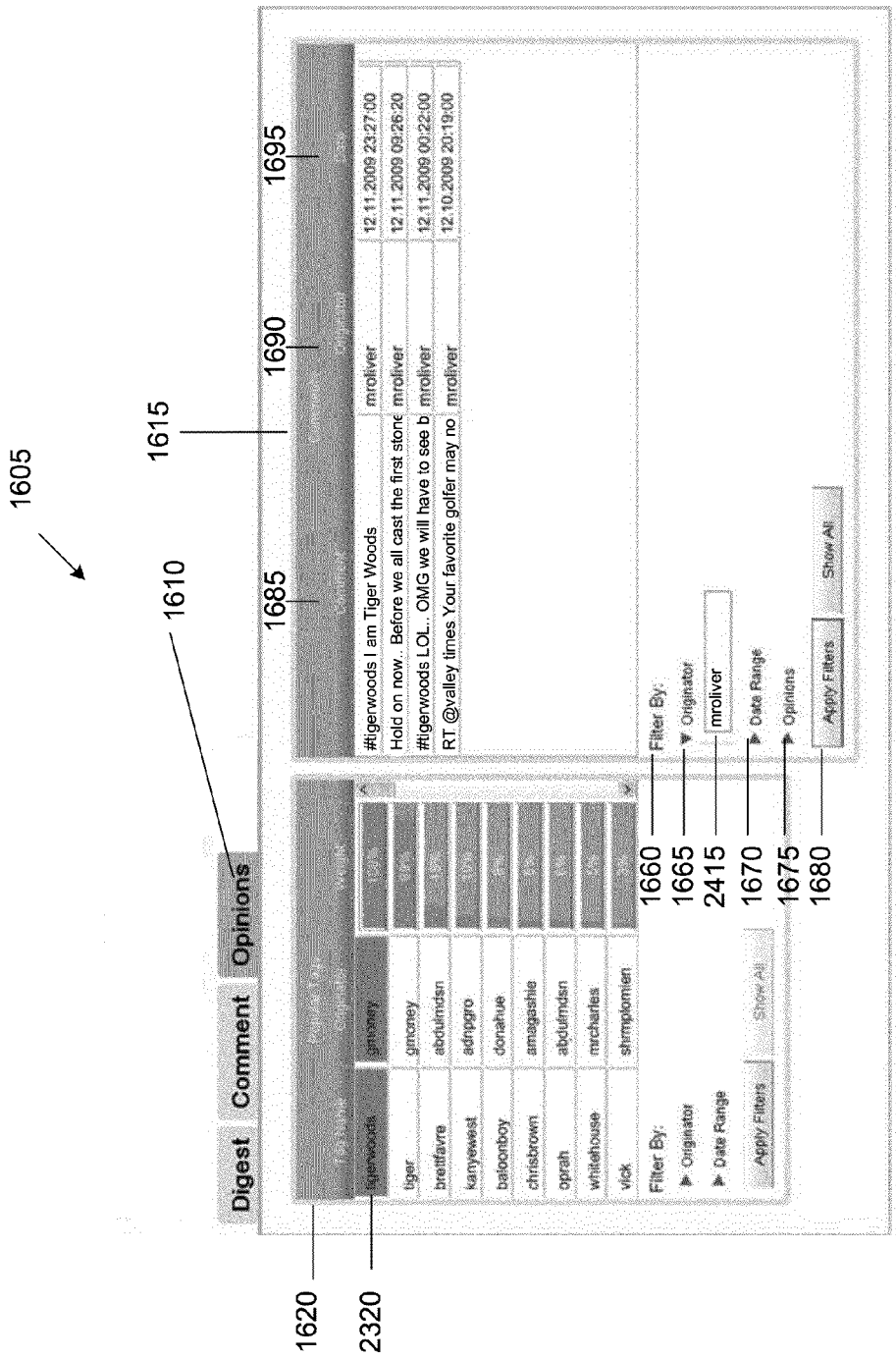
FIG. 25 illustrates an example opinion GUI after an originator is specified and the Apply Filters button is selected to filter the comments in the Comments section.

FIG. 24 illustrates the GUI 1605 in which the user begins to filter the comments in the Comments display area 1615 by selecting the Originator button 1665 in "Filter By" section 1660. Upon selecting the Originator button 1665, a text box 2415 is introduced. Text box 2415 receives the user input for the originator's name. FIG. 25 illustrates the GUI 1605 in which the user types in the originator of interest (i.e. mroliver) into text box 2415, and selects Apply Filters button 1680. In some embodiments, selecting the Apply Filters button 1680 produces a list of comments that were created by the user entered in text box 2415. In the example of FIG. 25, a list of comments that were submitted by "mroliver" is displayed in Comment column 1685. Originator column 1690 and Date column 1695 is also updated to reflect data corresponding to the updated Comments column 1685.

Figure 26:
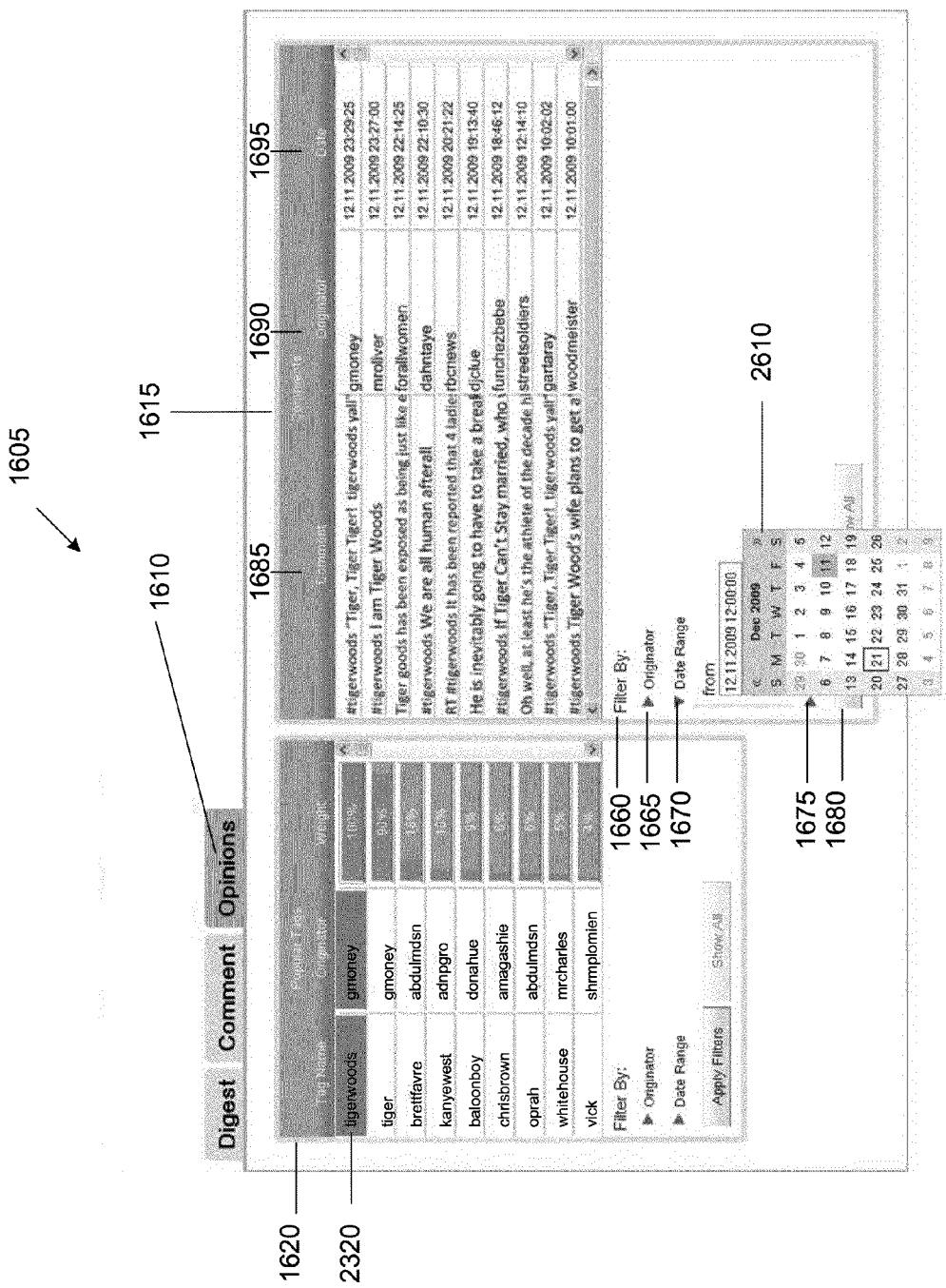
FIG. 26 illustrates an example opinion GUI after the Date Range button in the Popular Tags section is selected and a date range is specified to filter comments in the Comments section.

Opinions GUI 1605 also allows the user to filter the Comment column 1685 by date range. In other words, the user is given the option to extract comments that were submitted within a certain range of dates out of the complete list of comments in column 1685. FIG. 26 illustrates Opinions GUI 1605 in which the user begins to filter the comments in the Comments display area 1615 by selecting the Date Range button 1670 in the "Filter By" section 1660. Upon selecting the Date Range button 1670, the user is allowed to select the aforementioned date range much as illustrated above in reference FIGS. 19-22. In some embodiments, the user can select beginning and end dates manually by using a keyboard. In other embodiments, as displayed in FIG. 26, the user can select beginning and end dates by selecting dates from a provided calendar. As FIG. 26 illustrates, the user selects a beginning and end date by selecting a date on the calendar 2610.

Figure 27:
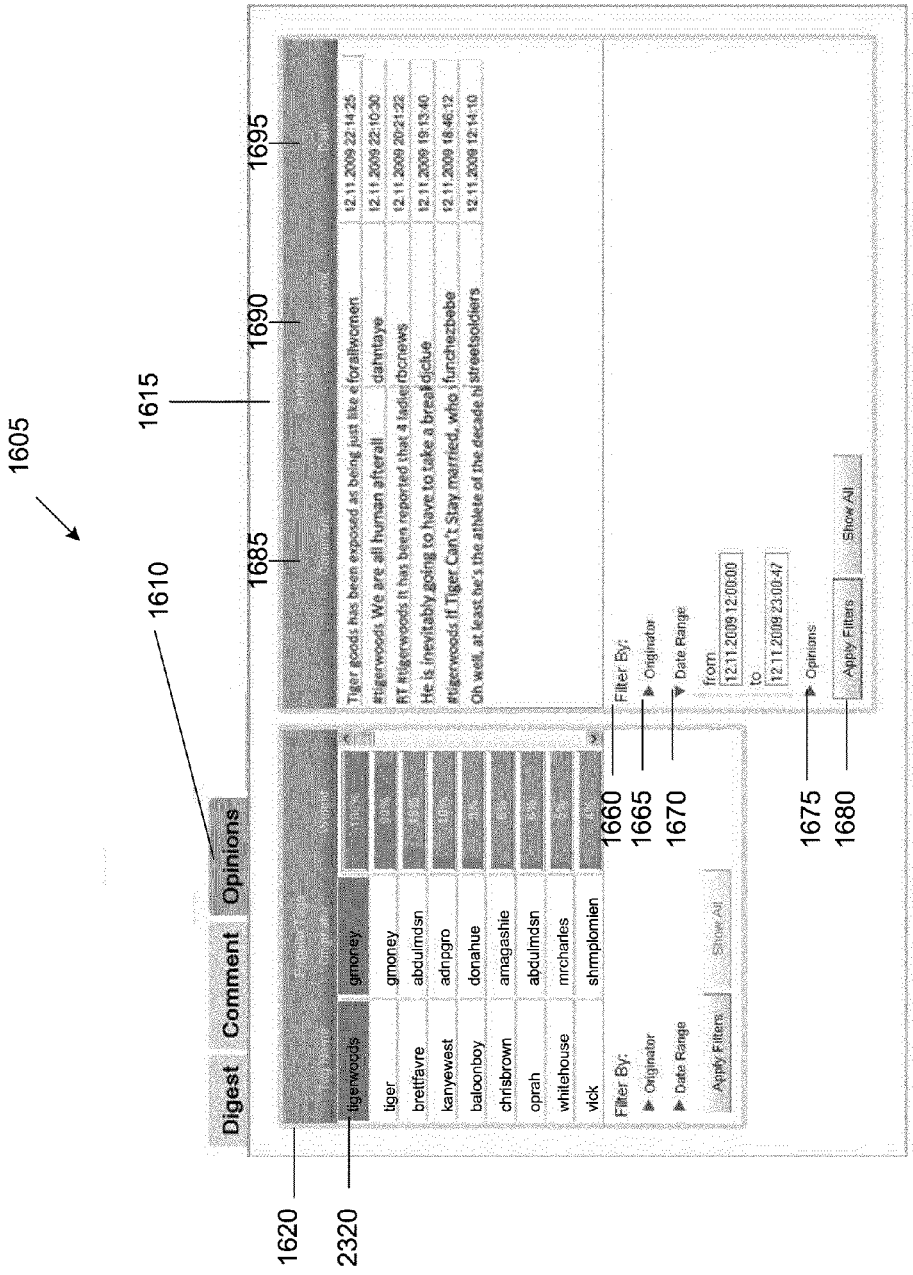
FIG. 27 illustrates an example opinion GUI after the Apply Filters button in the Comments section is selected to filter the comments by date range.

FIG. 27 illustrates opinions GUI 1605 in which the user selects desired dates, and selects the Apply Filters button 1680 to generate a filtered list of comments. In this case, selecting the Apply Filters button 1680 produces a list of comments that were created within the time frame specified by the user. As displayed in FIG. 27, once the Apply Filters button 1680 is selected, Comment column 1685 is updated to reflect only comments that were created during the time frame specified by the user in reference to FIGS. 26-27. Originator column 1690 and Date column 1695 are also updated to reflect data corresponding to the updated Comment column 1685.

Figure 28:
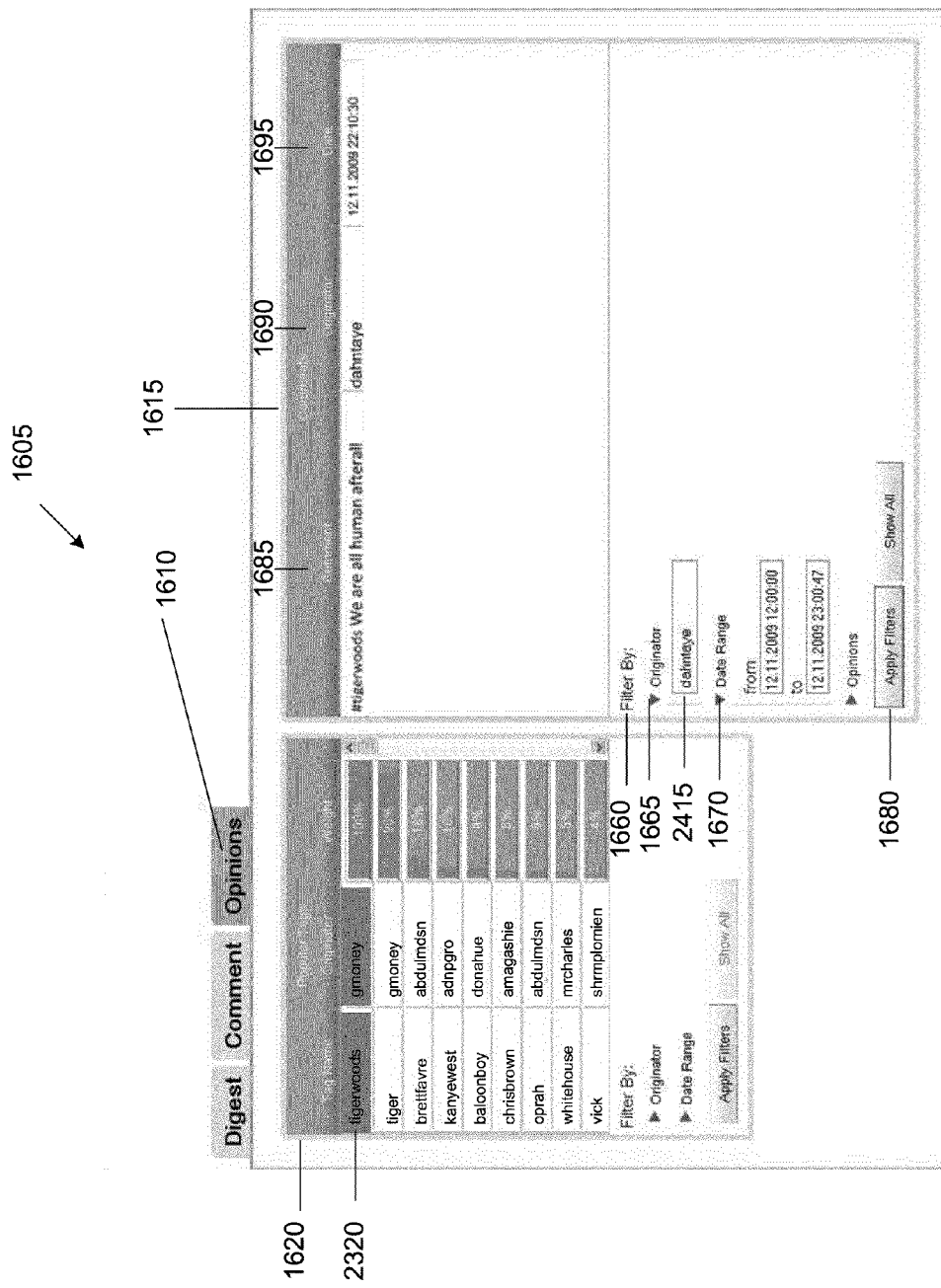
FIG. 28 illustrates an example opinion GUI after an originator and a date range is specified, and the Apply Filters button is selected to filter comments by both originator and date range.

FIG. 28 illustrates opinions GUI 1605 after the user filters the list of comments in Comment column 1685 by both originator and date range. In the example of FIG. 28, in addition to filtering by date as done above in reference to FIGS. 26-27, the user selects the Originator button 1665, types in the originator of interest (i.e. dahntaye) into text box 2415, and selects Apply Filters button 1680. In this case, selecting the Apply Filters button 1680 produces a list of comments that were created by the originator entered in text box 2415 within the time frame specified by the user above in reference to FIG. 27. As displayed in the example of FIG. 28, once the Apply Filters button 1680 is selected, the Comment column 1685 is updated to reflect the only comment that was submitted by originator "dahntaye" during the time frame specified by the user in reference to FIG. 27. Column 1695 is also updated to reflect date corresponding to the lone comment in Comment column 1685.

Opinions GUI 1605 also allows the filtering of Comment column 1685 by created tag chains. As previously shown in reference to FIG. 13, comments can be submitted in conjunction with associated tag relationships by using Comments GUI 205. By searching these tag relationships on opinion GUI 1605, the user can locate comments associated with particular tag relationships by filtering them out of the list of comments in Comment column 1685.

Figure 29:
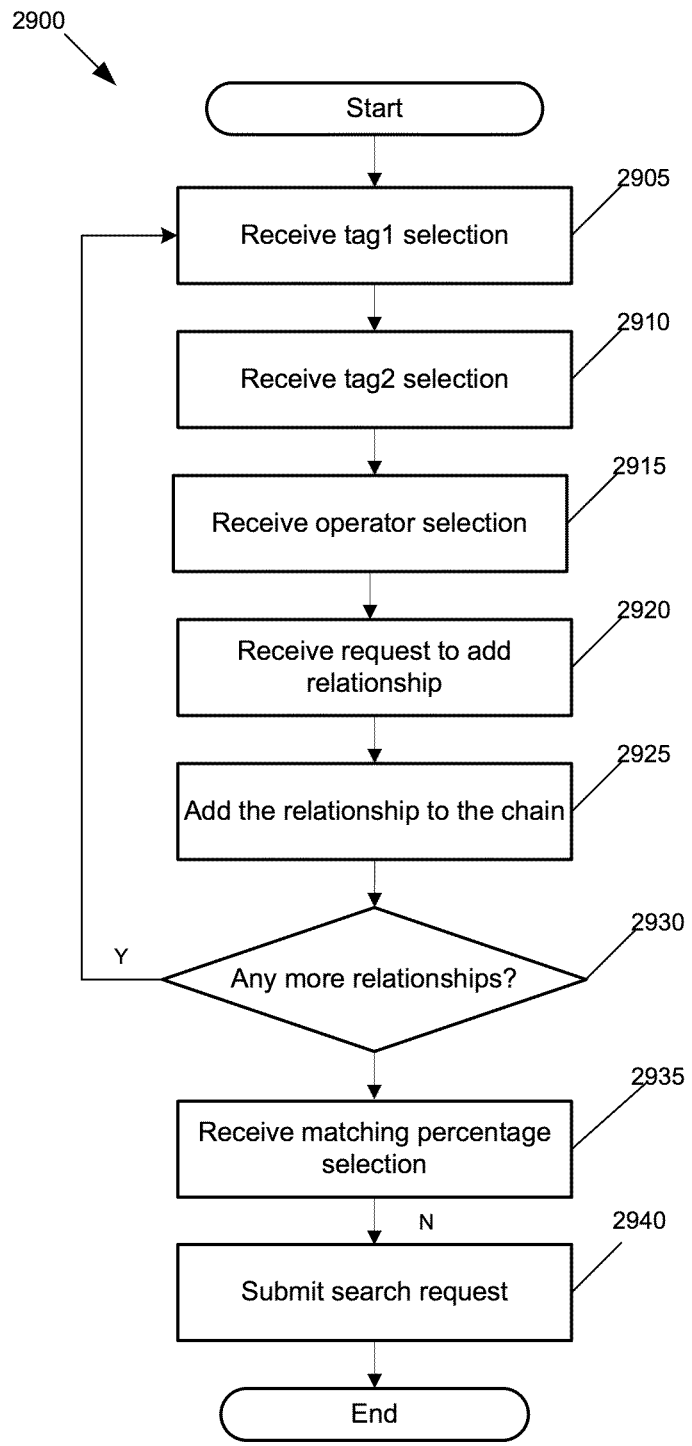
FIG. 29 conceptually illustrates an example of a process that some embodiments use to filter comments by tag chain.

Returning to FIG. 15, to filter by tag chain (at 1565), the process 1500 proceeds to process 2900 in reference to FIG. 29. FIG. 29 conceptually illustrates an example of a process 2900 in some embodiments for searching for comments by specifying a tag chain and searching for comments tagged with the tag chain. To specify tag relationships, the process 2900 receives (at 2905) a first tag selection, (at 2910) a second tag selection, and (at 2915) an operator selection. Next, the process 2900 receives (at 2920) a request to add the relationship to the tag chain. Once the relationship is added (at 2925), the process determines (at 2930) whether there are any more relationships to be added to the tag chain. If there are more relationships to be added, then the process 2900 returns back to operation 2905 to receive a first tag selection. Once there are no more relationships to be added, the tag chain is complete. The process 2900 then receives (at 2935) the percentage of accuracy at which to filter the desired comments. The process then submits (at 2940) the search request. The process 2900 will be further described by reference to FIGS. 30-38.

Figure 30:
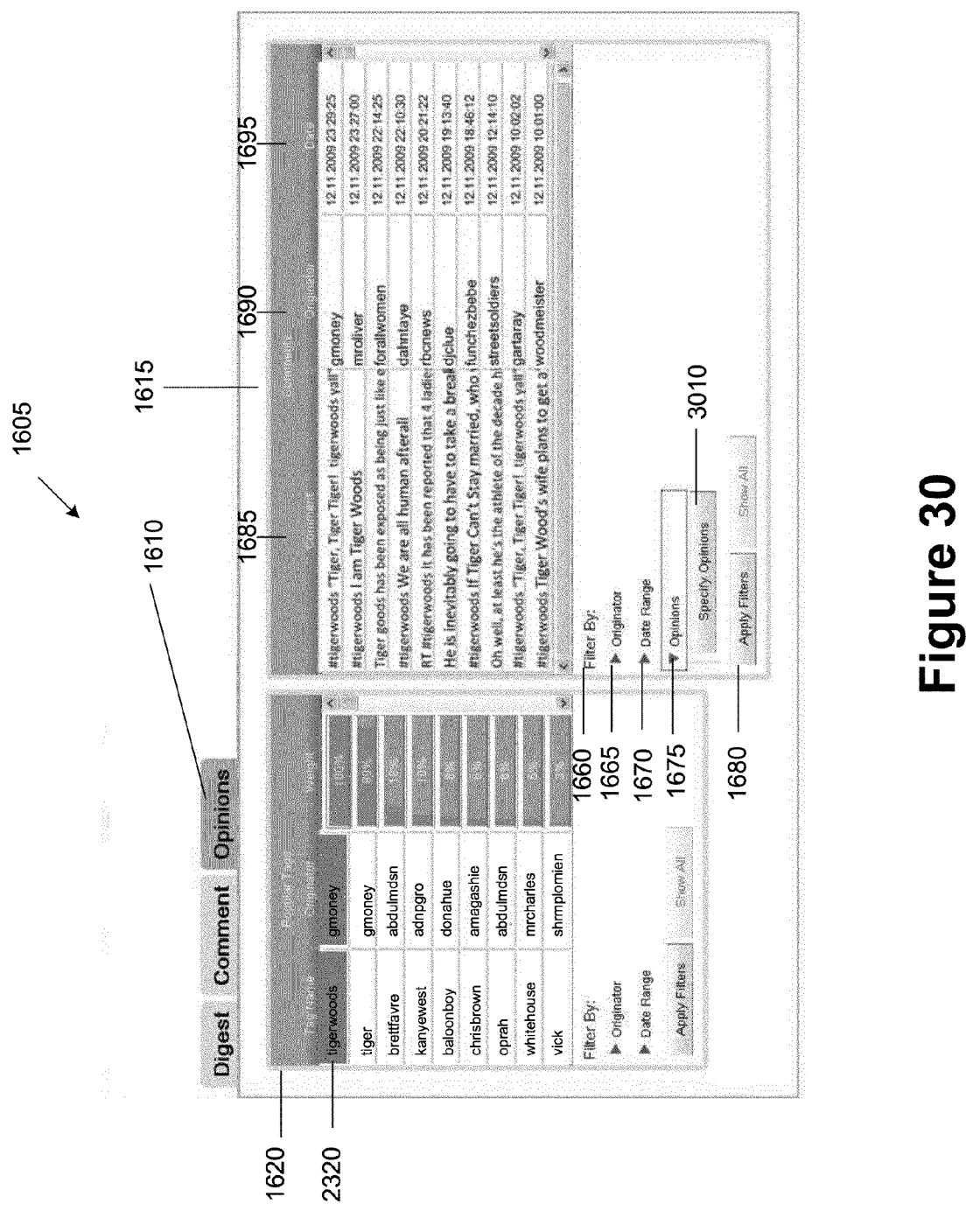
Figure 31:
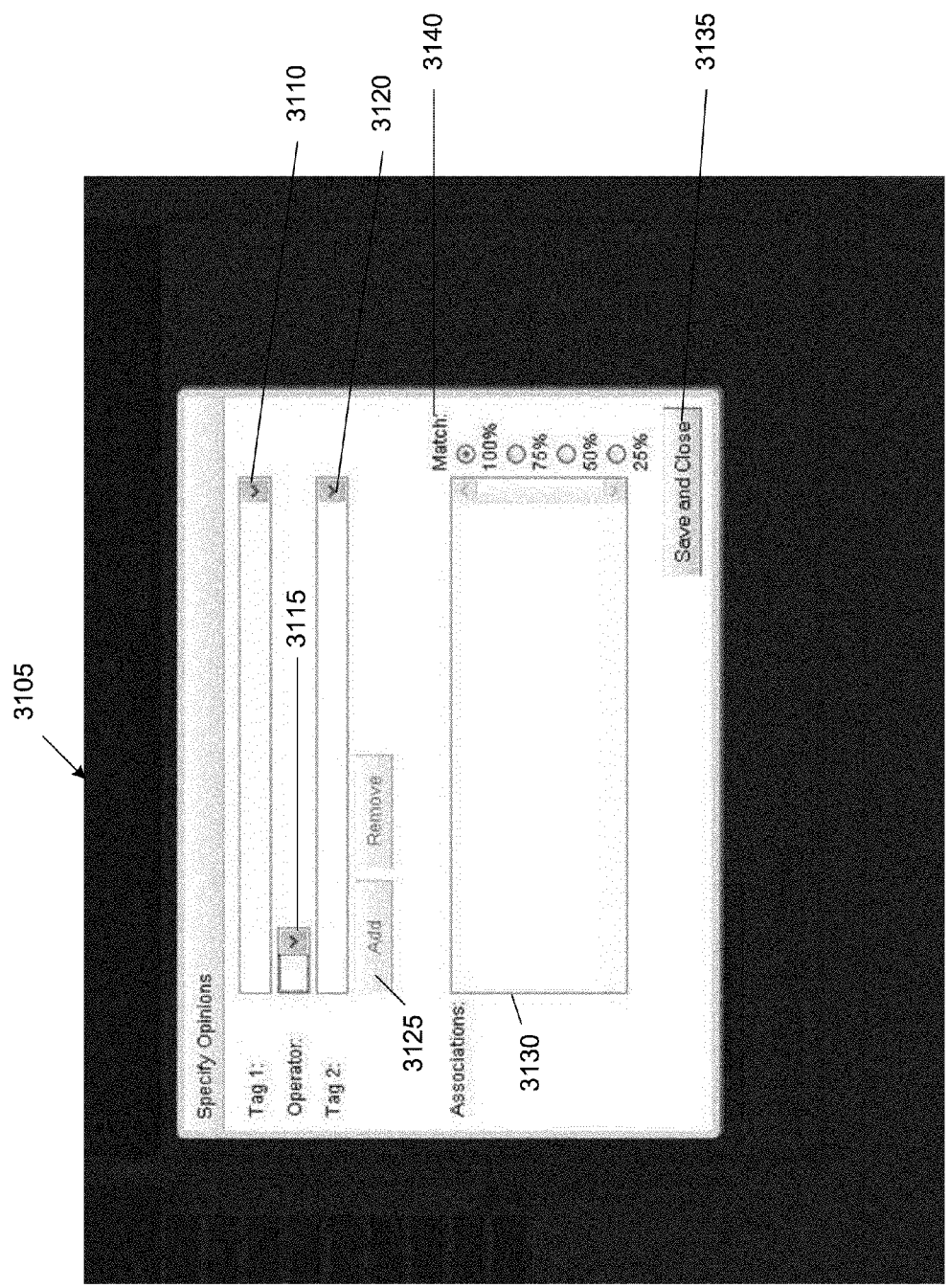
FIG. 31 illustrates an example search tool at first glance for an example application of some embodiments of the invention.

FIGS. 30-38 illustrate an example of the filtering of comments on opinion GUI 1605 by tag chains. FIG. 30 illustrates opinions GUI 1605 in which the user begins to filter the comments in the Comments display area 1615 by selecting the Opinions button 1675 in the "Filter By" section 1660. Selecting Opinions button 1675 reveals Specify Opinions button 3010. Selecting Specify Opinions button 3010, introduces search tool 3105 as shown in FIG. 31.

FIG. 31 displays an example GUI search tool 3105 after Specify Opinions button 3010 is selected. This example GUI includes Tag 1 menu 3110, Operator menu 3115, Tag 2 menu 3120, Add button 3125, Associations box 3130, Match column 3140, and "Save and Close" button 3135. In some embodiments, a relationship between two tags can be searched by first selecting a first tag as a first operand from the drop down menu 3110, a second tag as a second operand from the drop down menu 3120, and the operator associated with the two tags from the drop down menu 3115. Selecting Add button 3125 causes the relationship to be displayed or portrayed in the Associations box 3130. The level of accuracy with which to filter the desired comments can then be selected by selecting one of the buttons in Match column 3140. This process will be further explained below in reference to FIG. 37. Once the tag chain is specified, selecting "Save and Close" button 3135 finalizes the tag chain and returns the user to opinions GUI 1605.

Figure 32:
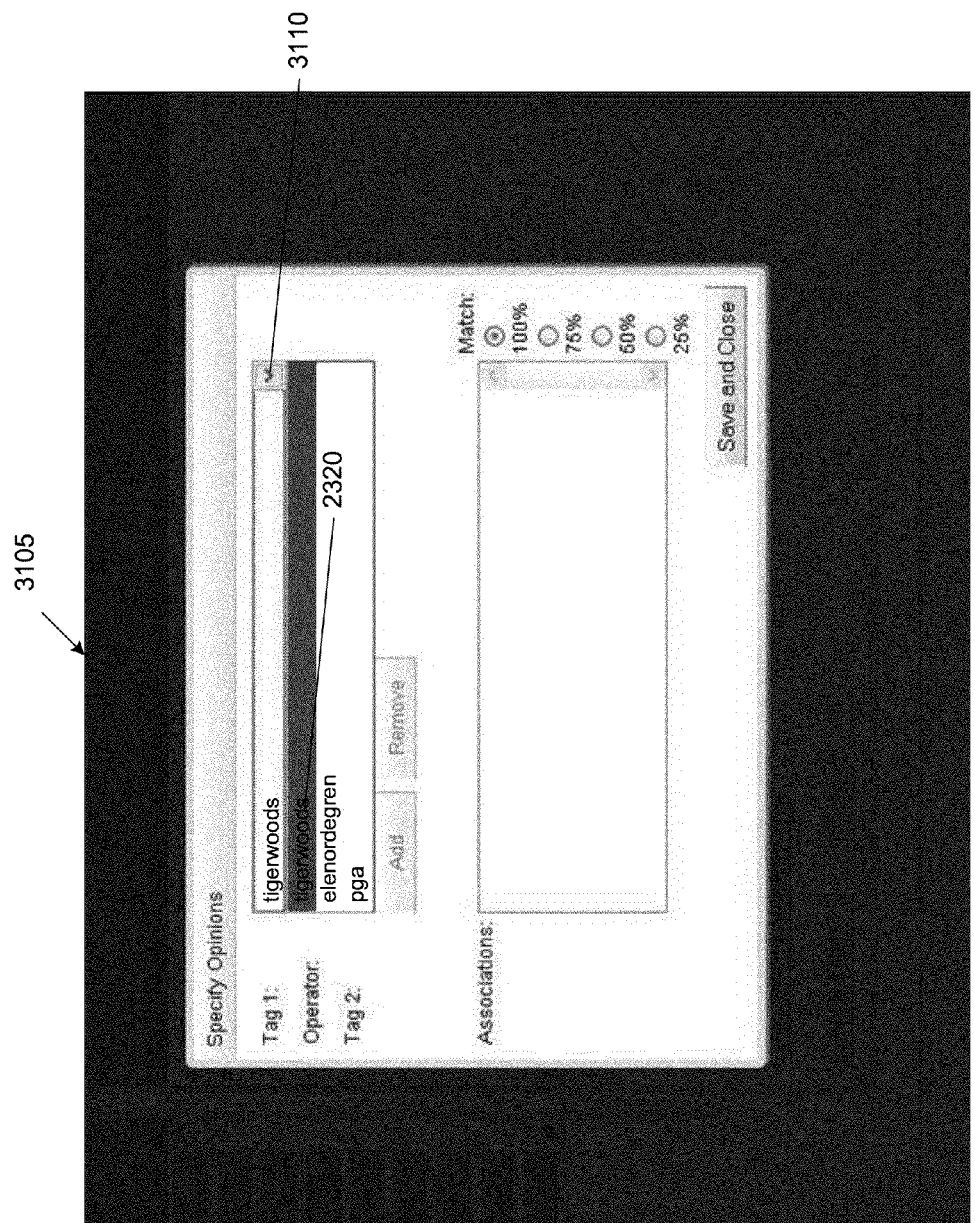
FIG. 32 illustrates an example search tool after a first is selected to create a tag relationship.
Figure 33:
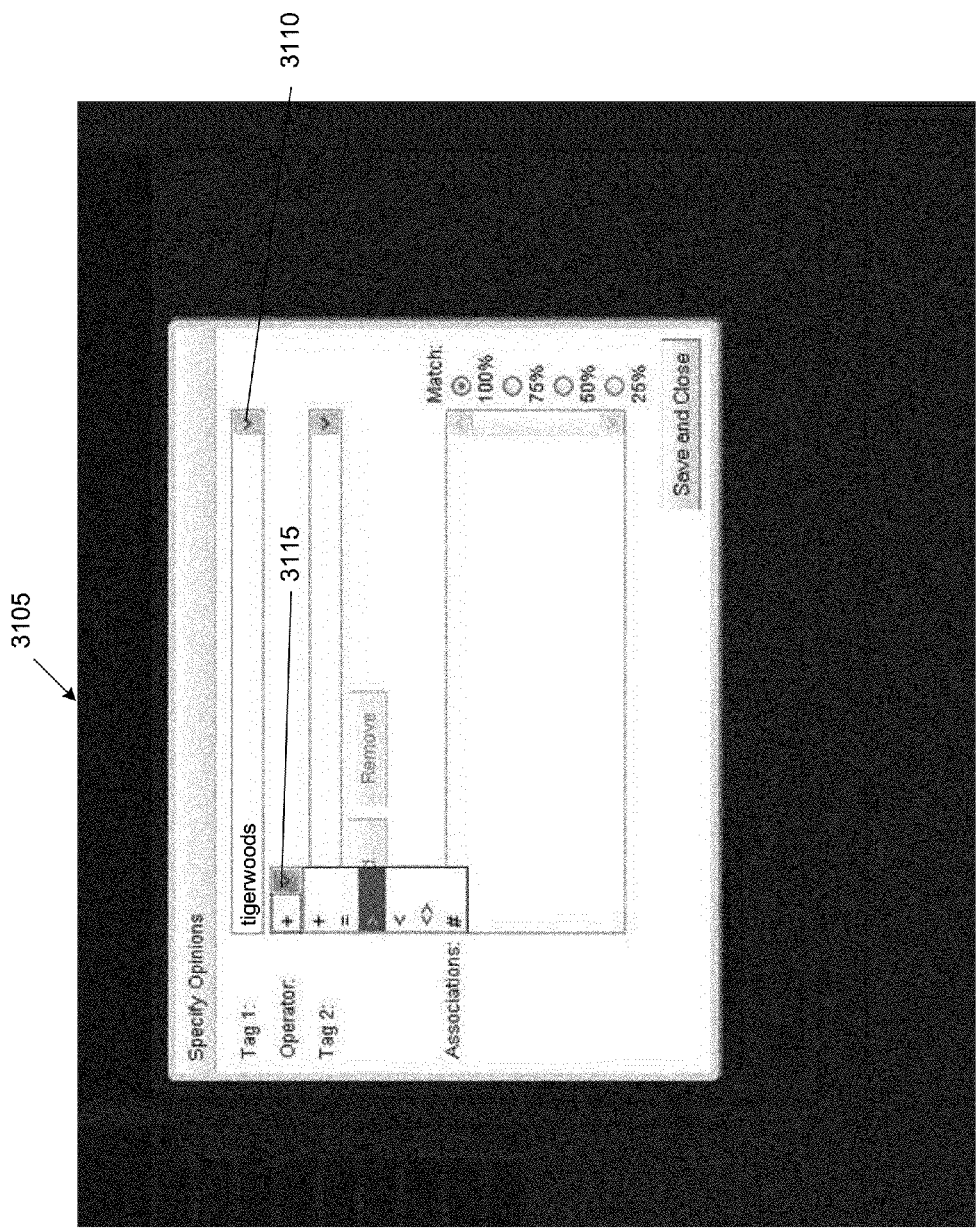
FIG. 33 illustrates an example search tool after an operator is selected to create a tag relationship.

FIG. 32 illustrates search tool 3105 after the user drops the Tag 1 menu 3110, which includes a list of related tags. In some embodiments, this list of tags includes the tag 2320 selected from column 1625 in reference to FIG. 23 and a complete list of its related tags. In other embodiments, as displayed in FIG. 32, this list of related tags is a complete list of input tags that were generated whenever tag 2320 was created in comment GUI 205, much like tag 315 was created above in reference to FIG. 4. In the example of FIG. 32, Tag 1 menu 3110 includes the same tags specified in Input Tags column 305 in reference to FIG. 6. In the example of FIG. 32, the user selects "tigerwoods" as a first tag. Next, as illustrated in the example of FIG. 33, the user then selects the greater than operator (>) from the Operator menu 3115. Finally, FIG. 34 illustrates search tool 3105 after the user drops the Tag 2 menu 3120, which also includes the same tags specified in Input Tags column 305 in reference to FIG. 6 and selects "elenordegen" as a second tag.

Figure 34:
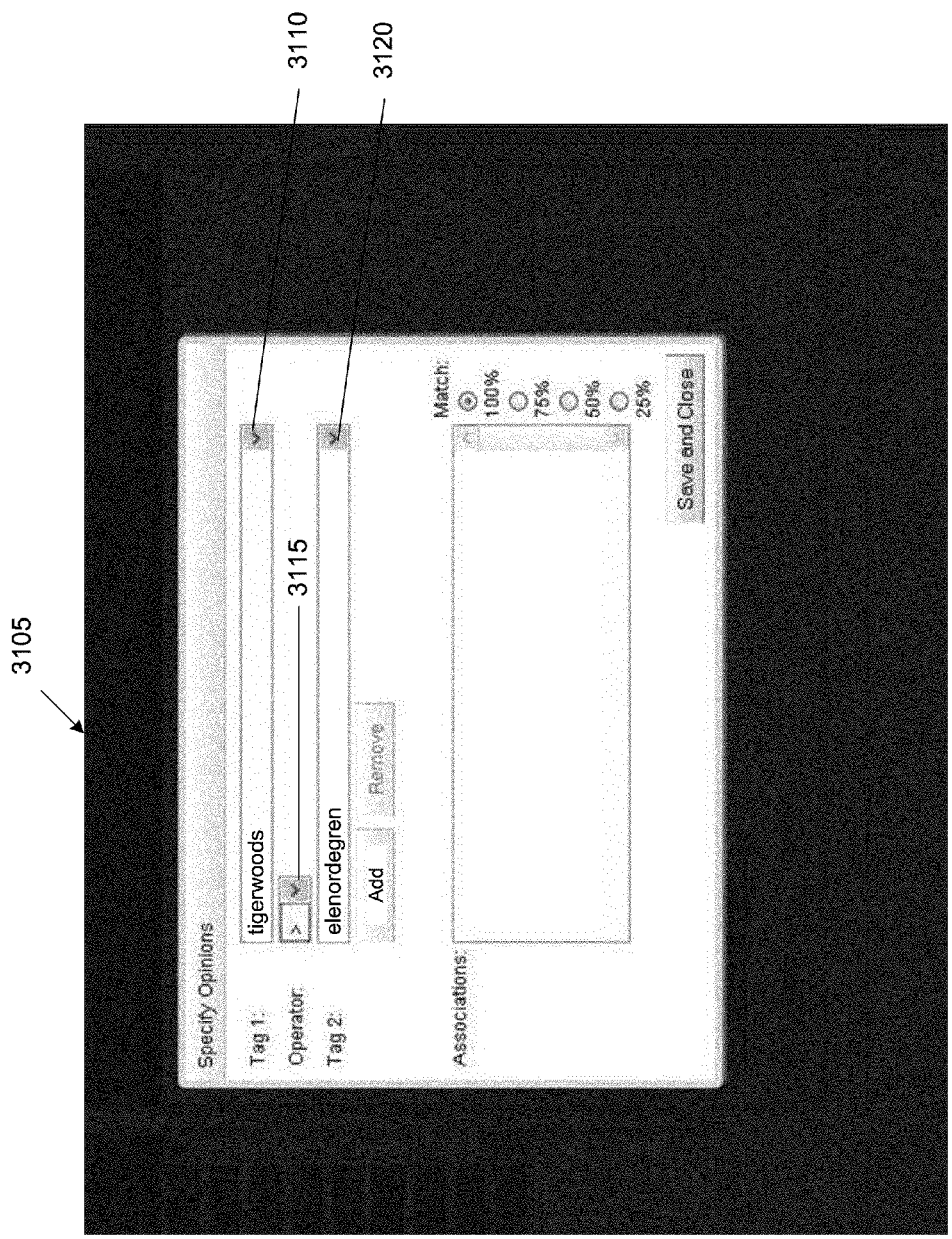
FIG. 34 illustrates an example search tool after a second tag is selected to create a tag relationship.
Figure 35:
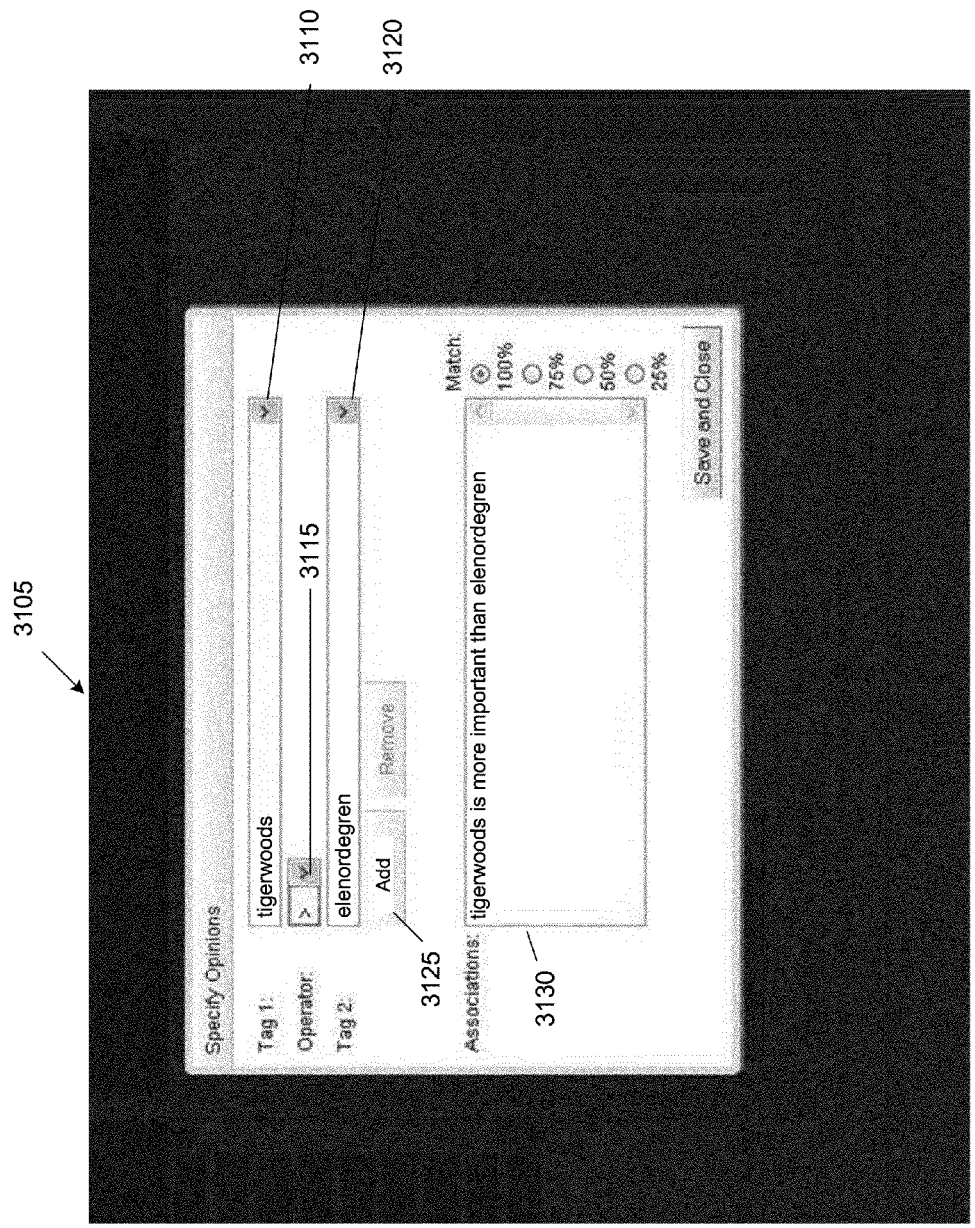
FIG. 35 illustrates an example search tool after the add button is selected to add a first relationship to a tag chain.

After selecting both tags and the operator, as illustrated in FIG. 34, the Add button 820 is highlighted. In some embodiments, the user can complete the final step of creating a relationship between two tags by selecting the Add button 3125. FIG. 35 illustrates example search tool 3105 after the user specifies the relationship between tag "tigerwoods" and tag "elenordegren" by selecting Add button 3125. In some embodiments, upon selecting Add button 3125, Associations text box 3130 receives a line of text that states in plain English the relationship between the two selected tags created above in reference to FIGS. 32-34 (i.e. "tigerwoods is more important than elenordegren").

Figure 36:
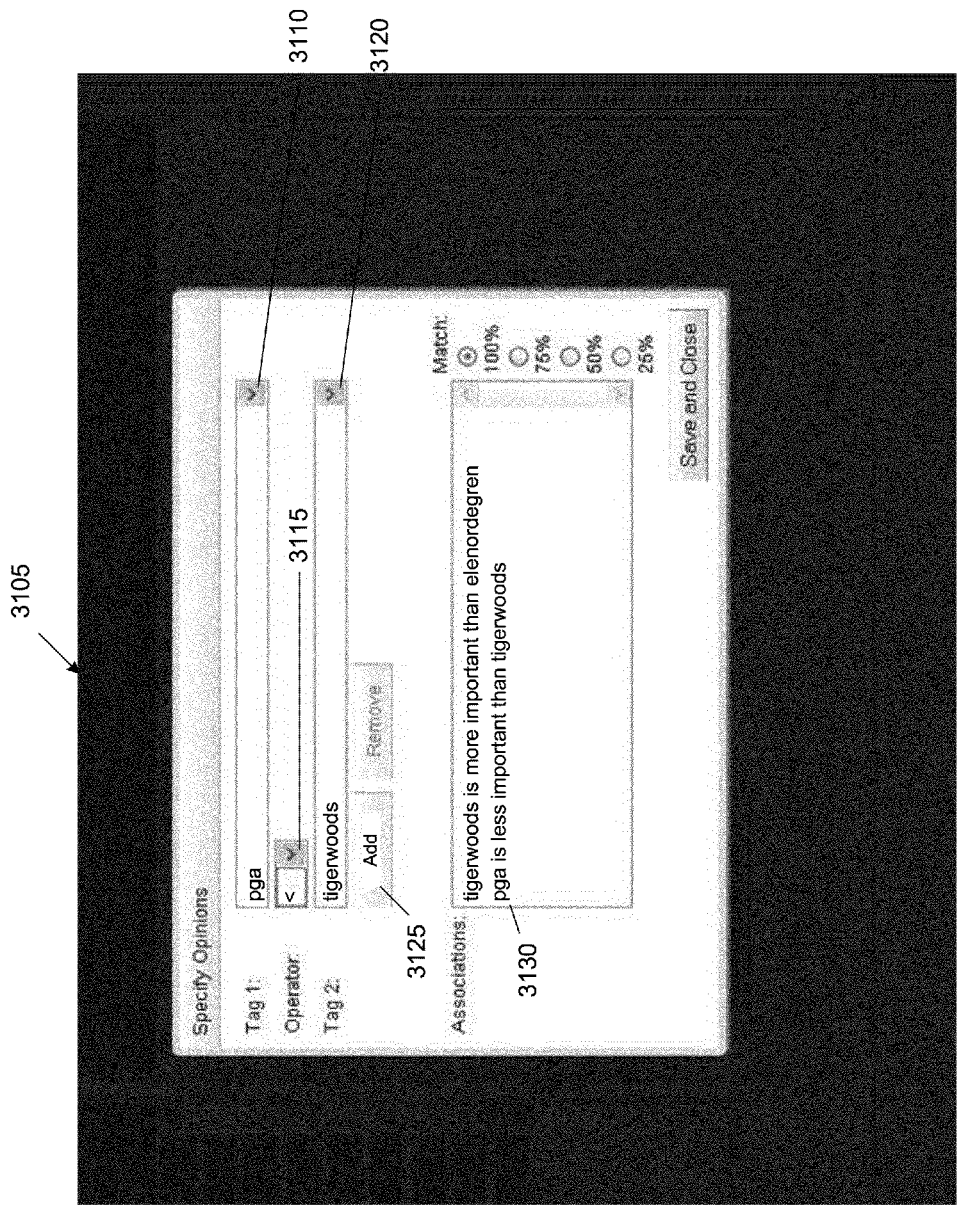
FIG. 36 illustrates an example search tool after the add button is selected to add a second relationship to the tag chain.
Figure 37:
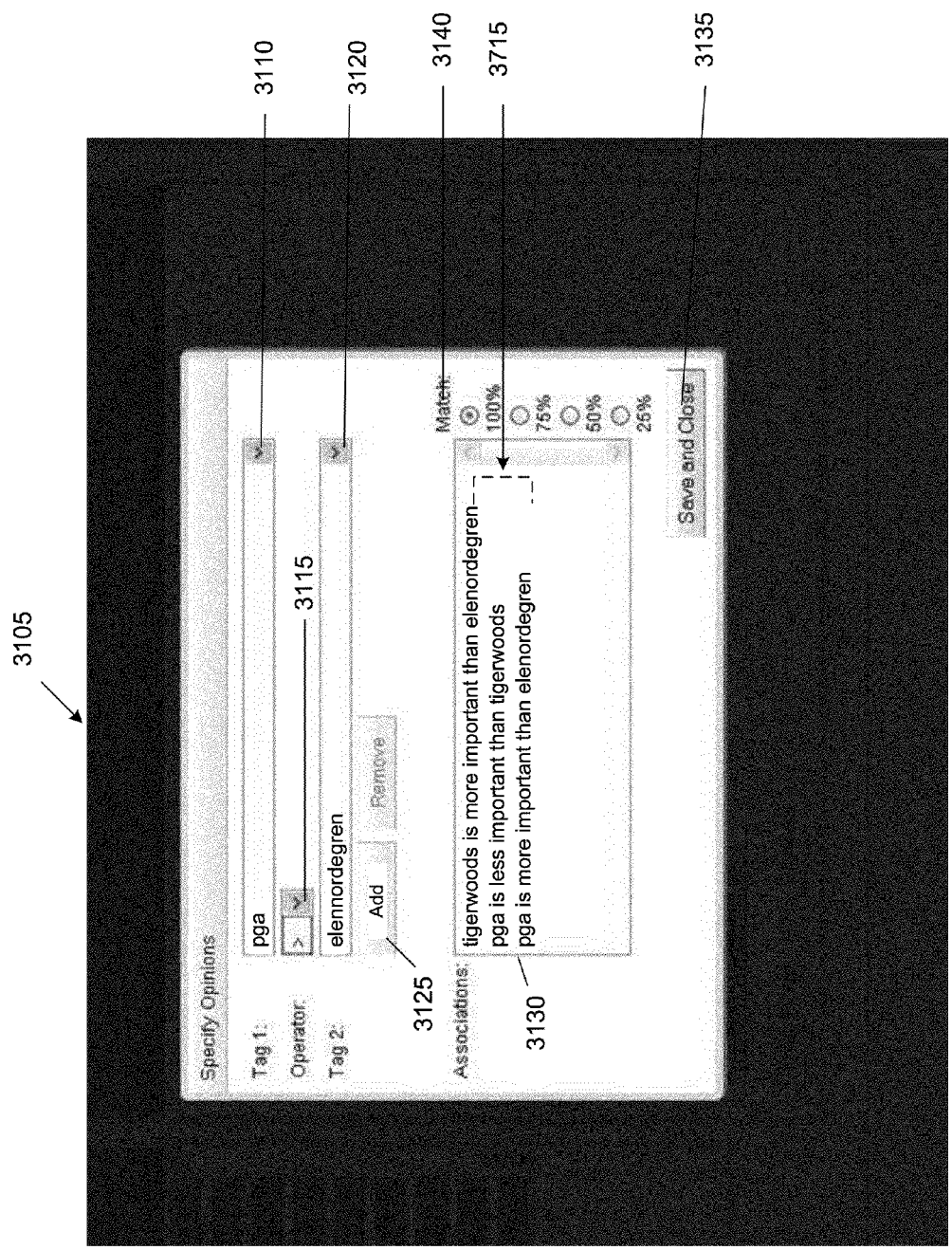
FIG. 37 illustrates an example search tool after the add button is selected to add a third relationship to the tag chain.

FIGS. 36-37 illustrate the search tool 3105 after the user specifies two more tag relationships as illustrated above in reference to FIGS. 32-34. In the example of FIG. 36, the user specifies the relationship between "pga" and "tigerwoods"

(i.e. "pga is less important than tigerwoods"). In the example of FIG. 37, the user specifies the relationship between "pga" and "elenordegren" (i.e. "pga is more important than elenordegren"). These three specified relationships create a tag chain 3715. In some embodiments, once the user selects which tag chain to search, the user can also select what percentage of the specified tag chain 3715 must match tag chains used to tag comments in Comment column 1685, in reference to FIG. 30, in order for those comments to meet the filtering threshold.

As FIG. 37 illustrates, a matching percentage can be specified through Match column 3140. Match column 3140 has four radio buttons, one of which can be selected at a time to select whether to match 100%, 75%, 50%, or 25% of the specified tag chain to the tag chains of the comments in Comment column 1685 in reference to FIG. 30. In other words, if the user selects the 100% button, opinions GUI 1605 will only filter out the comments in Comment column 1685, in reference to FIG. 30, that have been tagged with the entire tag chain 3715. However, if the user elects to match 50% of the tag chain 3715, opinions GUI 1605 will filter out the comments that have been tagged with at least half the tag chain 3715 (i.e. two out of three).

In the example of FIG. 37, a user is conveying an idea in its entirety. That is, the user is defining a complete instance of tag calculus or tag chain that includes one or more tag links. The user then applies a match parameter that includes a percentage to indicate a level of match. In some embodiments, a 100% match returns comments which are an exact match, and a 0% match returns comments that are in complete disagreement with the given tag calculus or tag chain.

Figure 38:
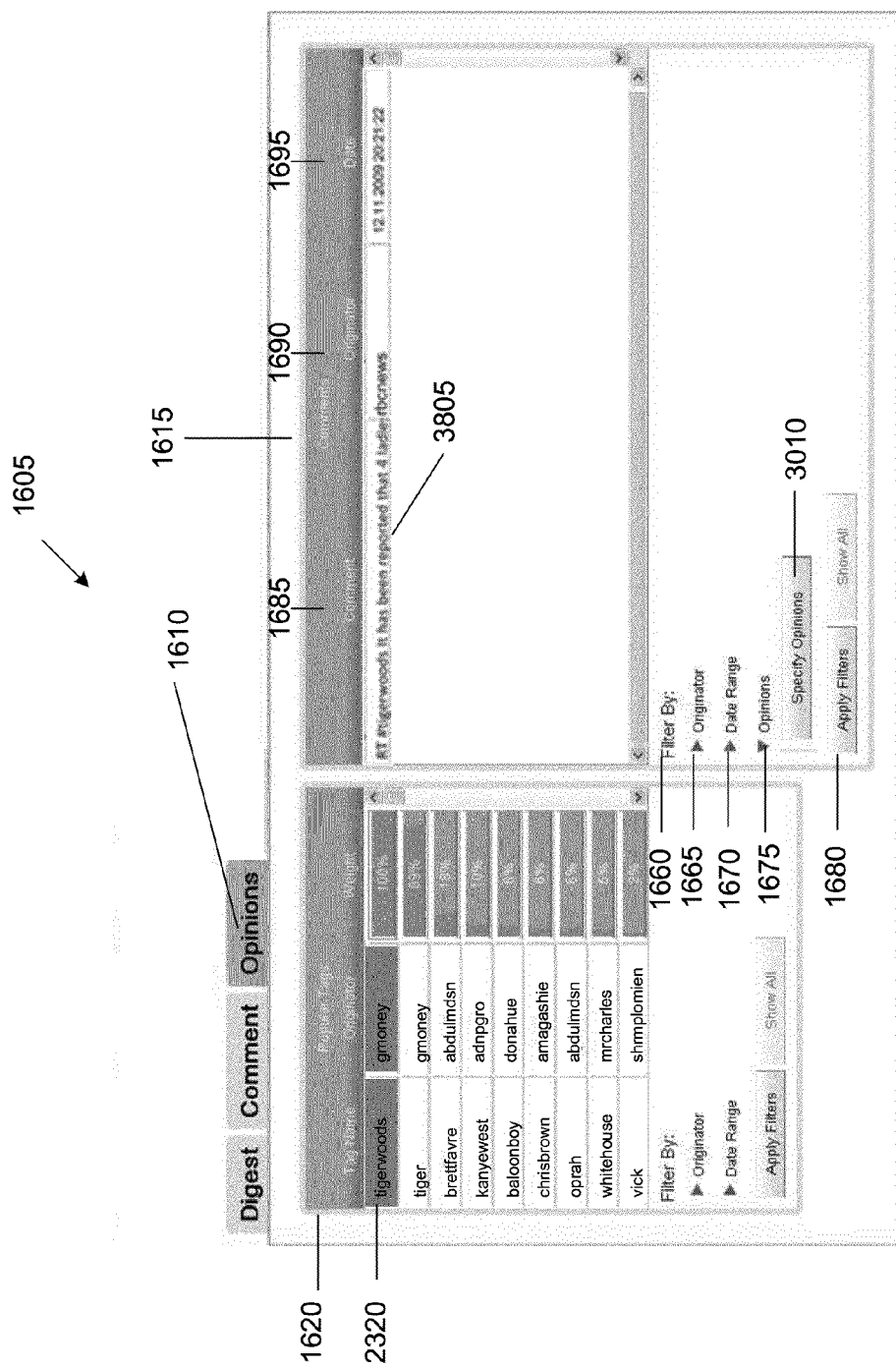
FIG. 38 illustrates an example opinion GUI after the tag chain is specified and the Apply Filters button is selected to filter comments by tag chains.

In the example of FIG. 37, the user selects the 100% button indicating that the entire tag chain 3125 must be contained in a comment's tag chain in order for the comment to be filtered out of the list of comments in Comment column 1685. Once the user completes the selection of an appropriate tag chain, the user can select "Save and Close" button 3135 to return to Opinion GUI 1605. FIG. 38 illustrates the Opinion GUI 1605 after the user selects "Save and Close" button 3135. Comment column 1685 contains only one comment 3805, the only comment whose tag chain matched tag chain 3715 completely. Comment 3805 is the same comment tagged and submitted above in reference to FIGS. 3-13.

In the examples illustrated in FIGS. 15-38, a user is presented with topics or tags related to a particular discussion. These tags are displayed as a sorted list based on the tags' popularity or level of usage. Accordingly, the sorted list appears under a heading entitled "Popular Tags". Also, in the example described above, the sorted list can be filtered based on date range (e.g., age of topics) and/or based on an originator of comments. In some embodiments, the originator represents a lead or an entity behind one or more topics.

Also, in the examples described above, once a topic is selected from a list of topics, a user is presented with different comments which include the selected topic. For example, when the topic is "giveaway", the user can view each individual comment associated with the "giveaway" topic in a comments display area. This comments area or list of comments can be reduced by filtering the list based on one or more of different types of filters. For example, the list may be filtered based on (1) the originator of the comments (e.g., lead); (2) date range (e.g., age of the comments); and (3) comments which may include a certain idea or sentiment.

In some embodiments, a list of topics or tags may be presented in the order of relevance. When a user selects a topic from this list, the user may be presented with products or services that match the selected topic. In some such embodiments, upon a selection of a product or service, the comments area may display any comments which have been made about that product or service. In some embodiments, one or more comments in the list of comments may be marked differently to differentiate them from other comments. For example, a comment appearing in "red" may be deemed to be a biased comment (e.g., provided by a product manufacturer or a service provider), while other comments appearing in black may be deemed non-biased comments (e.g., provided by different shoppers or users). In some embodiments, the filtering or searching operates based on a single link of a tag chain at a time, rather than based on an entire tag chain. For example, unlike returning comments that agree or disagree with a complete opinion (e.g., a tag chin), a search or filtering under this model returns comments based on a single link or an idea at a time.

C. Digest GUI

Figure 39:
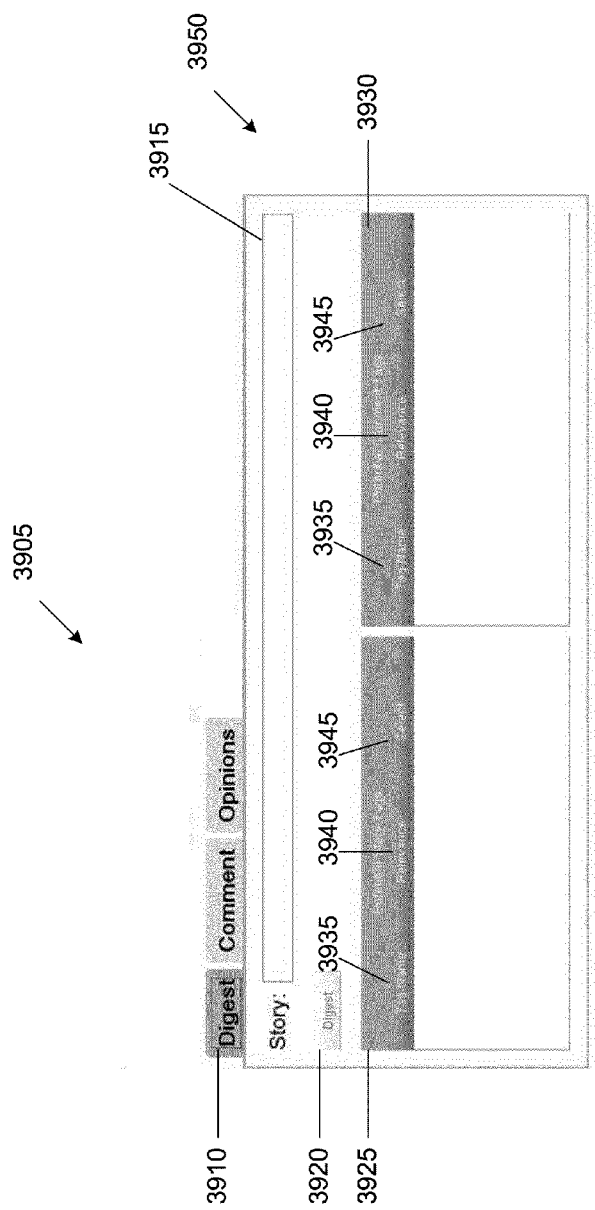
FIG. 39 illustrates an example Digest GUI at first glance for an example application of some embodiments of the invention.

Some embodiments of the invention provide the GUI tools to submit searchable content and receive feedback as to the best tags to use to tag content. FIG. 39 illustrates a digest GUI 3905 for an example client application of some embodiments that provides the tools to submit content for "digestion". GUI 3905 includes digest tool 3950 which includes text box 3915, Digest button 3920, and two display areas: the Potential Story Tags display area 3925 and Potential Comment Tags display area 3930. In some embodiments, display area 3925 and display area 3930 each include a Tag Name column 3935, a Relevance column 3940 and a Select column 3945.

The user arrives at the digest GUI 3905 by selecting Digest tab 3910. Once on the digest GUI 3905, a text box 3915 is provided to submit a story. A story includes any searchable written content (e.g., articles, websites, news, books, tweets, comments, messages, etc.). In some embodiments, a story of actual text can be submitted to text box 3915. In other embodiments, a website to which a story is posted and can be retrieved by digest GUI 3905 can be submitted. Once either a story or a website is entered in text box 3915, digest GUI 3905 analyzes the story, retrieves possible relevant tags that can be used to tag the story, and populates display area 3925 and 3930 with the tags and relevant data. In some embodiments, display area 3925 is populated with tags that may be used to tag larger content such as stories, while display area 3930 is populated with tags that may be used to tag more ephemeral content such as comments. In some embodiments, these related tags are keywords extracted by digest GUI 3915 from the story. In some embodiments, the tags are color-coded based on whether they have been previously used. For example, if a related tag is green, it has been used before by a previous user to tag content; whereas, if the tag is yellow, it has never been used as a tag.

Relevance column 3940 quantifies the relevance of each corresponding tag in percentages (e.g., the higher the percentage the more relevant the tag). The relevance of a tag may be a good indication of how frequently searched the tag is. This information can be used as a guide to determine the best tags with which to tag the story. Once relevant tags are suggested, the user can then select the appropriate tags with which to tag the story. Selection of tags with which to tag a story is further discussed below in reference to FIG. 41.

Figure 40:
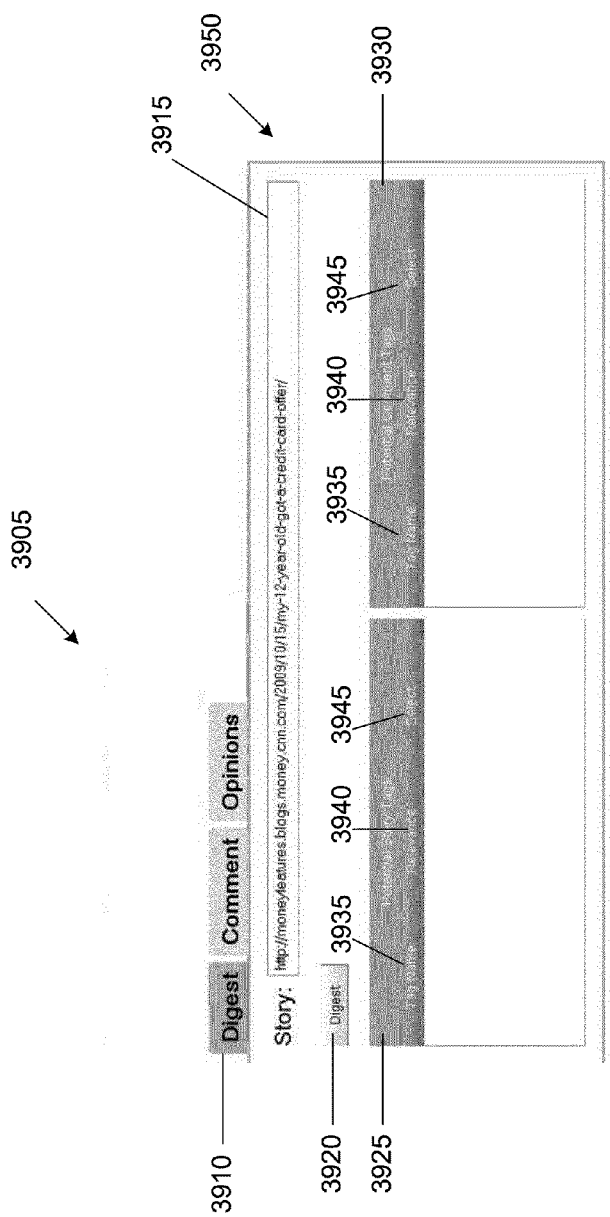
FIG. 40 illustrates an example Digest GUI after a website has been entered.

FIG. 40 illustrates a digest GUI 3905 of some embodiments after the user enters a website into text box 3915. In the example of FIG. 40, Potential Story Tags display area 3925 and Potential Comment Tags display area 3930 are empty. However, in some embodiments when Digest button 3920 is selected, the Potential Story Tags display area 3925 and Potential Comment Tags display area 3930 each divulge a list of tags that may be relevant to the story entered in text box 3915.

Figure 41:
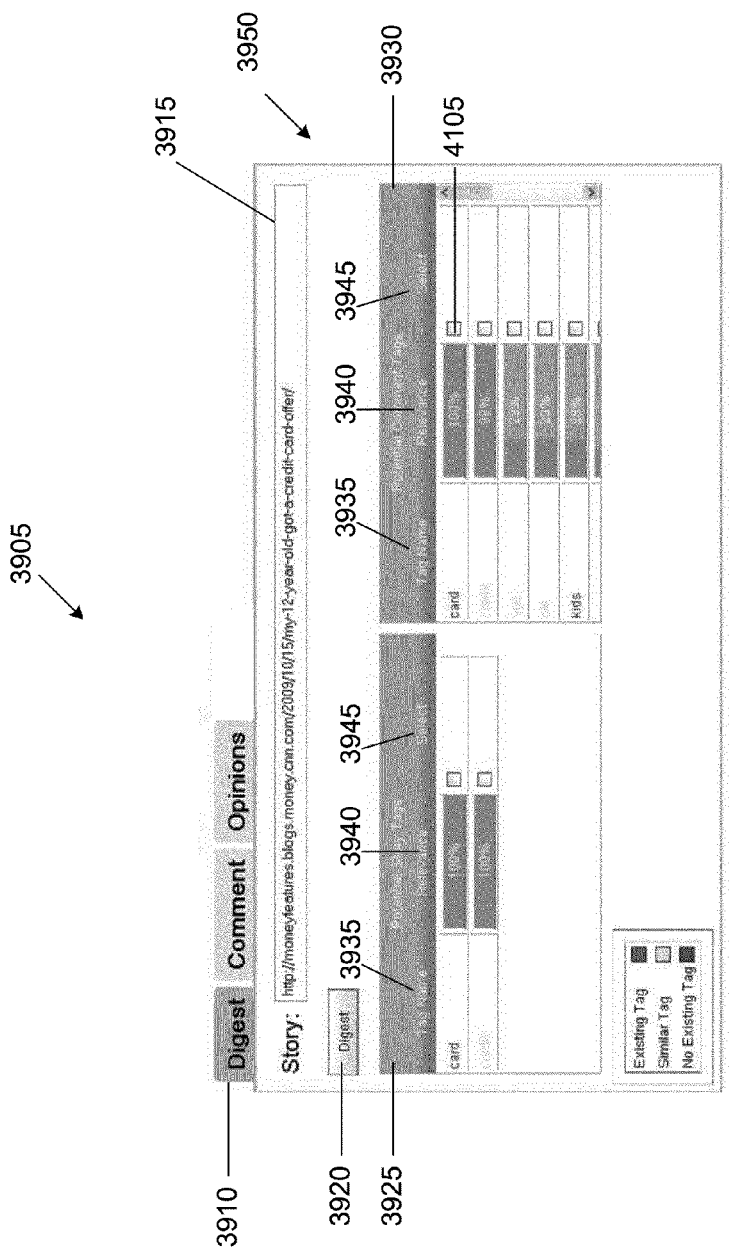
FIG. 41 illustrates an example Digest GUI after the Digest button has been selected to receive feedback regarding related tags.

FIG. 41 illustrates digest GUI 3915 after the user selects Digest button 3910. In the example of FIG. 41, digest GUI 3915 analyses the story and outputs related tags into Tag Name columns 3935. The example digest GUI 3915 of FIG. 41 also includes select box 4105 in select column 3945. In some embodiments, select column 3945 allows the user to select which tags to use by selecting the box 4105 corresponding to the desired tag.

Figure 42:
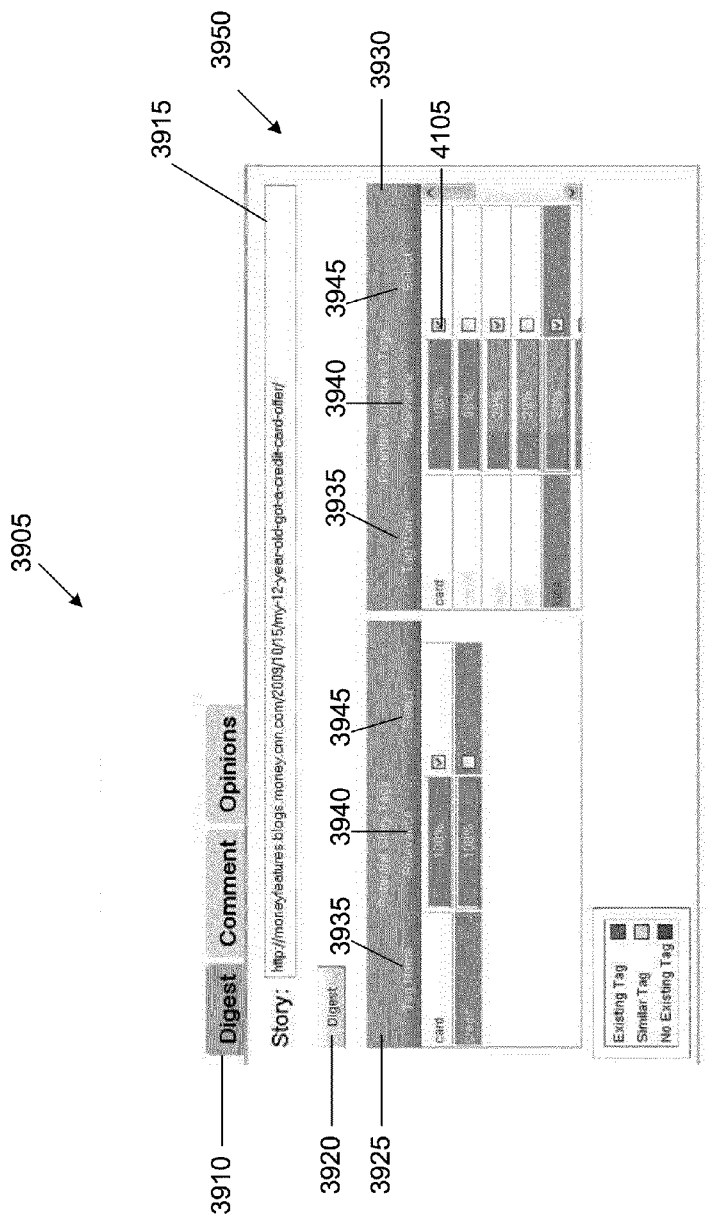
FIG. 42 illustrates an example Digest GUI after the preferred related tags are selected.

FIG. 42 illustrates digest GUI 3915 after the user selects tags with which to tag the story. In some embodiments, once these related tags are selected, they are inherited by a tagging mechanism that enables a user to tag content by using these suggested tags. For example, the related tags are inherited by input tags column 305 and subsequently by tagging tool 830 in reference to FIG. 8. Other examples on the use of a digest tool such as digest tool 3950 will be further described below in reference to FIGS. 43-48.

II. Other Examples

In addition to the example client application described above, one of ordinary skill in the art will realize that many of the processes described above can be used together or separately in a large number of other arenas and scenarios. The following additional examples implement sample methods for submitting, organizing, and searching for content on the New York Times online, on YouTube and on ITunes. It should be clear and apparent to one skilled in the art that these examples are not exhaustive and the invention is not limited to the embodiments set forth in the following additional examples.

A. New York Times

Figure 44:
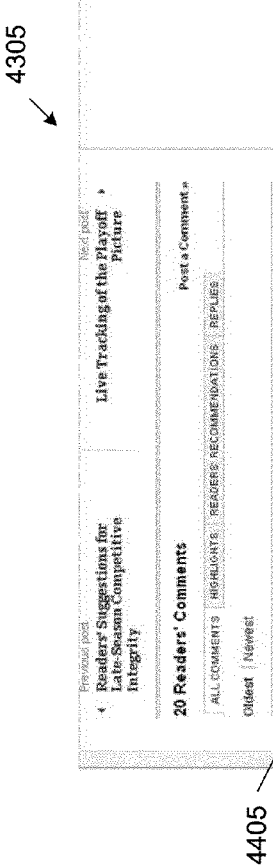
FIG. 44 illustrates the top portion of comments section of an example NYT blog.
Figure 45:
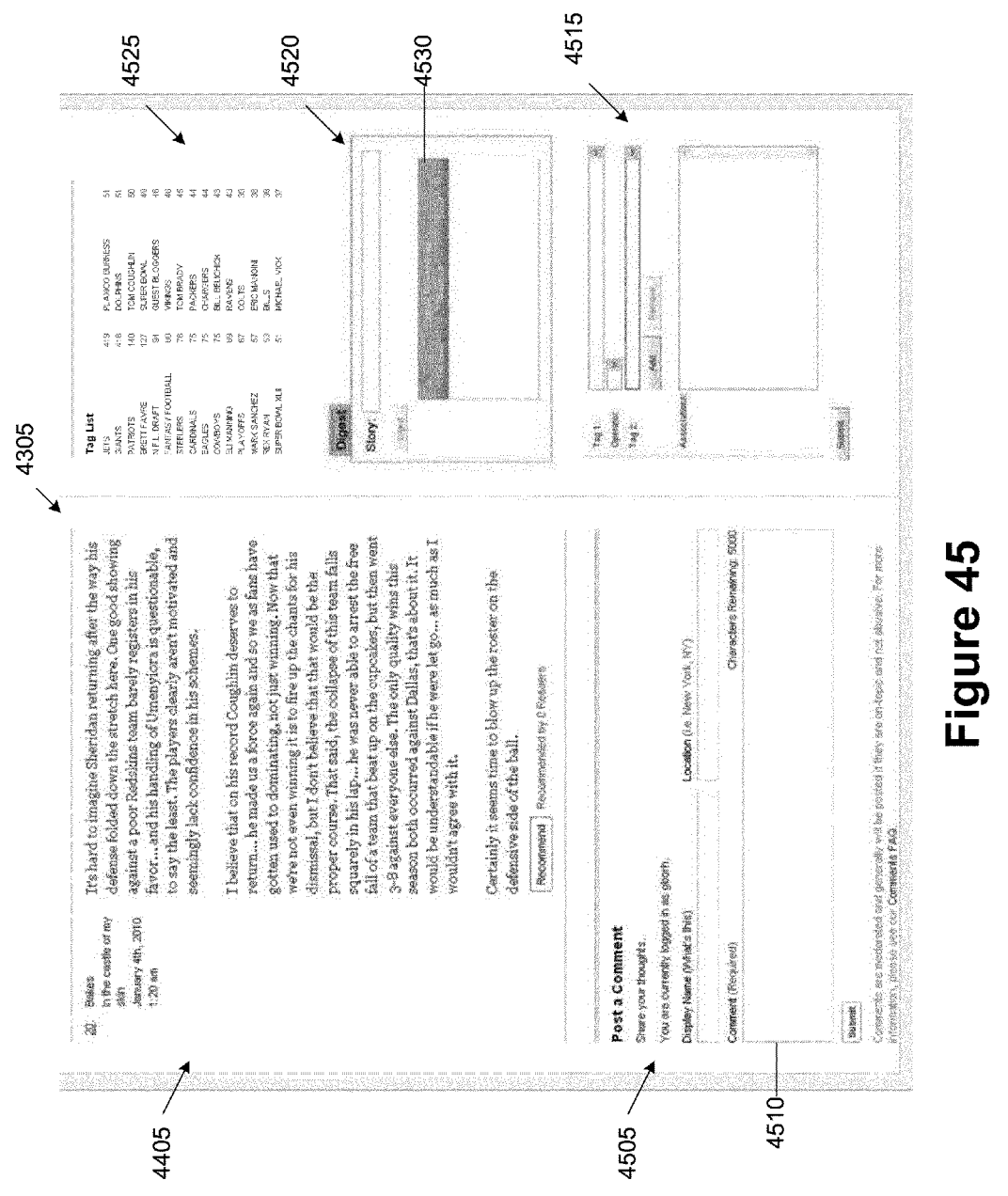

Some embodiments of the invention implement a method for submitting and searching for content on a news web page like the New York Times (NYT). FIG. 43 illustrates the top portion of a NYT blog 4305. At the bottom of the blog, a user can post comments regarding the article. FIG. 44 illustrates the post-article portion of NYT blog page 4305. More specifically, FIG. 44 displays the top portion of a list of comments posted by various users in comment section 4405 of NYT page 4305. The "Post a Comment" section 4505 is at the end of this list of comments, as illustrated in the example of NYT page 4305 of FIG. 45. FIG. 45 also includes comment box 4510, tagging tool 4515, digest tool 4520, and tag list 4525. Tagging tool 4515 is analogous to and operates in precisely the same way as tagging tool 830 in reference to FIG. 8. Similarly, digest tool 4520 is analogous to and operates in a similar fashion as digest tool 3950 in reference to FIG. 39. The only difference between digest tool 3950 and digest tool 4520 is that tool 3950 includes two display areas whereas tool 4520 includes only one display area. Digest tool 3950 includes display area 3925 which holds tags used to tag larger content such as stories and display area 3930 which holds tags used to tag more ephemeral content such as comments. Contrastingly, tool 4520 includes only one display area 4530 which, like display area 3930, holds tags used to tag comments.

In some embodiments, the user can post a comment on the article by entering a comment in comment box 4510, and tagging the comment using tagging tool 4515 and tag list 4525. In some embodiments, Tag List 4525 is a complete list of previously used tags to tag comments on NYT page 4305. In some embodiments, Tagging tool 4515 inherits those tags and allows the user to create relationships between tags as described above in reference to FIGS. 8-14. In other embodiments, Tagging tool 4515 inherits a list of suggested tags from Digest tool 4520 as opposed to the entire list from Tag List 4520. Digest tool 4520 gives the user feedback on which tags may be the best tags to use. In some embodiments, the user can receive suggestions as to which tags to use by entering the comment text into digest tool 4520. In other embodiments, the user can receive suggestions as to which tags to use by feeding the article text to digest tool 4520. In both scenarios, digest tool 4520 analyzes the text and outputs a list of suggested tags as described above in reference to FIGS. 39-42. Tagging tool 4515 inherits this list of tags once the desired tags are selected as described above in reference to FIG. 41.

Figure 46:
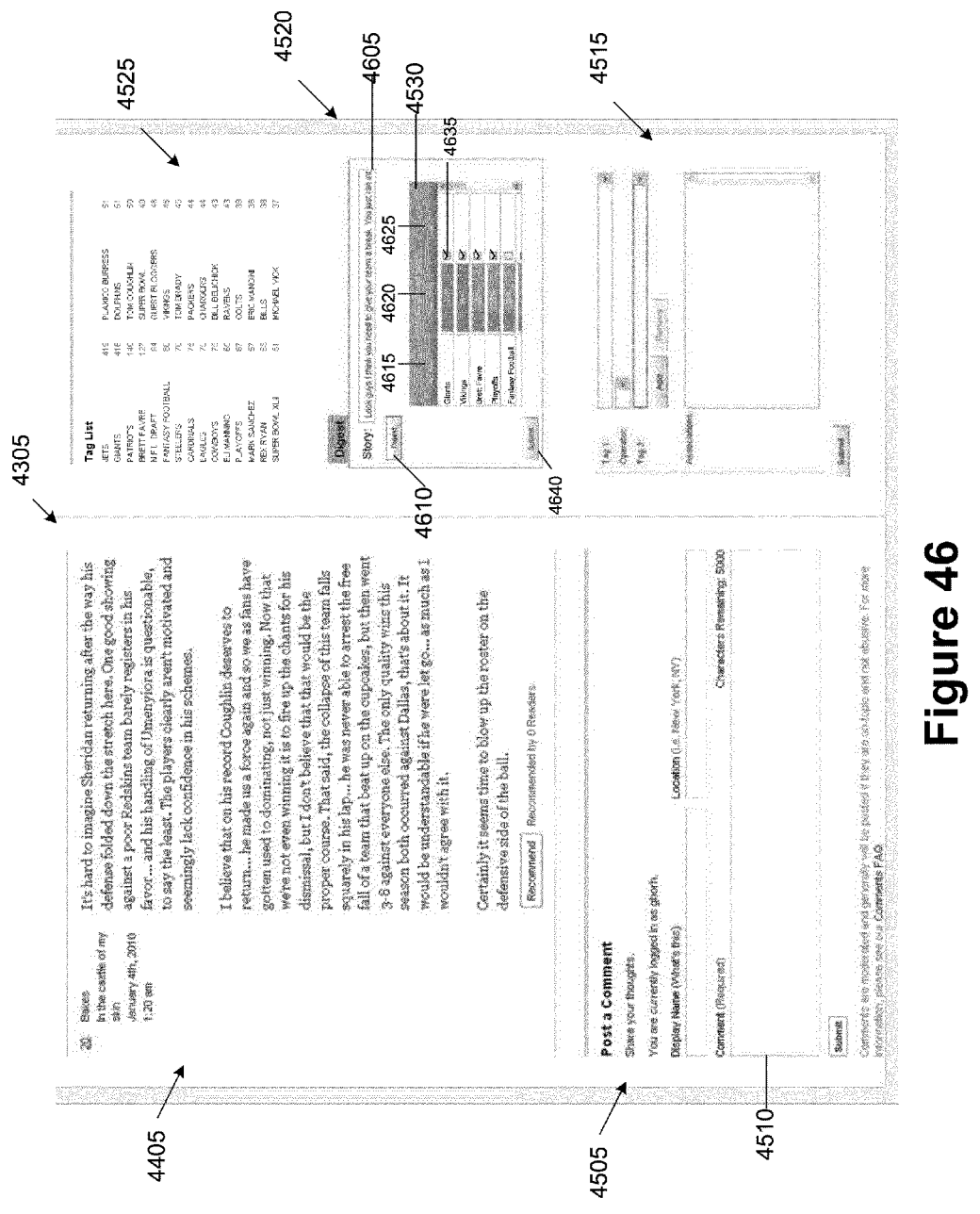

FIG. 46 illustrates NYT page 4305 after the user enters a user comment into text box 4605 and selects digest button 4610 to receive feedback from digest tool 4520. In some embodiments, the user can simply select digest button 4610 to receive feedback from digest tool 4520. In such an example, Digest tool 4520 analyzes the text of the article on NYT page 4305 and outputs suggested related tags into Tag Name column 4615 based on the article text. In the example of FIG. 46 however, digest tool 4520 analyzes the comment input in text box 4605 and outputs related tags into Tag Name column 4615. These related tags are derived from a pool of tag names compiled in tag list 4525. Relevance column 4620 quantifies the relevance of each corresponding tag in percentages (e.g., the higher the percentage the more relevant the tag). The Select column 4625 allows the user to select which tags to use by selecting box 4635. In the example of FIG. 46, the user selects four tags and selects submit button 4640.

Figure 47:
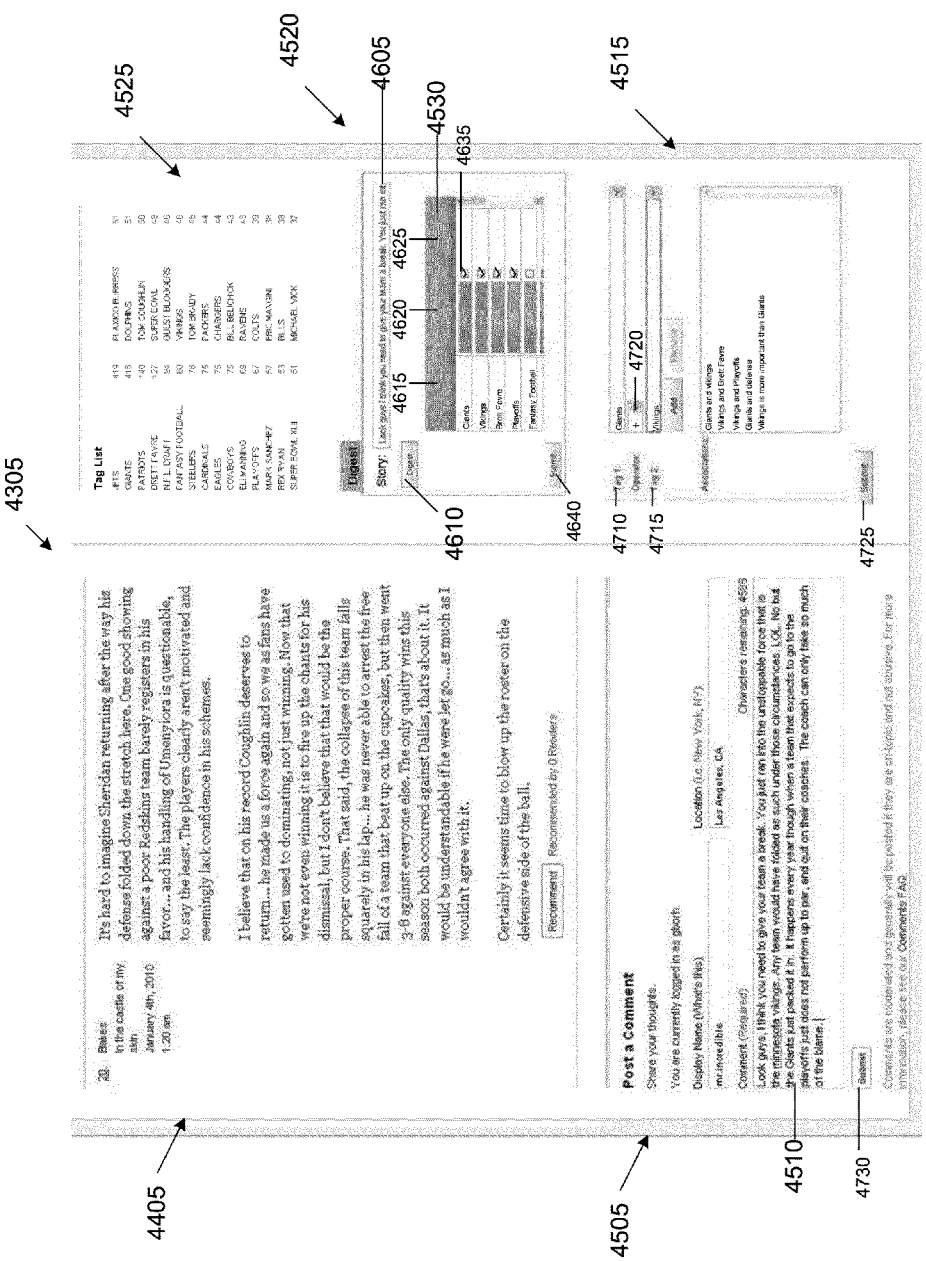
FIG. 47 illustrates NYT blog after four relationships are created and submitted using a tagging tool.
Figure 48:
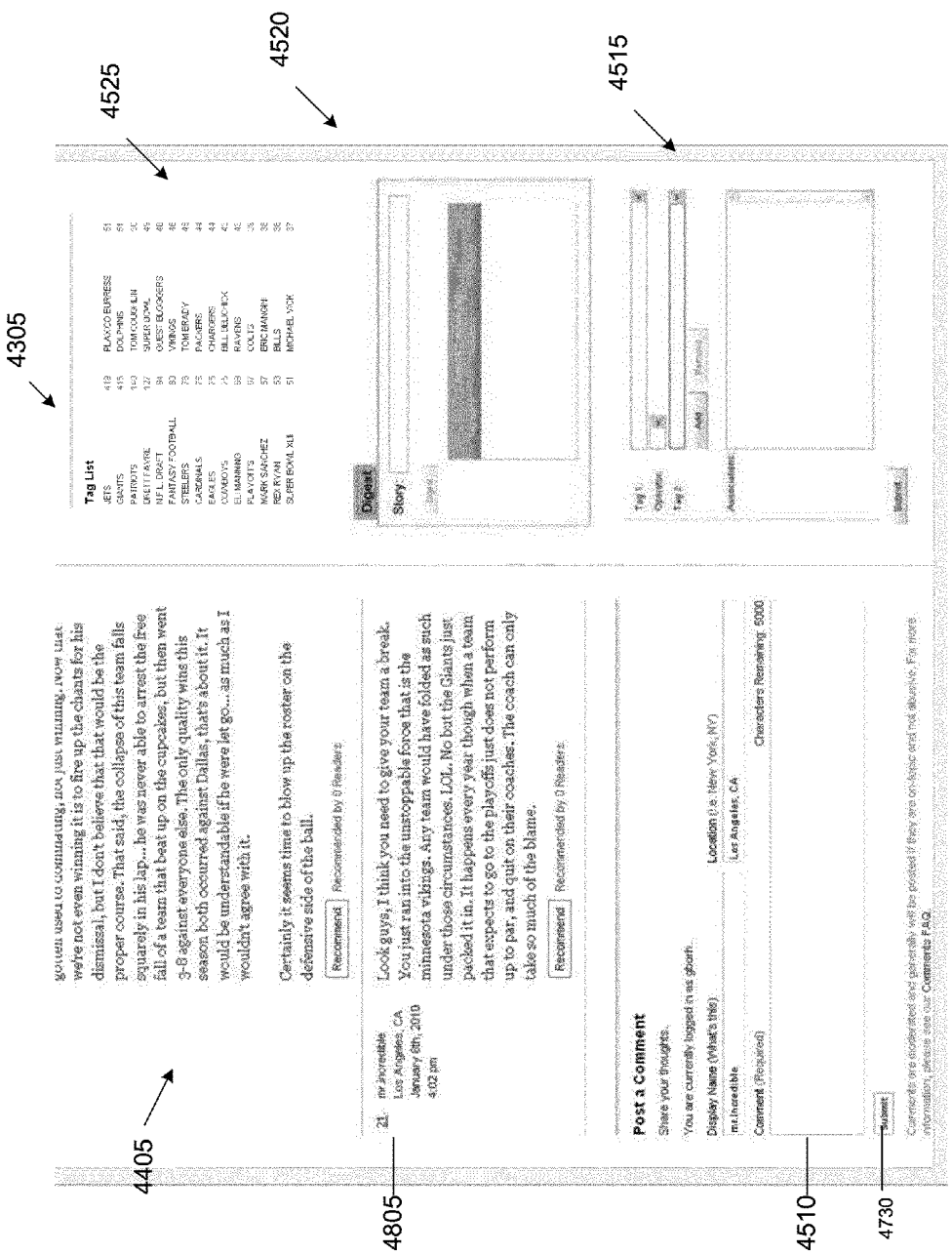
FIG. 48 illustrates NYT blog after the comment is submitted for posting in the comment section.

FIG. 47 illustrates NYT page 4305 after the user selects submit button 4640. Once the user selects submit button 4640, tagging tool 4515 inherits the selected tags. In some embodiments, the user can create tag relationships by selecting tags from Tag 1 menu 4710 and Tag 2 menu 4715 and selecting associated operators from Operator menu 4720. In some embodiments, the user can also manually enter any desired tag into menu 4710 or 4715 to create relationships. In the example of FIG. 47, the user enters the comment in comment box 4510, creates five tag relationships using tags inherited from Digest tool 4520 and selects submit button 4725 to associate the tags and tag chain with the comment. The user then selects submit button 4730 to submit the comment and its tags for posting. FIG. 48 illustrates NYT page 4305 after the user selects submit button 4730. In the example of FIG. 48, the comment is posted in slot 4805 in comment section 4405. As shown in FIG. 48, Digest tool 4520, tagging tool 4515 and comment box 4510 are cleared for subsequent commenting once the comment is posted.

Figure 49:
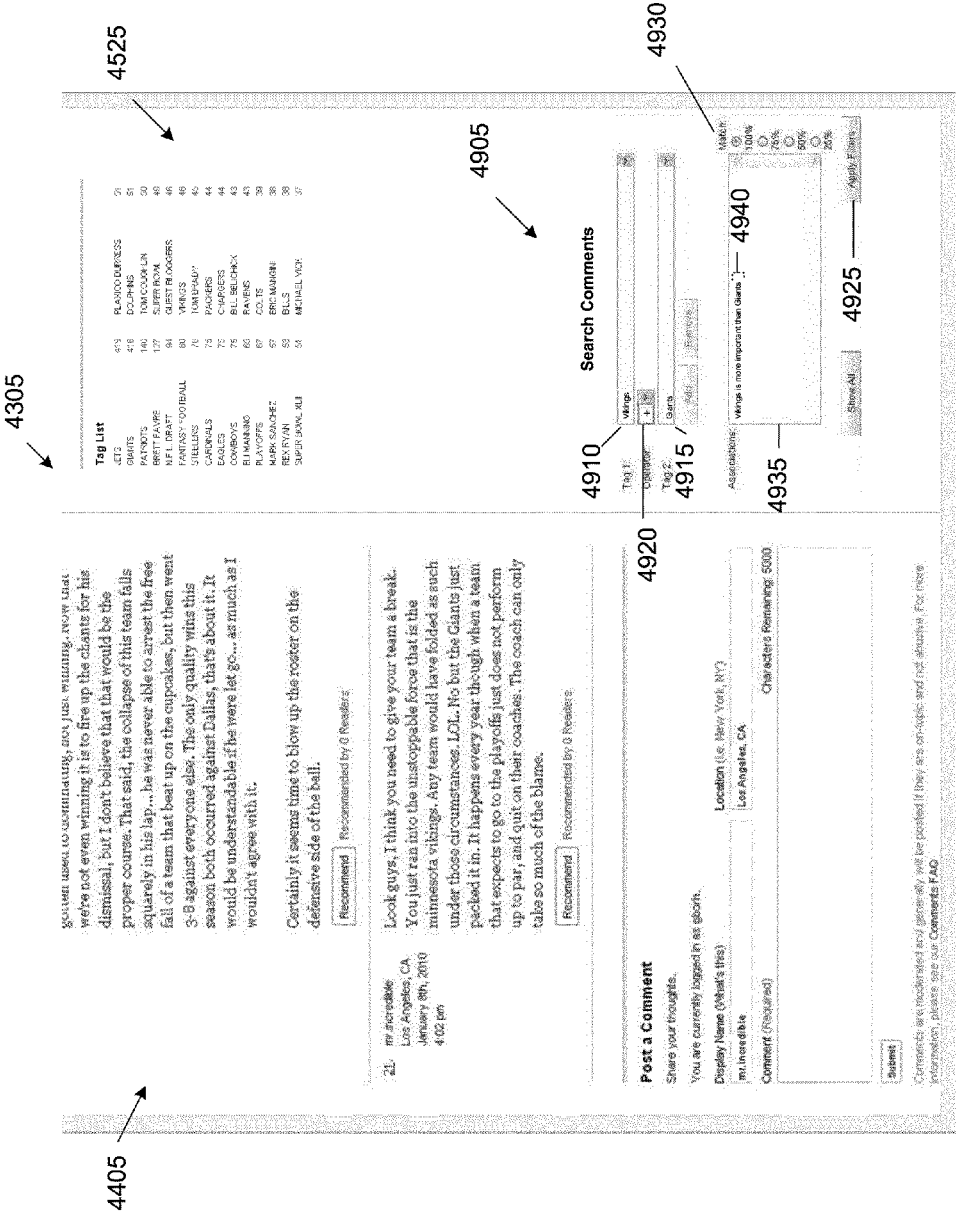
FIG. 49 illustrates NYT blog after a tag chain is specified to filter comments in the comment section.

Some embodiments of the invention also implement a method for searching for content on a news web page like the New York Times (NYT). FIG. 49 illustrates NYT page 4305 in which the user can search for comments. NYT page 4305 of FIG. 49 includes search tool 4905. Search tool 4905 is analogous and operates in precisely the same way as search tool 3105 in reference to FIG. 31. In some embodiments, the user can search a comment on NYT page 4305 by using search tool 4905. In some embodiments, the user can specify which sort of comment the user seeks by searching for specific tag relationships that may be associated with the sought out comment. The user can search for tag relationships by selecting tags from Tag 1 menu 4910 and Tag 2 menu 4915 and selecting associated operators from Operator menu 4920. In some embodiments, these tags are a complete list of tags derived from a pool of tag names compiled in tag list 4525. In some embodiments, the user can also manually enter any desired tag into menu 4910 or 4915 to search for relationships. In the example of FIG. 49, the user selects the desired tag relationship as described above in the examples of FIG. 32-37. In some embodiments, once the user selects which tag chain to search, the user can also select what percentage of the specified tag chain must match tag chains tagged to comments in comment section 4405 in order for those comments to meet the filtering threshold.

In the example of FIG. 49, the user specifies the aforementioned matching percentage through Match column 4930. Match column 4930 has four radio buttons, one of which can be selected at a time to select whether to match 100%, 75%, 50%, or 25% of the specified tag chain to the tag chains of the comments in Comment section 4405. In other words, if the user selects the 100% button, search tool 4905 only filters out the comments in Comment section 4405 that have been tagged with the entire tag chain specified in Associations box 4935. In the example of FIG. 49, there is only one relationship specified in the tag chain, hence, the user selects the 100% button to ensure the specified relationship is tagged to the filtered comments. The user selects "Apply Filters" button 4925 to obtain the filtered comments.

Figure 50:
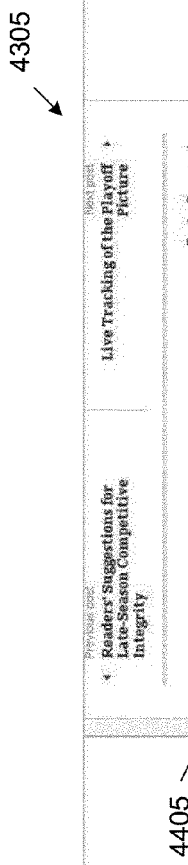
FIG. 50 illustrates NYT blog after the comments section is filtered based on the desired tag chain.

FIG. 50 illustrates NYT page 4305 after the user selects "Apply Filters" button 4925 in reference to FIG. 49. As shown in FIG. 50, Comment section 4405 is filtered to display only comments tagged with tag relationship 4940 in FIG. 49. Comment 5005 is the only comment tagged with tag relationship 4940, hence the only one displayed in section 4405.

B. YouTube

Figure 51:
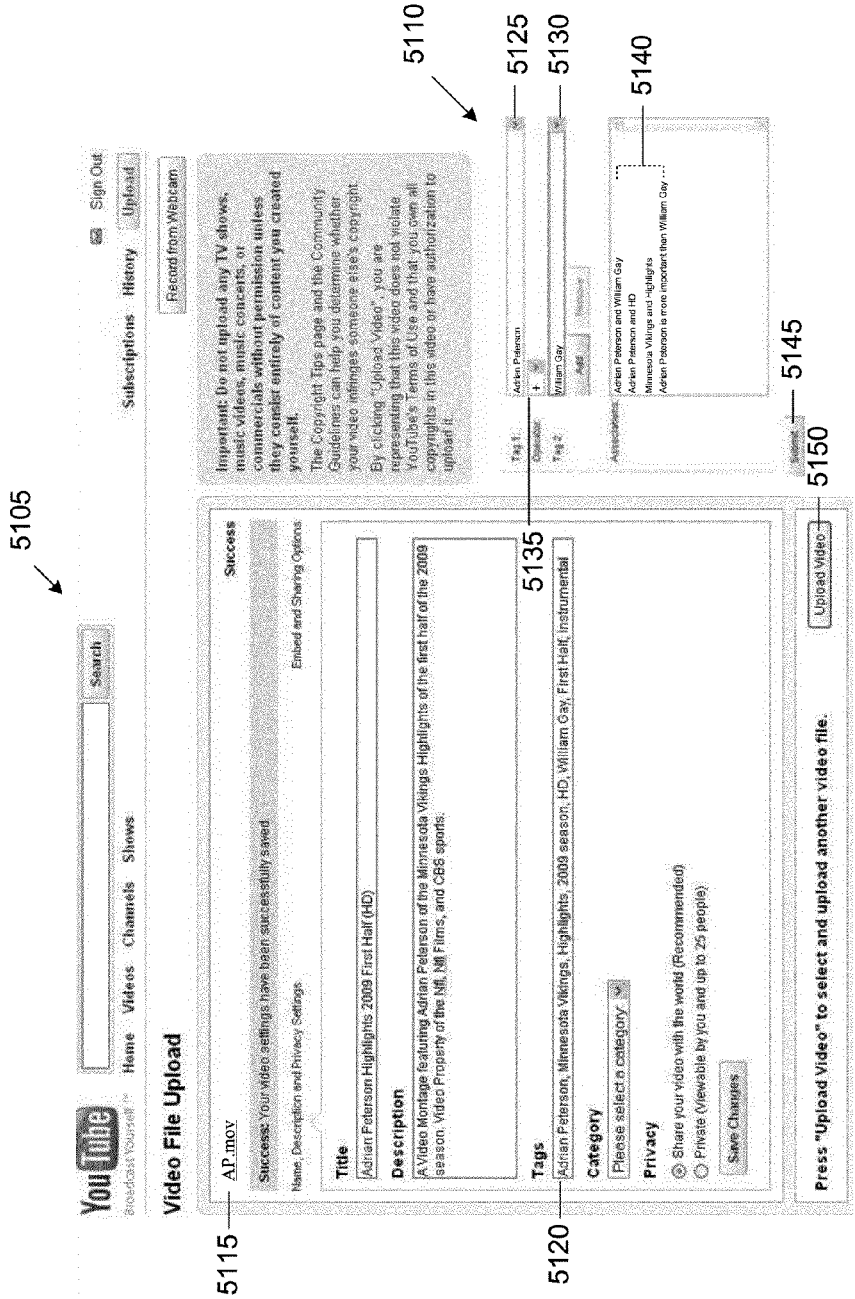
FIG. 51 illustrates a YouTube video file upload GUI after a video has been tagged with tags and tag chains.

Some embodiments of the invention implement a method for submitting and searching for content on a video sharing website such as YouTube. FIG. 51 illustrates a YouTube video file upload GUI 5105 in which a user can upload, title, describe and tag a video for posting on the YouTube website. YouTube GUI 5105 includes video file 5115, tagging tool 5110, text box 5120, submit button 5145, and "Upload Video" button 5150. In some embodiments, tagging tool 5110 is analogous to and operates in precisely the same way as tagging tool 830 in reference to FIG. 8. In some embodiments, the user can tag a video for posting by using tagging tool 5110. GUI 5105 allows the user to input tag names into text box 5120. Once the tags are input, Tagging tool 5110 inherits those tags and allows the user to create tag chains by creating relationships between tags as described above in reference to FIGS. 8-14. Once the tag chain is created, the video can be tagged and posted with the tag and tag chains, allowing a second user to find it by searching for the specified tags or tag chains.

In the example of FIG. 51, the user types in several tags into text box 5120 to associate with movie file 5115. In some embodiments, tagging tool 5110 inherits these tags into Tag 1 menu 5125 and Tag 2 menu 5130. The user can create a tag chain to associate with video file 5115 by selecting tags from Tag 1 menu 5125 and Tag 2 menu 5130 and selecting associated operators from Operator menu 5135. In the example of FIG. 51, the user creates tag chain 5140 and selects submit button 5145 to associate the tag chain to the video file 5115. The user then selects Upload Video button 5150 to submit the video 5115, its tags, and tag chain for posting.

Figure 52:
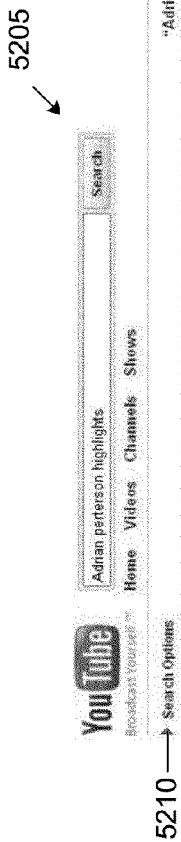
FIG. 52 illustrates a YouTube search GUI after the video is submitted and a search is performed.

Some embodiments of the invention also implement a method for searching for content on a video sharing website such as YouTube. FIG. 52 illustrates YouTube search GUI 5205 in which the user searches and retrieves results for videos on "Adrian Peterson Highlights." YouTube search GUI 5205 includes "search options" button 5210. The search can be further narrowed by clicking on "search options" button 5210 to bring up a search options menu. Within that search options menu, there is an "additional search options" button 5305 as illustrated the example YouTube search GUI 5205 in FIG. 53. If button 5305 is selected, as is done in the example of FIG. 53, search tool 5310 is displayed. In some embodiments, search tool 5310 is analogous and operates in precisely the same way as search tool 3105 in reference to FIG. 31. In some embodiments, the user can narrow searches for videos on YouTube by using search tool 5310. The user can specify which sort of videos the user seeks by searching for specific tag relationships that may be associated with the sought out videos. The user can search for tag relationships by selecting tags from Tag 1 menu 5315 and Tag 2 menu 5320 and selecting associated operators from operator menu 5330. In some embodiments, menus 5315 and menu 5320 inherit a complete list of tags tagged to videos from the initial search result. In some embodiments, the user can manually input desired tags into menu 5320 and menu 5315 in order to create tag relationships.

Figure 53:
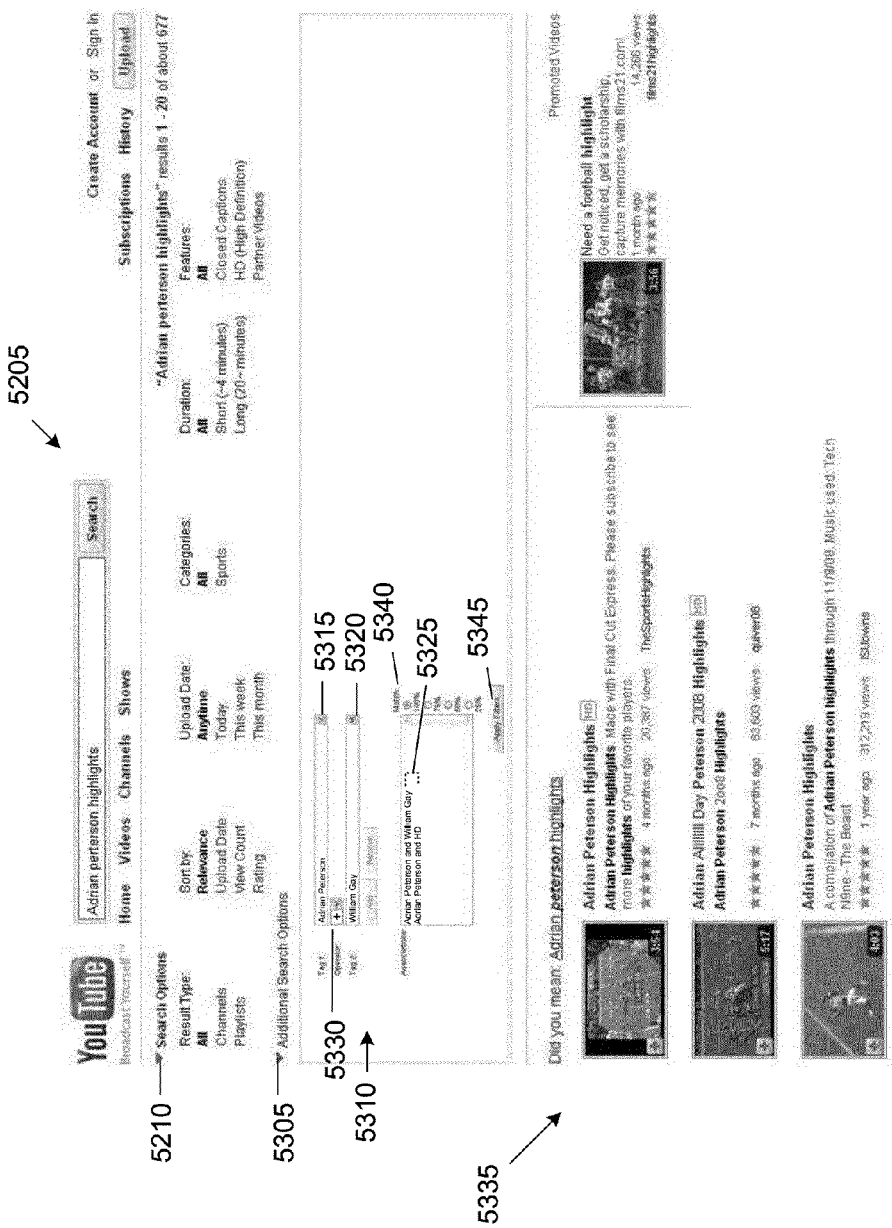
FIG. 53 illustrates a YouTube search GUI after the Additional Search Options Button is selected and a tag chain is created to filter video search results.

In the example of FIG. 53, in addition to searching for NFL star Adrian Peterson's highlights, the user wants to search for Adrian Peterson highlight videos that (1) involve NFL player William Gay and (2) is in high definition. Hence, in the example of FIG. 53, the user selects "Adrian Peterson and William Gay" and "Adrian Peterson and HD" as desired tag relationships in the same manner described above in reference to FIGS. 32-37.

In some embodiments, once the user selects tag chain 5325 to search, the user can also select what percentage of tag chain 5325 must match tag chains tagged to videos in video search result section 5335 in order for those videos to meet the filtering threshold. FIG. 53 illustrates YouTube search GUI 5205 in which the user can specify the aforementioned matching percentage through Match column 5340. Match column 5340 has four radio buttons, one of which can be selected at a time to select whether to match 100%, 75%, 50%, or 25% of the specified tag chain 5325 to the tag chains of the videos in video search result section 5335. In other words, if the user selects the 100% button, search tool 4905 only filters out the videos in video search result section 5335 that have been tagged with the entire tag chain 5325. In the example of FIG. 53, the user selects the 100% button to ensure the entire tag chain 5325 is contained in the filtered videos (i.e. that all the videos are in HD and involve William Gay). The user selects "Apply Filters" button 5345 to obtain the filtered video list.

Figure 54:
FIG. 54 illustrates a YouTube search GUI after the search results have been filtered.
Figure 54:

FIG. 54 illustrates YouTube search GUI 5205 after the user selects "Apply Filters" button 5345 in reference to FIG. 53. As shown in FIG. 54, video search result section 5335 is filtered to display only videos tagged with tag chain 5325 in reference to FIG. 53. In the example of FIG. 54, the search results reveal that only two videos are tagged with tag chain 5325, one of them being video 5405 which is the same as video 5115 tagged and posted above in reference to FIG. 51.

C. ITunes

Figure 55:
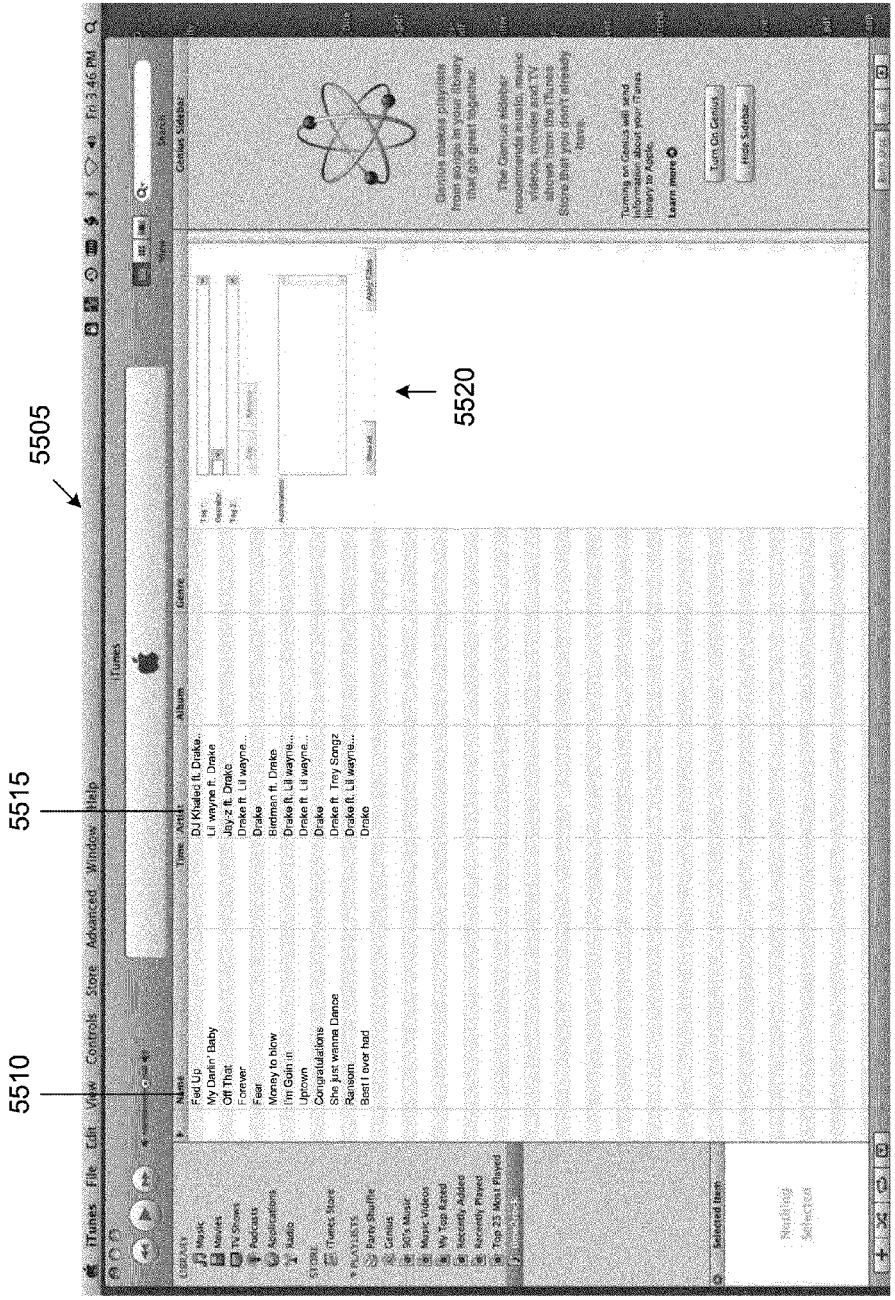
FIG. 55 illustrates an example ITunes music playlist GUI with a search tool.

Some embodiments of the invention implement a method for searching for and sorting through music on a digital media player application such as ITunes. FIG. 55 illustrates an example ITunes music playlist GUI 5505 for some embodiments of the invention. Playlist GUI 5505 includes Name column 5510, Artist column 5515, and search tool 5520. Search tool 5520 is analogous to and operates in a similar fashion as search tool 3105 in reference to FIG. 31. The difference between search tool 5520 and search tool 3105 is that tool 5520 does not have a match column analogous to match column 3140 in reference to FIG. 31.

In the example of FIG. 55, playlist GUI 5505 displays a playlist which includes twelve songs, each song previously tagged. In this example, each song is tagged with its respective artists' names, however, in some embodiments the songs are tagged with the song's album name, the song's genre, etc. Some embodiments of this invention allow a user to filter the songs names in Name column 5510 based on artist names in Artist column 5515 by using search tool 5520. In some embodiments, search tool 5520 inherits the names of the tags (i.e. artists) of each song in the playlist. The user can specify which sort of song the user prefers in a playlist by searching for specific tag relationships that may be associated with the sought out songs. For example, the user can sort out and retrieve songs that are collaboration between two artists, or sort out and reject songs whose artist the user prefers not to listen to.

Figure 56:
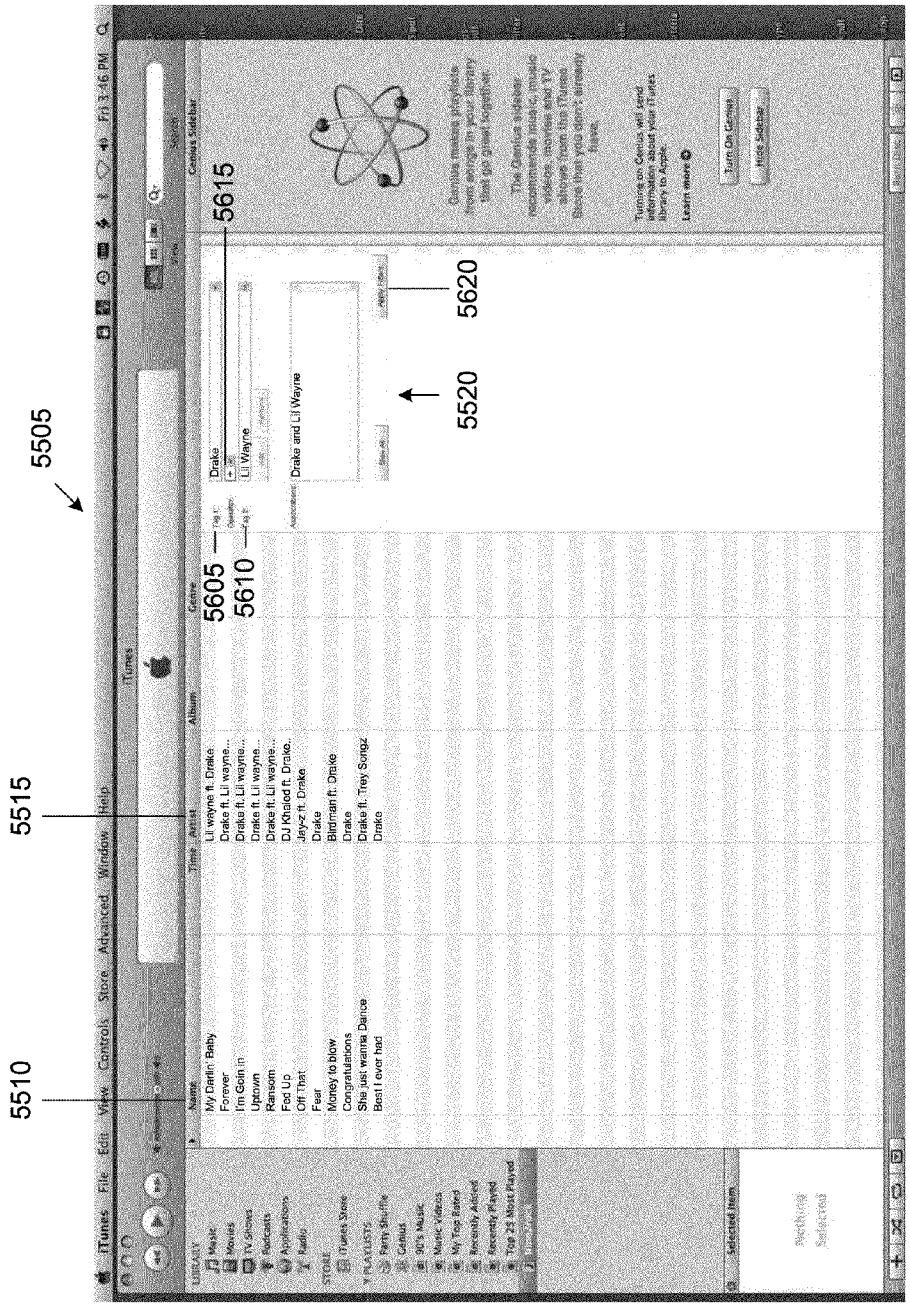
FIG. 56 illustrates an example ITunes music playlist GUI after the playlist is filtered by specifying a first tag relationship with the search tool.

FIG. 56 illustrates ITunes music playlist GUI 5505 in which the user filters songs that are a collaboration between two artists "Drake" and "Lil Wayne". The user creates a relationship between the two tags "Drake" and "Lil Wayne" by selecting the tags from Tag 1 menu 5605 and Tag 2 menu 5610 and selecting associated add operator "+" from Operator menu 5615. As shown in FIG. 56, when the user selects "Apply Filters" button 5620, all songs tagged with both "Lil Wayne" and "Drake" move to the top of the list, while all other songs move to the bottom.

Figure 57:
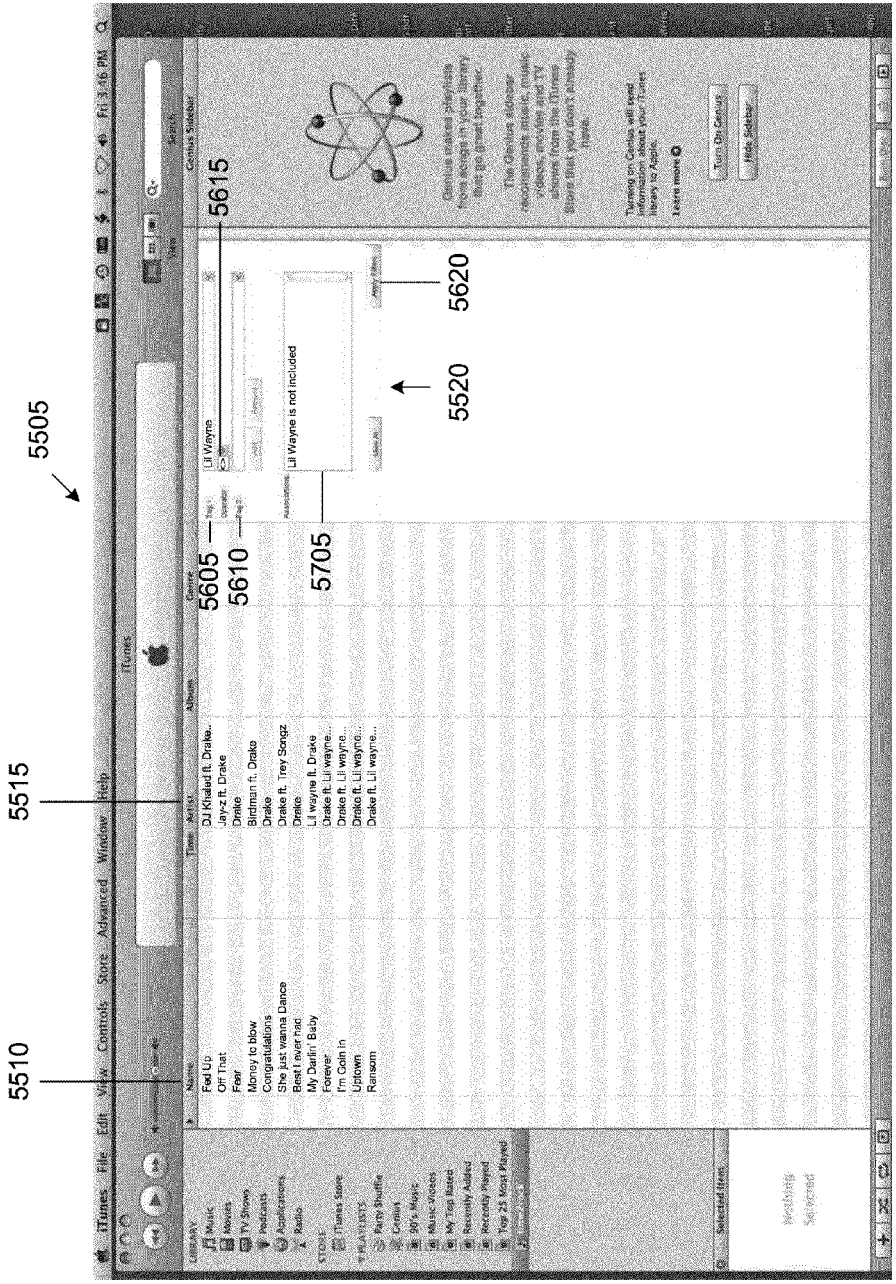
FIG. 57 illustrates an example ITunes music playlist GUI after the playlist is filtered by specifying a second tag relationship with the search tool.

Conversely, the user can move to exclude an artist from a desired playlist. FIG. 57 illustrates ITunes music playlist GUI 5505 in which the user filters songs that do not include artist "Lil Wayne". The user creates a relationship by selecting tag "Lil Wayne" from Tag 1 menu 5605 and selecting associated closed operator "<>" from operator menu 5615. This created relationship means songs tagged with "Lil Wayne" should be excluded from the desired playlist as stated in text box 5705. As shown in FIG. 57, when the user selects "Apply Filters" button 5620, all songs tagged with "Lil Wayne" move to the bottom of the list, while all other songs move to the top of the list.

The examples given in FIGS. 56 and 57 are merely examples and not exhaustive as to how a user can search through music. For example, in some embodiments, a user may sort a playlist by giving priority to one artist over another (i.e. Lil Wayne is more important than Faith Hill). In addition, in some embodiments of the invention, the filtering process involves deleting the undesired songs off the list completely as opposed to sorting and filtering them to the bottom of the list.

III. Sponsored Tags

In conjunction with the tagging capabilities described above, some embodiments provide sponsored or featured tags. In some embodiments, these tags are a special category of tags that are highlighted, marked, and/or prominently placed to differentiate them from other tags. Different entities (e.g., people, companies, organizations) can use these special tags for different purposes such as to advertise products or services, to perform market researches, etc.

Figure 58:
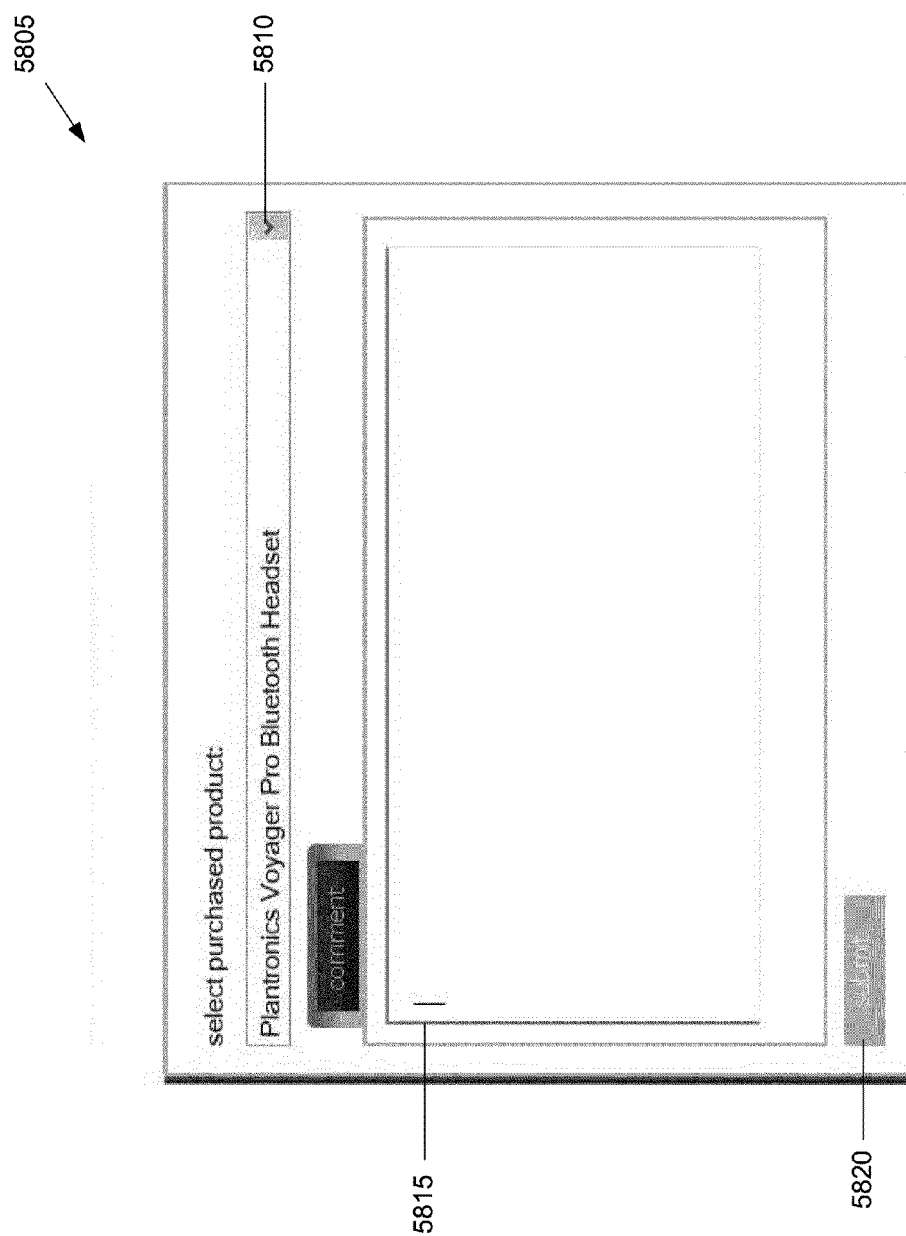
FIG. 58 provides an illustrative example of a GUI that displays sponsored tags.
Figure 59:
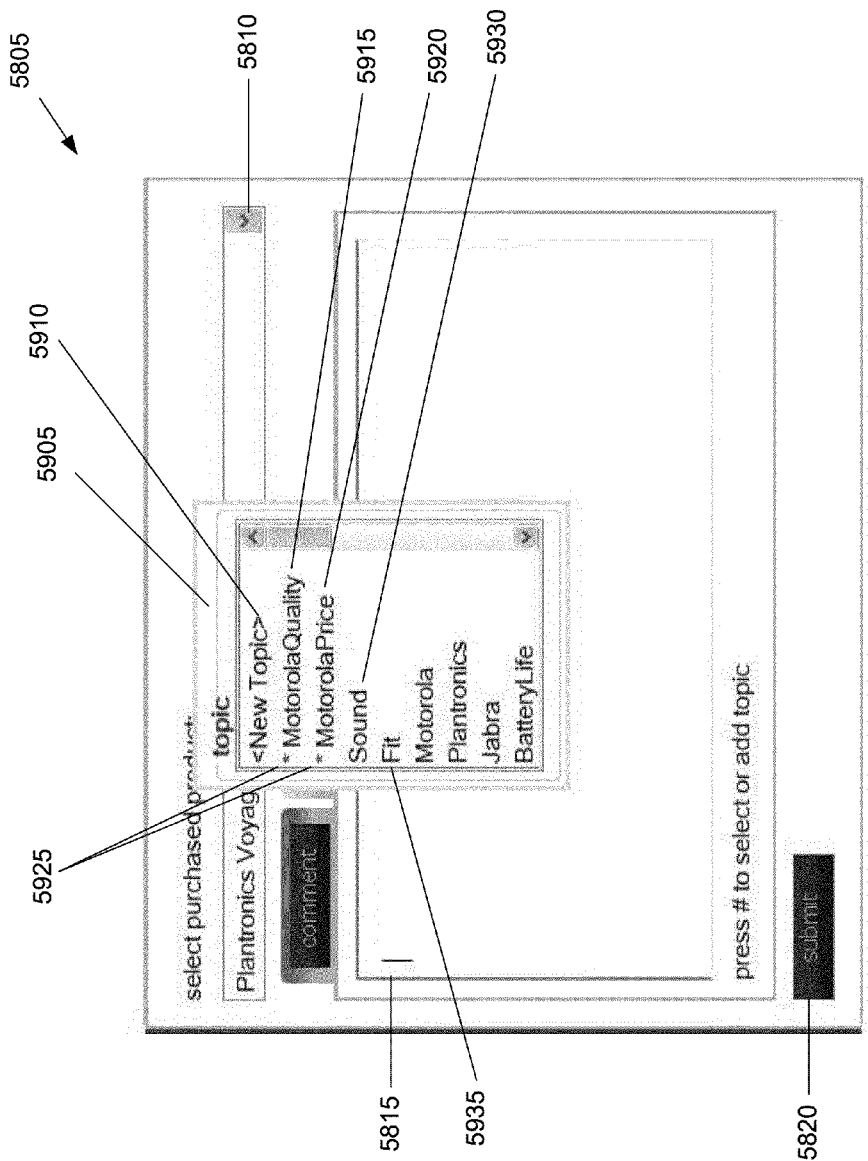
FIG. 59 provides an illustrative example of a list of tags that includes sponsored tags.
Figure 60:
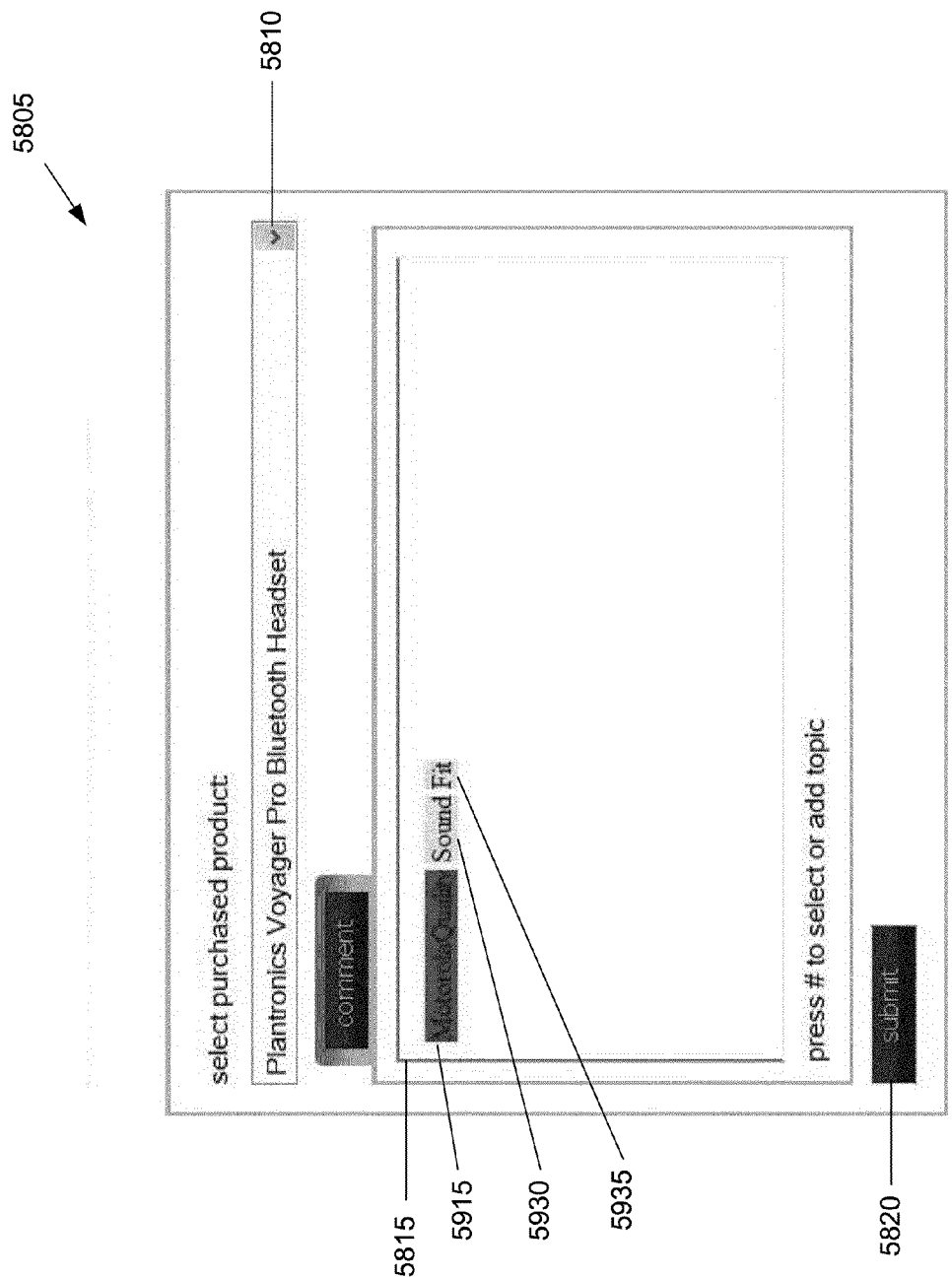
FIG. 60 provides an illustrative example of displaying sponsored and non-sponsored tags.

FIGS. 58-60 provides an illustrative example of using sponsored tags. In this example, the sponsored tags are displayed in a comment GUI 5805. However, the sponsored tags may be displayed elsewhere along with other non-sponsored tags, in some embodiments. The operations of the GUI 5805 will be described by reference to FIGS. 58-60 below. Before describing the operations, the elements of the GUI 5805 will be described by reference to FIG. 58. As shown in FIG. 58, the GUI 5805 includes a product selection control 5810, a text area 5815, and a submit button 5820.

The product selection control 5810 allows a user to select a product to input a comment. In the example illustrated in FIG. 58, a user selection of the control 5810 causes a list of different products to be displayed. The user can scroll through the list of different products and choose a product. Here, the product selection control 5810 is a drop down list. However, other user interface items may be provided.

The text area 5815 is an area of the GUI 5805 that allows a user to input comment. A user can type text into this area to leave comment regarding a product. Alternatively, the user can copy and paste text directly into this area 5815. As will be described below, the text area 5815 can also receive keyword input in other ways (e.g., through a list window that is displayed with a selection of a shortcut key).

Once a user selects a product using the selection control and inputs comment into the text area 5815, the user can select the submit button 5820. The selection causes any comment in the text area 5815 to be submitted to the content provider. In some embodiments, when the comment is submitted, the GUI 5805 is updated to display the comment. For example, a comment inputted through the text area 5815 may be displayed in another area of the GUI 5805 below or above the text area 5815.

Having described the elements of the GUI 5805, the operations will now be described by reference to the state of the GUI 5805 that is illustrated in FIGS. 58-60. As shown in FIG. 58, the user has chosen a product from a drop down list using the control 5810. The user can input a comment regarding the selected product in the text area 5815. To make the comment more meaningful and/or easier to search, the user can also select different keywords or topics to add to the text area using the GUI 5805. Once a user inputs comments and/or keyword into the text area 5815, the user can select the submit button. In FIG. 58, the submit button 5820 is not highlighted because no text has been entered into the text area 5815.

FIG. 59 provides an illustrative example of displaying sponsored tags. Specifically, this figure illustrates the GUI 5805 after a user selects a shortcut key that causes a popup window 5905 to appear. Here, the user selects the "#" key. However, the user may select a different key, combination of keys, or a user interface item, in some embodiments. The popup window displays a list of different tags or topics (e.g., 5915, 5920, and 5930). The user can insert any one of these tags into the text area 5815 by scrolling through the list and selecting a tag. Alternatively, the user can select item 5910 to input a new tag or topic. In this way, different users can interact with the GUI 5805 to introduce a new keyword or topic.

As shown in FIG. 59, the sponsored tags (5915 and 5920) are displayed differently from other tags. Specifically, the sponsored tags are displayed at the top of the list of keywords in the popup window 5905. The sponsored tags are also marked with a symbol 5925 to distinguish them from other tags. As such, the sponsored tags are presented more prominently than other tags so that the user can easily distinguish them from other tags. In the example of FIG. 59, each sponsored tags are marked with a "*" symbol. However, the sponsored tag may be marked with a different symbol, text, an icon, or highlighted, in some embodiments.

In the example illustrated in FIG. 59, the sponsored tags relate to a company that is performing market research. The company might have paid a fee to place these tags at the top of the keyword list. As shown, the sponsored tags relate to the product selected with the control 5810. Specifically, the sponsor tags relate to a Bluetooth earphone that was chosen by the user with the control 5810. The sponsored tags also relate to the quality or price of the selected product. Hence, in this example, the sponsored tags are placed to introduce a question in the form of a keyword that is incorporated into the conversation. In this way, the company can use sponsored tags to determine what users are saying about its product or service.

FIG. 60 illustrates the GUI 5805 after inserting tags into text area 5815. In this example, the user has selected tags 5915, 5930, and 5935 from the list of available tags. The selections cause the text area 5815 to be populated with these tags. In this example, the sponsored tags are displayed differently from other input text. Specifically, the sponsored tags are highlighted differently from other tags. For example, the sponsored tags 5915 are highlighted in red, while other non-sponsored tags 5930 and 5935 are highlighted in yellow. In some embodiments, the comments inputted by a user or a newly introduced tag or topic may be displayed differently in the text area 5815. After the user inputs one or more tags and/or comments, the user can select submit button 5820 to submit the comment.

In the example described above, the sponsored tags are provided in a comment GUI 5805 related to a purchased product. However, these tags may be provided in other comment areas. For example, the tags may be provided in a comment area of an article, blog, social networking site, news section, etc. Also, in the example described above, a user can select the user interface item 5910 to add a new topic or keyword. In some embodiments, the GUI provide user interface items to define sponsored tags and submit them (e.g., with a placement fee) to have them displayed prominently over other non-sponsored tags. In some embodiments, the sponsored tags are ranked based on one or more factors. For example, one sponsored tag may be placed over other sponsored tags based on the amount of fee paid by an entity (e.g., a person, a company, etc.).

In conjunction with sponsored tags, some embodiments provide one or more sponsored operators. These sponsored operators may be marked or highlighted similar to a sponsored tag. Similar to sponsored tags, sponsored operators provide an entity with means to enter a conversation. That is, the sponsored operators represent different verbs or sentiments. As such, the sponsored operators are ways of further defining the conversation, not just with words or tags, but also with sentiments or verbs. In some embodiments, non-sponsored operators are ones that are provided by the platform for a user to select (e.g., "<" operator, ">" operator), while the sponsored operators are operators that different entities pay to have their ideas introduced into the conversation.

IV. Hierarchy Table

Some embodiments of the invention implement a method for creating tag hierarchies. Although some embodiments show this method being implemented using sample GUI tools, one of ordinary skill in the art will realize that tag hierarchies can be created in a myriad of different ways. For example, FIG. 61 illustrates a hierarchy table 6100 that creates tag hierarchies among various tags listed within the cells of the table. Table 6100 includes five columns (i.e. Tag 1, Tag 2, Tag3, Tag4, and Tag5) and six rows (i.e. rows 1-6). However, in some embodiments, Table 6100 is of any desired size.

In some embodiments, hierarchy among tags is determined by the positioning of the tags relative to each other within the table. The higher a tag is in the table, the more significant it is in the description of a particular piece of content. In other words, the first row from the top holds the most significant tags while the last row holds the least significant tags. All tags in the same row carry the same amount of significance.

In the example of FIG. 61, Tags A-J are used to tag a particular piece of content. Their positioning in table 6100 defines the tags' relationship with each other. Tag J is in row 1 and hence is the most significant tag. It is more important than any other tag. Tags B, E, D, and I are on the next level in the hierarchy. The next level includes tags A and C. The last level of the hierarchy includes tags F, H, and G. It follows that J is more important than D, E is more important than H, B is more important than C, etc. Tags in the same row carry the same weight in the hierarchy; therefore, in the example of FIG. 61, Tags B, E, D and I are equally as important. In addition, the order of the tags in each row is insignificant. Hence, row 2 could be reordered to list its tags from left to right as "E, I, D, B" and nothing will change in the hierarchy.

The example given in FIG. 61 is merely an example and not exhaustive as to how to create tag hierarchies. One of ordinary skill in the art will realize that there are many different ways to create tag hierarchies, and the invention is not limited to the embodiments set forth.

V. Computer System

Figure 62:
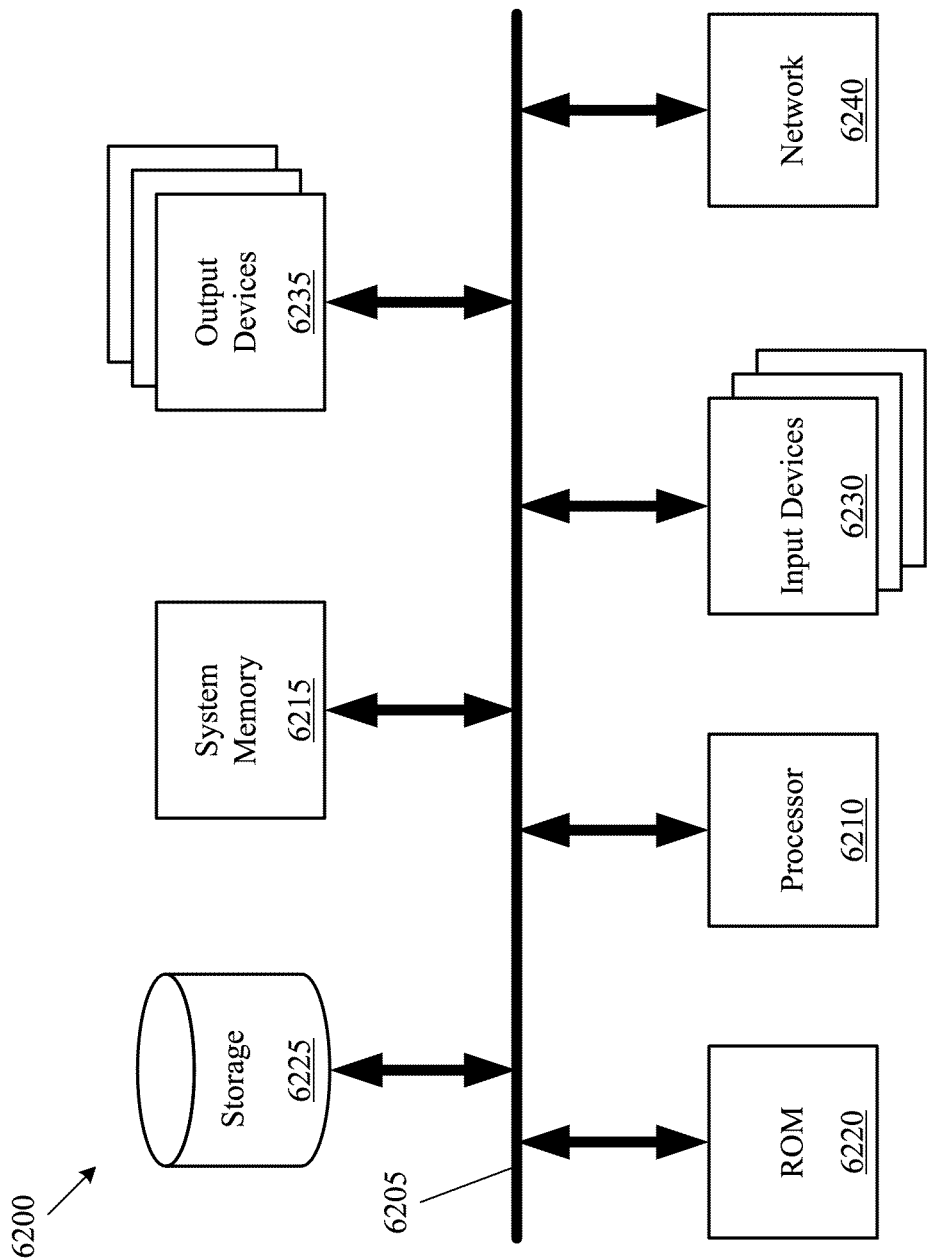
FIG. 62 illustrates a computer system by which some embodiments are implemented.

FIG. 62 illustrates a computer system 6200 with which some embodiments are implemented. Such a computer system includes various types of computer readable mediums and interfaces for various other types of computer readable mediums. The computer system 6200 includes a bus 6205, a processor 6210, a system memory 6215, a read-only memory ("ROM") 6220, a permanent storage device 6225, input devices 6230, and output devices 6235. The components of the computer system 6200 are electronic devices that automatically perform operations based on digital and/or analog input signals.

One of ordinary skill in the art will recognize that the computer system 6200 may be embodied in other specific forms without deviating from the spirit of the invention. For instance, the computer system may be implemented using various specific devices either alone or in combination. For example, a cellular phone may include the input and output devices 6230 and 6235, while a remote personal computer ("PC") may include the other devices 6205-6225, with the cellular phone connected to the PC through a cellular network that accesses the PC through its network connection 6240.

The bus 6205 collectively represents all system, peripheral, and chipset buses that communicatively connect the numerous internal devices of the computer system 6200. For instance, the bus 6205 communicatively connects the processor 6210 with the read-only memory 6220, the system memory 6215, and the permanent storage device 6225. From these various memory units, the processor 6210 retrieves instructions to execute and data to process in order to execute the processes of the invention. In some cases, the bus 6205 may include wireless and/or optical communication pathways in addition to or in place of wired connections. For example, the input and/or output devices may be coupled to the system using a wireless local area network ("W-LAN") connection, Bluetooth®, or some other wireless connection protocol or system.

The read-only-memory ("ROM") 6220 stores static data and instructions that are needed by the processor 6210 and other modules of the computer system. The permanent storage device 6225, on the other hand, is a read-and-write memory device. This device is a non-volatile memory unit that stores instructions and data even when the computer system 6200 is off. Some embodiments use a mass-storage device (such as a magnetic or optical disk and its corresponding disk drive) as the permanent storage device 6225.

Other embodiments use a removable storage device (such as a floppy disk, flash drive, or CD-ROM) as the permanent storage device. Like the permanent storage device 6225, the system memory 6215 is a read-and-write memory device. However, unlike the storage device 6225, the system memory is a volatile read-and-write memory, such as random access memory ("RAM"). The system memory stores some of the instructions and data that the processor needs at runtime. In some embodiments, the sets of instructions used to implement the invention's processes are stored in the system memory 6215, the permanent storage device 6225, and/or the read-only memory 6220.

The bus 6205 also connects to the input and output devices 6230 and 6235. The input devices enable the user to communicate information and select commands to the computer system. The input devices 6230 include alphanumeric keyboards and pointing devices (also called "cursor control devices"). The input devices 6230 also include audio input devices (e.g., microphones, MIDI musical instruments, etc.) and video input devices (e.g., video cameras, still cameras, optical scanning devices, etc.). The output devices 6235 include printers, electronic display devices that display still or moving images, and electronic audio devices that play audio generated by the computer system. For instance, these display devices may display a graphical user interface (GUI). The display devices include devices such as cathode ray tubes ("CRT"), liquid crystal displays ("LCD"), plasma display panels ("PDP"), surface-conduction electron-emitter displays ("SED"), etc. The audio devices include a PC's sound card and speakers, a speaker on a cellular phone, a Bluetooth® earpiece, etc. Some or all of these output devices may be wirelessly or optically connected to the computer system 6200.

Finally, as shown in FIG. 62, bus 6205 also couples the computer 6200 to a network 6240 through a network adapter (not shown). In this manner, the computer can be a part of a network of computers (such as a local area network ("LAN"), a wide area network ("WAN"), or an intranet, or a network of networks, such as the Internet. For example, the computer 6200 may be coupled to a web server (network 6240) so that a web browser executing on the computer 6200 can interact with the web server as a user interacts with a GUI that operates in the web browser.

As mentioned above, the computer system 6200 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs ("CD-R"), rewritable compact discs ("CD-RW"), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs ("BD"), ultra density optical discs, any other optical or magnetic media, and floppy disks. The computer-readable media may store a computer program that is executable by at least one processor and includes sets of instructions for performing various operations.

For the purposes of this Specification, a computer is a machine and the terms display or displaying mean displaying on an electronic device. It should be recognized by one of ordinary skill in the art that any or all of the components of the computer system 6200 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms (i.e., different embodiments may implement or perform different operations) without departing from the spirit of the invention. For instance, a person of ordinary skill in the art would realize that the invention may be practiced in several different operating environments such as Microsoft Windows®, UNIX®, Linux, etc.

The invention claimed is:

1. A non-transitory computer readable storage medium comprising instructions which when executed by a computer, cause the computer to implement operations for generating a tag chain using tag calculus, the operations comprising:
   receiving a selection of a category;
   receiving input based at least in part on the selected category, the input comprising content; and
   in response to providing a list of tags identifying the content,
   generating a tag chain associated with the content, wherein the tag chain is a composite object representing a grouping of related tags, and wherein generating the tag chain comprises:
      receiving input of a set of tag calculus relationship operators identifying relationships among at least a subset of the list of tags, wherein each relationship operator defines a link between a tag and at least one other tag within the subset of the list of tags; and
      generating the tag chain comprising the related subset of the list of tags and the set of tag calculus relationship operators identifying the relationships among the subset of the list of tags.

2. The non-transitory computer readable medium of claim 1, wherein each tag in the list of tags comprises one or more keywords.

3. The non-transitory computer readable medium of claim 1, wherein the list of tags comprises at least one of sponsored tags and non-sponsored tags, wherein the sponsored tags are displayed prior to at least one or more of the non-sponsored tags.

4. The non-transitory computer readable medium of claim 1, further comprising instructions to display each sponsored tag in the list of tags with a marking to distinguish the sponsored tags from at least one of the one or more non-sponsored tags.

5. The non-transitory computer readable medium of claim 1, further comprising instructions to display the sponsored tags differently from other input text.

6. The non-transitory computer readable medium of claim 1, wherein the set of tag calculus relationship operators includes at least one of an addition operator, a pound operator, an equal operator, a greater than operator, a less than operator, and a closed operator.

7. The non-transitory computer readable medium of claim 6, wherein at least two of the set of tag calculus operators are combined to describe a relationship between at least two tags within the related subset of the list of tags.

8. The non-transitory computer readable medium of claim 6, wherein the set of relationship operators comprise at least one or more sponsored relationship operators and one or more non-sponsored relationship operators.

9. The non-transitory computer readable medium of claim 3, wherein a first user-selected category and a second user-selected category define different lists of sponsored tags and non-sponsored tags.

10. The non-transitory computer readable medium of claim 9, wherein a position of each sponsored tag in the list of sponsored tags and non-sponsored tags is determined based at least in part on a monetary value associated with a corresponding sponsored tag.

11. A computer-implemented method for generating a tag chain using tag calculus, the method comprising:
    receiving a selection of a category;
        receiving input based at least in part on the selected category, the input comprising content; and
        in response to providing a list of tags identifying the content,
        generating a tag chain associated with the content, wherein the tag chain is a composite object representing a grouping of related tags, and wherein generating the tag chain comprises:
    receiving input of a set of tag calculus relationship operators identifying relationships among at least a subset of the list of tags, wherein each relationship operator defines a link between a tag and at least one other tag within the subset of the list of tags; and
        generating the tag chain comprising the related subset of the list of tags and the set of tag calculus relationship operators identifying the relationships among the subset of the list of tags.

12. The computer-implemented method of claim 11, wherein the list of tags comprises at least one of sponsored tags and non-sponsored tags, wherein the sponsored tags are displayed prior to at least one or more of the non-sponsored tags.

13. The computer-implemented method of claim 11, further comprising displaying each sponsored tag in the list of tags with a marking to distinguish the sponsored tags from at least one of the one or more non-sponsored tags.

14. The computer-implemented method of claim 11, wherein the set of tag calculus relationship operators includes at least one of an addition operator, a pound operator, an equal operator, a greater than operator, a less than operator, and a closed operator.

15. The computer-implemented method of claim 14, wherein at least two of the set of tag calculus operators are combined to describe a relationship between at least two tags within the related subset of the list of tags.

16. The computer-implemented method of claim 14, wherein the set of operators comprise at least one or more sponsored relationship operators and one or more non-sponsored relationship operators.

17. The computer-implemented method of claim 13, wherein a first user-selected category and a second user-selected category define different lists of sponsored tags and non-sponsored tags.

18. The computer-implemented method of claim 17, wherein a position of each sponsored tag in the list of sponsored tags and non-sponsored tags is determined based at least in part on a monetary value associated with a corresponding sponsored tag.

19. The non-transitory computer readable medium of claim 1, further comprising instructions that cause the computer to search for the content based at least in part on the tag chain.

20. The non-transitory computer readable medium of claim 7, further comprising instructions that cause the computer to:
    determine a relevance metric for each sponsored tag in the list of sponsored tags; and
    rank each sponsored tag in the list of sponsored tags based at least in part on the relevance metric.

21. A system comprising:
    memory configured to store computer-executable instructions; and
    at least one processor configured to access the memory and execute the computer-executable instructions to implement operations for generating a tag chain using tag calculus, the operations comprising:
    receiving a selection of a category;
    receiving input based at least in part on the selected category, the input comprising content; and
    in response to providing a list of tags identifying the content,
    generating a tag chain associated with the content, wherein the tag chain is a composite object representing a grouping of related tags, and wherein generating the tag chain comprises:
    receiving input of a set of tag calculus relationship operators identifying relationships among at least a subset of the list of tags, wherein each relationship operator defines a link between a tag and at least one other tag within the subset of the list of tags; and
        generating the tag chain comprising the related subset of the list of tags and the set of tag calculus relationship operators identifying the relationships among the subset of the list of tags.

* * * * *